United States Patent

Normand et al.

[11] Patent Number: 5,867,487
[45] Date of Patent: Feb. 2, 1999

[54] METHOD OF AUTOMATIC DUPLEX OR SEMI-DUPLEX COMMUNICATION FOR TWO UNITS VIA A TELEPHONE LINE

[75] Inventors: Olivier Normand, Rennes; Jean-Pierre Martiniere, Liffre; Bernard Danneville, Aigne, all of France

[73] Assignees: France Telecom; Telediffusion DeFrance, both of Paris, France

[21] Appl. No.: 424,510

[22] PCT Filed: Nov. 23, 1993

[86] PCT No.: PCT/FR93/01152

§ 371 Date: Jun. 29, 1995

§ 102(e) Date: Jun. 29, 1995

[87] PCT Pub. No.: WO94/13094

PCT Pub. Date: Jun. 9, 1994

[30] Foreign Application Priority Data

Nov. 25, 1992 [FR] France ................................. 92 14197
Nov. 25, 1992 [FR] France ................................. 92 14194

[51] Int. Cl.⁶ ........................... H04J 15/00; H04L 5/00
[52] U.S. Cl. ........................... 370/296; 370/286; 370/478; 375/222
[58] Field of Search ..................... 370/296, 286, 370/287, 420, 389, 259, 465, 477, 478; 379/308, 222, 144; 375/222, 223

[56] References Cited

U.S. PATENT DOCUMENTS

| | | | |
|---|---|---|---|
| 4,625,276 | 11/1986 | Benton et al. | 379/144 |
| 4,694,450 | 9/1987 | Staab | 370/286 |
| 4,764,940 | 8/1988 | Paneth et al. | 375/308 |
| 5,095,494 | 3/1992 | Takahashi et al. | 375/10 |
| 5,245,441 | 9/1993 | Ruben | 358/426 |

FOREIGN PATENT DOCUMENTS

| | | | |
|---|---|---|---|
| 0154565 | 9/1985 | European Pat. Off. | H04L 27/00 |
| 0292691 | 11/1988 | European Pat. Off. | H04M 11/06 |
| 0390931 | 10/1990 | European Pat. Off. | H04M 11/00 |
| 8911183 | 11/1989 | WIPO | H04B 1/38 |

*Primary Examiner*—Douglas W. Olms
*Assistant Examiner*—Shick Hom
*Attorney, Agent, or Firm*—Banner & Witcoff, Ltd.

[57] ABSTRACT

Apparatus and methods for establishing half-duplex communication between a first unit and a second unit over a telephone line. The first unit may transmit a first matching signal stream, the first matching signal stream including a first conditioning segment and a first unmodulated carrier signal having a first characteristic carrier frequency, the first characteristic carrier frequency representing a given transmission mode, the given transmission mode being in half-duplex. The second unit may analyze the first characteristic carrier frequency to recognize the given transmission mode.

19 Claims, 68 Drawing Sheets

STOP TRANSMISSION OF TONE SIGNAL EN ROUTE:
READ REGISTER 7, BLOCK BITS 0 TO 6, SET BIT 7 (RTSP)
AT 0, WRITE THE BYTE IN REGISTER 7

FIG. 21h

WRITE 80H (TONE DETECT CONFIGURATION)
IN REGISTER 6 (CONF)

INTIALIZE THE MODEM FUNCTIONING
WRITE VALUE 20H IN REGISTER 7

| BIT 7 = 0 (RTSP) | BIT 3 = 0 (EPT) |
| BIT 6 = 0 (TDIS) | BIT 2 = 0 (SQUEXT) |
| BIT 5 = 1 (PDM) | BIT 1 = INDIFFERENT |
| BIT 4 = 0 (SHTR) | BIT 0 = 0 (HDLC) |

INTIALIZE THE MODEM STATUS AND FILTERS
WRITE VALUE 0H IN REGISTER 9

| BIT 7 = 0 (OVRUN) | BIT 3 = 0 (ABIDL) |
| BIT 6 = 0 (EQSV) | BIT 2 = 0 (EOF) |
| BIT 5 = 0 (EQFZ) | BIT 1 = 0 (CRC) |
| BIT 4 = 0 (ZEROC) | BIT 0 = 0 (FLAG) |

INHIBIT INTERRUPTIONS AND EFFECT A SETUP REQUEST:
READ REGISTER 1F, BLOCK BITS 1, 2, 5, 6 AND 7,
SET AT 0 BITS 3 AND 4: PIE AND PIREQ AND SET BIT 0
(SETUP) AT 1 AND WRITE 1H IN REGISTER 1F

NO — BIT SETUP = 0?
(WAIT FOR CONSIDERATION OF PROGRAMMING)

PROGRAM THE FREQUENCY TO BE DETECTED:
SEE THE PROCEDURE FOR WRITING THE BYTE IN
MODEM RAM FOR PROGRAMMING OF COEFFICIENTS
FOR EACH FILTER

FIG. 21i

| COEFFICIENT | RAM ACCESS CODE (HEXA) | | | REGISTER |
|---|---|---|---|---|
| | FR1 | FR2 | FR3 | |
| ALPHA 0 | 25 | 2B | 31 | 2.3 |
| ALPHA'0 | 28 | 2E | 34 | 2.3 |
| BETA 1 | A6 | AC | B2 | 0.1 |
| BETA'1 | A9 | AF | B5 | 0.1 |
| BETA 2 | A7 | AD | B3 | 0.1 |
| BETA'2 | AA | B0 | B6 | 0.1 |
| ALPHA" | A8 | AE | B4 | 0.1 |
| BETA" | A5 | AB | B1 | 0.1 |

*FIG. 21j*

| ADDRESS | HEAVY WEIGHT | LOW WEIGHT | VALUE OF COEFFICIENTS | WRITING PARAMETERS |
|---|---|---|---|---|
| OB1H | 000H | 022H | BETA"=0022 | IO1=1<br>CR1=0<br>BR1=0 |
| OB1H | 07FH | 0DCH | BETA"=7FDC | IO1=1<br>CR1=0<br>BR1=0 |

*FIG. 21k*

| ADDRESS | HEAVY WEIGHT | LOW WEIGHT | VALUE OF COEFFICIENTS | WRITING PARAMETERS |
|---|---|---|---|---|
| 031H | 001H | 097H | ALPHA 0=0197 | IO1=1, CR1=0, BR1=0 |
| 034H | 001H | 097H | ALPHA' 0=0197 | IO1=1, CR1=0, BR1=0 |
| 0B2H | 01AH | 04AH | BETA 1=1A4A | IO1=1, CR1=0, BR1=0 |
| 0B5H | 017H | 055H | BETA' 1=1755 | IO1=1, CR1=0, BR1=0 |
| 0B3H | 0C0H | 0C4H | BETA 2=C0C4 | IO1=1, CR1=0, BR1=0 |
| 0B6H | 0C0H | 0C4H | BETA'2=C0C4 | IO1=1, CR1=0, BR1=0 |

*FIG. 21l*

| ADDRESS | HEAVY WEIGHT | LOW WEIGHT | VALUE OF COEFFICIENTS | WRITING PARAMETERS |
|---|---|---|---|---|
| 031H | 001H | 038H | ALPHA 0=0138 | IO1=1, CR1=0, BR1=0 |
| 034H | 001H | 038H | ALPHA' 0=0138 | IO1=1, CR1=0, BR1=0 |
| 0B2H | 055H | 002H | BETA 1=5502 | IO1=1, CR1=0, BR1=0 |
| 0B5H | 052H | 0BEH | BETA' 1=52BE | IO1=1, CR1=0, BR1=0 |
| 0B3H | 0C0H | 0C4H | BETA 2=C0C4 | IO1=1, CR1=0, BR1=0 |
| 0B6H | 0C0H | 0C4H | BETA'2=C0C4 | IO1=1, CR1=0, BR1=0 |

*FIG. 21m*

| ADDRESS | HEAVY WEIGHT | LOW WEIGHT | VALUE OF COEFFICIENTS | WRITING PARAMETERS |
|---|---|---|---|---|
| 031H | 001H | 07DH | ALPHA 0=017D | IO1=1, CR1=0, BR1=0 |
| 034H | 001H | 07DH | ALPHA' 0=017D | IO1=1, CR1=0, BR1=0 |
| 0B2H | 031H | 012H | BETA 1=3112 | IO1=1, CR1=0, BR1=0 |
| 0B5H | 030H | 04DH | BETA' 1=304D | IO1=1, CR1=0, BR1=0 |
| 0B3H | 0C0H | 0C4H | BETA 2=C0C4 | IO1=1, CR1=0, BR1=0 |
| 0B6H | 0C0H | 0C4H | BETA'2=C0C4 | IO1=1, CR1=0, BR1=0 |

*FIG. 21n*

| ADDRESS | HEAVY WEIGHT | LOW WEIGHT | VALUE OF COEFFICIENTS | WRITING PARAMETERS |
|---------|--------------|------------|------------------------|---------------------|
| 031H | 001H | 074H | ALPHA 0=0174 | IO1=1, CR1=0, BR1=0 |
| 034H | 001H | 074H | ALPHA' 0=0174 | IO1=1, CR1=0, BR1=0 |
| 0B2H | 038H | 0A5H | BETA 1=38A5 | IO1=1, CR1=0, BR1=0 |
| 0B5H | 037H | 0E5H | BETA' 1=37E5 | IO1=1, CR1=0, BR1=0 |
| 0B3H | 0C0H | 0C4H | BETA 2=C0C4 | IO1=1, CR1=0, BR1=0 |
| 0B6H | 0C0H | 0C4H | BETA'2=C0C4 | IO1=1, CR1=0, BR1=0 |

FIG. 21o

INITIALIZE THE RAM WRTING: READ REGISTER 5, BLOCK BITS 0 TO 6, SET BIT 7 (ACC1) AT 0, WRITE THE BYTE IN REGISTER 5

PLACE THE RAM ADDRESS IN REGISTER 4 (ADD1)

READ REGISTER 5, BLOCK BITS 1 TO 7, SET BIT 0 (CR1) AT THE SPECIFIED VALUE, WRITE THE BYTE IN REGISTER 5

READ REGISTER 5, BLOCK BITS 0, 1 AND 4 TO 7, SET BITS 2 (BR1) AND 3 (IO1) AT THE SPECIFIED VALUES, WRITE THE BYTE IN REGISTER 5

READ REGISTER 5, BLOCK BITS 0 AND 2 TO 7, SET BIT 1 (WRT1) AT 1, WRITE THE BYTE IN REGISTER 5

WRITE THE HEAVY WEIGHTS OF THE VALUE TO BE PLACED IN RAM REGISTER 1 (YDAM1)

WRITE THE LOW WEIGHTS OF THE VALUE TO BE PLACED IN RAM REGISTER 0 (YDAL1)

INDICATE TO THE MODEM THE RAM WRITING: READ REGISTER 5, BLOCK BITS 0 TO 4, 6 AND 7, SET BIT 7 (ACC1) AT 1, WRITE THE BYTE IN REGISTER 5

WRITING CONSIDERED? BA1= 1 ? (REGISTER 1E, BIT 0) — NO

FIG. 21p

SI = SIGNAL COMPONENT
IN THE MODULATION

SI = STANDARD INTERVAL IN MODULATION

METHOD OF AUTOMATIC DUPLEX OR SEMI-DUPLEX COMMUNICATION FOR TWO UNITS VIA A TELEPHONE LINE

FIELD OF THE INVENTION

The object of this invention is a method of automatic duplex or semi-duplex (called half-duplex) communication of a mono-mode or multi-mode unit and a mono-mode or multi-mode unit for modulation such as, for example, V23, V27ter and V29 via a general telephone network with switching and over station to station telephone circuits, such as two-wire leased circuits.

BACKGROUND

Since Jul. 1, 1980, the date of the first testing of the electronic directory service at Saint Malo, the Minitel has been using, in France, a transmission speed of 1200 bps to receive reference service information and a speed of 75 bps to transmit keyboarding of the user. This mode of transmission, in full duplex, is based on V23 modulation which is a speed of 1200/75 bps between the Minitel and Videotext Access Point (PAVI) units. The connection between Minitel and PAVI is based on the switched telephone network (RTC). The connection between PAVI and the Teletel servers is based on the TRANSPAC network with transmission speeds of 19.2 kbps or 48 kbps.

At the beginning of the 1990s, in order to improve convenience and speed in consulting Teletel services, provision was made to increase the transmission speed at first to 4800 bps, and then to 9600 bps between the Access Point and Minitel. This new mode of transmission in semi-duplex or half-duplex is based on the V27ter modulation for the speed of 4800 bps and on the aforementioned V29 modulation at 9600 bps. The V27ter and V29 standards have been kept for reasons of cost and performance. The speed of 4800 bps and 9600 bps can be used over the two paths, the data circuit termination unit (ETCD) or modem operating at half speed.

This new Teletel access service, called "Teletel high speed" access service (or TVR) thereby allows a useful rate of flow of communication multiplied by four in V27ter and by eight in V29 with respect to a useful throughput rate of V23 access. It thus permits a rapid transfer of pages requiring a considerable volume of information; this is the privileged channel for operation of the future photographic Minitel and for applications such as transfers of files, telecopy, audio videotext, etc.

The main public terminal (or Minitel) is not currently connectable, equally and without specific intervention of the user, over the Teletel V23 access, over V27ter Teletel access and over the forthcoming V27ter/V29 accesses with connection time similar to the present V23.

Establishment of telephone connection between the Minitel and videotext access points (PAVI) is effected principally over the switched telephone network (RTC).

Request for establishing connection consists of the actions of picking up the telephone line (or going on line) and dialing the number. This request can be at the initiative:

of the user (manual demand)

of the Minitel through the intermediary of the telephone directory of a peripheral component of the Minitel such as the memory card reader or LECAM.

Sensing this request for establishing communication by the distant unit (calling ring over the switched telephone network (RTC) or location of an indicator on the shared line) authorizes it to effect connection.

After making the connection, communication or physical connection is effected by the exchange and recognition of signals between the modems and the two units. Validation of communication allows the two units to then transmit data and to thereby establish a logical connection such as the establishment of packet and screen levels of the communication protocol used, in V27ter and in V29 for example.

The request for communication (or "order to establish communication" or even "connection order") can be at the initiative:

of the user by touching a button such as the "end connection" button of the Minitel, of the Minitel through the intermediary of the telephone and videotext directory, of a peripheral device of the Minitel through the intermediary of a command sequence.

To communicate in V23, V27ter or V29 mode (V23/V27ter/V29) it is possible to use several "end-connection" buttons one time for each of the modes. This manual solution is not ergonomic for a large public user group.

Another solution would be to rely on preliminary and systematic communication in V23, and then, by reception of a particular sequence, to change over to V27ter or V29 transmission. This solution would be penalized in connection time, and would not allow communication with existing units exclusively in V27ter, which do not have the V23 mode.

These solutions, manual or semi-automatic, would also have the disadvantage of prohibiting or making difficult any possibility of automatic re-establishment of communication (radio telegraphy-data or audio video text application) and the disadvantage of prohibiting any process of maintaining communication (resumption of communication in V27ter or V29, and a speed doubling from V27 to V27ter).

SUMMARY OF THE INVENTION

This invention pertains to a process which does not have the aforementioned disadvantages and whose basic concept is to permit reciprocal adaptation of the transmission modes of the calling unit (generally the Minitel, PAVI, PC type terminal, or Macintosh type unit) and the called unit (PAVI, Minitel, PC or Macintosh terminal). The terminal (Minitel, microcomputer, etc.) as well as the PAVI access point must one or both be capable of managing preferably more than one modulation, and preferably, with respect to the calling unit of managing either the two modulations V23/V27ter or V27ter/V29 or the three modulations V23/V27ter/V29 in order to allow:

physical connection in common transmission mode for the two units according to the quickest preferable modulation such as that presented in the summary table of physical connection types (case of initial communication), and/or physical reestablishment of communication in at least one mode, for example at least one of the three modes V23, V27ter and V29 (case of radio telegraphy-data or audio videotext application).

For this purpose the invention involves a process of automatic half-duplex communication of two units A and B via a telephone line, characterized in that the two units are equipped to communicate, following establishment of telephone connection, in at least one mode of half-duplex transmission and in that the process uses at least one signal stream exchange for establishing connection, (a long learning sequence, for example) for communication in half-duplex transmission mode, each matching signal stream beginning with an unmodulated carrier signal (especially an echo suppression signal) of given nominal duration having a characteristic carrier frequency of said requested transmission mode, and also including at least one conditioning segment (segments 3, 4 and 5 of the V27ter or V29 long learning sequences, for example) and in that each of the two units is equipped so that it can sense the frequency of said unmodulated characteristic carrier signal of said transmission mode which is used, and process in which the two units A and B are capable of effecting exchange of two matching signal streams in the following stages:

a) emission by one of the units called "first matching unit" of a first matching signal stream according to a given transmission mode in half-duplex.

b) analysis by the other unit, called the "second unit for matching" of the unmodulated carrier signal frequency of said first matching signal stream.

c) in case of recognition by the second unit of the carrier signal frequency of said given transmission mode, placement of the second unit to receive, in accordance with said given transmission mode, of said conditioning segment.

d) validation by the second unit of reception of said conditioning segment of the first matching signal stream, and conditioning of the second unit in accordance with said given transmission mode, which allows it to transmit in this mode.

e) transmission by the second unit of a second matching signal stream in the recognized transmission mode which corresponds to the given mode, which validates communication for the second unit in the given transmission mode.

f) analysis by the first unit of the signal frequency of the unmodulated carrier of the second matching signal stream.

g) in case of recognition by the first unit of the carrier signal frequency of the given transmission mode, keeping the first unit in receiving condition in said given transmission mode recognized and accepted by the second unit.

h) validation by the first unit of reception of said conditioning segment of the second matching signal stream, and conditioning of the first unit in said given transmission mode.

i) establishment by the first unit of communication in said given transmission mode.

Said establishment of communication by the first unit can include transmission by the latter of a synchronizing signal stream (for example, so called "short stream" short learning sequence in V27ter or V29 mode) which does not begin with an unmodulated carrier signal.

It is appropriate to point out that the technique based on the exchange of matching signal streams according to the process of the invention can be used in a more general context, such as a method for maintaining half-duplex communication by relying on mechanisms which physically reestablish communication and/or doubling of speed with a change of modulation type, such as V29 modulation to V27ter and/or V17 modulation (14.4 kbps) to V29.

The process according to the invention can allow establishment of communication between two units A and B which have variable speed transmission modes (case No. 6), a process in which unit A is equipped to communicate in a first transmission mode, as well as a second half-duplex transmission mode less rapidly than the first transmission mode, and in that the unit B is equipped to communicate in the second transmission mode, but is not equipped to communicate in the first transmission mode, and in that the units A and B are equipped to effect an exchange of two matching streams in the following stages:

stages a) and b), in which the given transmission mode is the first transmission mode.

j) in case of non-recognition by unit A of the unmodulated carrier signal frequency in the first transmission mode and the impossibility of unit B of being placed in said first transmission mode, non-validation by unit B of reception of the first matching signal stream.

k) stages a) to i) in which the given transmission mode is the second transmission mode, during which the first unit is unit B and the second unit is unit A.

In a variant, the invention pertains to a process in which the second unit is unit B and is equipped to communicate in said first transmission mode (for example V27ter) as well as a third transmission mode (for example V29) in half-duplex faster than the first transmission mode and, in that the first unit, which is unit A, is equipped to communicate only in said third transmission mode.

According to a preferred method of implementation, each of the units A and B is capable of functioning as the first unit, or also as the second unit. This allows one in particular to achieve matching for which the first unit is either the calling unit, that is to say the one which is making the connection, (most favorable case) or the called unit (so-called "delayed" connection, for example).

In one mode of advantageous implementation the unmodulated carrier signal is an echo suppression signal used as the distinguishing factor of the half-duplex transmission mode.

A validation in the transmission mode adjusted for the two units is advantageously obtained by the fact that said validation of communication by the unit which validates reception of the second matching signal stream includes emission of a synchronizing signal stream which does not begin with an unmodulated carrier signal.

In the case of a request for communication immediately following an order for a line, (that is to say a request to establish telephone connection (DLT)) (case of anticipated connection), or in other words when a connection order is emitted simultaneously or immediately following an order for connection (see cases No. 1, 3, 6 and 7, described subsequently in the description), the process is characterized in that a request for communication immediately follows a request for establishing communication by unit A and in that the units A and B are equipped to effect the following preliminary stages:

0-0) request for establishing connection by unit A (connection order).

1-0) detection by unit B of request to establish connection and establishment of the connection.

2-0) emission by unit B of a first signal with duration at least equal to a first given duration, of a frequency equal to that of the answering dial tone of the automatic response data unit, having a frequency that is different from the half-duplex modulation carrier stream frequency, followed by a silence having a second duration.

3-0) sensing by unit A of the presence of said frequency signal during at least the first given duration.

4-0) measurement by unit A of the second duration of said silence.

5-0) if the second duration is greater than a given threshold duration, validation of execution of stages a) to i) or of stages a) to k), for which the first unit is unit A and the second unit is unit B.

The process can be characterized in that units A and B are equipped to effect communication in one transmission mode which is not half-duplex if, after stage 4-0), unit A measures a silence duration less than a given duration of the threshold.

This process in accordance with the invention thereby also allows so-called "descending" compatibility to the mode of functioning which is not half-duplex (or full-duplex, see case No. 1 described in the following description).

The invention also allows so-called "delayed" communication. A first variant (case No. 4 and No. 8) of the process for this purpose is characterized in that an order for communication does not immediately follow establishment of connection by unit B, which does follow a request for establishing communication by unit A, in that the order for establishing communication occurs during a transmission sequence by unit B of matching signal streams according to the given transmission mode, and in that said transmission sequence constitutes said stage a), the first unit due to this fact being unit B and the second unit being unit A.

A second variant (case No. 4b and 9) of this process is for this purpose, characterized in that an order of communication does not immediately follow establishment of connection by unit B, which does follow a request for establishing connection by unit A, and in that the order of communication occurs during a transmission sequence by unit B of matching signal streams according to said second transmission mode which is less rapid than said first transmission mode and in that it includes stages a) to i) in the first transmission mode, during which the first unit is unit B and the second unit is unit A.

A preferred variant (case No. 5b) of the process is for this purpose, characterized in that an order to establish communication does not immediately follow establishment of connection by unit B, which does follow a request to establish connection by unit A, in that the order to establish communication occurs during a transmission sequence by unit B of matching signal streams in said first transmission mode more rapidly than said second transmission mode, and in that the unit A is equipped to communicate in said second mode but not in the first mode, and in that the unit B is equipped to communicate in both the first and second modes simultaneously, and in that unit A is equipped to analyze the carrier frequency in the first mode, and in that it includes the following stages:

analysis by unit A of the carrier frequency of a said matching signal stream, in case of recognition of said frequency in the first transmission mode, validation of stages a) to i) according to the second transmission mode, during which the first unit is unit B and the first [sic] unit is unit A.

The invention also pertains to a process which allows establishment of communication in a dual mode, for example V27ter, slower than V29 mode, but stronger than the latter.

In one mode of implementation corresponding to communication in a dual mode (cases No. 4b and 6), the process is characterized in that, for example, in the case where the order for communication immediately follows (case No. 6) establishment of connection by unit B which follows a request for establishing unit A connection, or even not immediately consecutive (case No. 4b), the units A and B are equipped to effect before stage a) the following preliminary stages:

12-1) sending by unit A of a first matching signal stream in a first transmission mode.

12-2) search by unit B for the presence of the carrier signal frequency.

12-3) in case of non-recognition by unit B of the carrier signal frequency corresponding to the second transmission mode, following a waiting time greater than a given duration threshold, validation of execution of stages a) to i) according to the second transmission mode, during which the first unit is unit B and the second unit is unit A.

The invention also pertains to a process which allows radio telegraphy switching which ensures a return protocol in half-duplex mode following a given time delay duration.

For this purpose it is characterized in that said communication follows a passage in radio telephone mode (cases 16 to 18) and in that it includes the following preliminary stages:

13-1) release of half-duplex communication successively at logical levels of the communication protocol then at the physical level (for example, because of loss of carrier) while maintaining connection between the units.

13-2) passage in radio telegraphy mode during a certain delay time duration.

13-3) sensing of the end of the time delay duration.

13-4) validation of execution of stages a) to i) or of stages a) to k).

In order to execute an order for communication during the radio telegraphy phase (cases No. 19 and 20), the process can be characterize in that the two units A and B are equipped so that they can sense the frequency of said characteristic unmodulated carrier signal of each transmission mode in radio telegraphy mode, as well and in that the units A and B are equipped to effect the following stages after stages 13-1 and 13-2:

14-1) before the end of the relative time delay duration in radio telegraphy mode, initialization by one of the units of communication, by emission of an order for communication, for example a segment of given duration of the unmodulated carrier frequency, which occurs during the telephony mode.

14-2) validation of the execution of stages a) to i) of claim 1 or of stages a) to k).

The invention also pertains to a unit which implements the process according to one of the preceding claims and which includes a processing unit, a modem, a line interface and a command bus between the processing unit and the modem, the command unit having a sequencer to sequentially program said modem, characterized in that said sequencer is equipped to:

15-1) program the emission by the modem of a stream of matching signals preceded by an unmodulated carrier signal, 15-2) program sensing by the modem of at least one unmodulated carrier frequency located at the beginning of a received matching stream, and to place the modem in half-duplex transmission mode corresponding to said carrier frequency in order to allow the modem to receive the other signals of said received matching stream, and 15-3) program a validation of physical communication in half-duplex according to said transmission mode once the modem has received and transmitted in the proper manner a said matching signal stream, which allows one subsequently to effect an exchange of synchronization signal streams to validate a connection in said transmission mode.

The unit can also be characterized in that the sequencer is equipped so that when the modem is in receiving mode, said sensing of at least one unmodulated carrier frequency can be effected permanently.

In accordance with an advantageous variant the unit is characterized in that said sequencer is equipped to validate said emission by the modem of a matching signal stream in accordance with 15-1 when one of the following conditions is fulfilled:

reception conforming to a matching signal stream in accordance with 15-2, sensing by the modem following a request for communication of a characteristic silence interval of said unit.

This invention also has as a goal a process which allows one to maintain communication in half-duplex in the presence of telephone line disturbances.

At the beginning of the 1990s, in order to improve convenience and referencing speed of Teletel services, arrangements were made to increase the transmission speed at first to 4800 bps and then to 9600 bps between PAVI and Minitel. This new mode of transmission in half-duplex is based on said V27ter modulation for the 4800 bps speed and on said V29 modulation for 9600 bps. The V27ter and V29 standards (refer to telecopy group 3) have been retained for reasons of cost and performance. The 4800 bps and 9600 bps speeds can be used over both channels, the modem operating at half-speed.

This new Teletel access service called "Teletel high speed" access service (TVR) thus authorizes a useful throughput rate of communication multiplied by four (case of the V27ter) and by eight (case of the V29) with respect to the useful throughput rate of the V23 access.

At the time of establishing communication, while allowing the transmission mode according to the fastest modulation such as V29, one can allow the optimum transfer of pages requiring a considerable volume of information; this is the privileged channel for operation of the future photographic Minitel and for file transfer applications.

In a general way, the switched telephone network (RTC), designed initially for voice signal transport, is subject to disturbances of varying origin which, while they may have negligible influence on the quality of telephone service, have considerable consequences for transmission service.

The structure of the network is relatively complex and employs a great diversity of units. Disturbances, especially in the form of pulse noise, are caused, for example, by dissonance, pulses of tarriff systems or even episodic asynchronizations between switching devices. In addition, certain digital connections at high throughput rate (2 Mbps) between switching devices (MIC connections) can, in case of overloading the connection, increase the number of simultaneous communications by a ratio of 2 (MIC.DA process) by compressing transmission. This method, although well adapted to telephony, disturbs the continuity of communications in V29 modulation.

The disturbance caused by pulse noise introduces effects which vary according to the data modulation principle being used. According to standard V23, one will generally obtain 1 false bit in the line; this type of error is recovered by employing a procedure known as error correction.

The goal of the invention allows one to implement in the case of half-duplex communication, for example V27ter and V29, a protocol which allows one to maintain and resume communication at the physical level, without disconnecting the new so-called greater levels (packet and screen). The basic idea of the invention consists in implementing this protocol in the form of a resumption-adjustment process.

During differential modulation of phase of the V27ter standard, and even more so during combined modulation of amplitude and phase of the V29 standard, for example in the case of pulse noise, there is propagation of the air for several consecutive bits, and much more if the signal is subjected to a mixing stage, thereby propagating the errors during decoding; indeed, in order to break up very long series of zeroes and ones, the modems are equipped with a polynomial generator mixer-demixer $1+x^{-6}+x^{-7}$ in V27ter standard and $1+x^{-18}+x^{-23}$ in V29 standard. Indeed, the V27ter modulation of the DPSK (Differential Phase Shift Keying) type is more robust than V29 modulation of the QAM type (Quadrature Amplitude Modulation) vis-a-vis disturbances caused by the telephone network.

The Teletel network is structured in such a way that Minitel and PAVI units are connected by short distance telephone links. Some measurements conducted by the applicant have shown that the majority of said short local links of the switched telephone network have stable transmission characteristics (such as attenuation, group time distortion) and are only subject to disturbances occasionally, basically of the pulse noise type. In fact, although V29 modulation is privileged, which is optimal for the majority of communications, it seems indispensable to use mechanisms for maintaining communication when this modulation is weakened to the point of breaking communication.

Considering the short line assumptions, we have retained a first protection mechanism for modem reception filter coefficients. The values of these coefficients are fixed at the time of establishing communication after a first exchange of long learning sequences or stream of matching signals which in particular allows the two modem units, as a function of the transmission support characteristics, to accomplish convergence of the coefficients of their receiving filters, in order to avoid ambiguous and uncontrollable fluctuation of these coefficients, during each short learning sequence which is received during communication. Indeed, the transmission of data in half-duplex relies on exchanges of short learning sequences or synchronizing signal streams, which might or might not be carriers of pertinent information. It has proved to be important not to modify the filter coefficients during exchanges of synchronizing signal streams, although the standard allows it, because this mechanism causes rapid maladjustment of the modems when disturbances in the line appear, for example the pulse noise.

The mechanism which ensures freezing of the coefficients at the time of matching signal stream exchange allows better control of efficiency of transmission through viable and more rapid sensing of erroneous synchronizing signal streams. In fact, in order to permit new adjustment of modems to the level of the receiving filter coefficients, as a function of the new characteristics of the transmission line, a second resumption mechanism is employed to cause a new exchange of matching signal streams. This process can be used in half-duplex transmission modes such as V27ter, V29, V17. It relies on the presence of segments 1 and 2 of the matching signal streams which thereby permit their identification during communication. The originality of this process allows viable resynchronizations at the physical level without altering the higher logical levels of the communication protocol, which allows one to continue unbroken transmission at the application level, although the physical support is altered.

Moreover, in the case where the transmission mode utilizes V29 modulation, if there is failure of the aforementioned resumption process, a third mechanism for maintaining communication by changing the type of modulation is put into place. This speed doubling process by changing the type of modulation allows one to continue unbroken transmission at the application level by using more robust modulation, such as V27ter modulation, with respect to V29 modulation.

More generally, the "resumption-adjustment" process combines the three previously mentioned mechanisms, which are:

adjustment of the type of modulation, especially in fixing (or freezing) receiving filter coefficients resumption of transmission possibly, doubling of speed (such as V29 versus V27ter).

In the known manner, the modes of modem speed doubling, such as that provided, for example, by the CCITT V27ter, V29 and V17 standards consist in bringing about reduction of the modulation speed by decreasing the number of states without changing the type of modulation. This method of doubling does not yield a satisfactory result, especially in the case where communication support is affected by pulse noise, and in practice it is used only for some of the lowest speed units. The resumption-adjustment process has the goal of remedying these disadvantages of the state of the art by permitting doubling in a slower but more robust modulation with respect to disturbances caused in particular by changing and/or unstable characteristics of the telephone line, or even those which have as their origin a compression of the throughput rate of transmission (see the aforementioned MIC.DA process).

It has been possible to implement the speed doubling mechanism because of the presence of segments 1 and 2 of the long learning segments which not only allow the resumption mechanism in the same modulation during communication, but also the speed doubling mechanism as distinct from the signal carried by said segment 1, characteristic of this type of modulation. This process will be repeated for transmission modes such as V17, V29, V27ter.

It is appropriate to specify that in terms of useful throughput rate, while giving priority to the fastest transmission mode according to the type of modulation which is less robust, the "useful throughput rate/duration of communication" compromise is resolved by the possibility of not being constrained in interrupting communication in case of major and fleeting disturbances and by the possibility of adjusting the modulation speed when the transmission support temporarily has less favorable characteristics, and this occurs without interruption at the application level.

The invention also pertains to a process of resumption-adjustment for at least a half-duplex modulation between two units A and B via a telephone line, characterized in that it implements, during exchanges of synchronization signal streams possibly followed by application information, a matching signal stream exchange at the initiative of one of the units designated as the first unit for resumption-adjustment, preferably following sensing by the latter of at least two successive streams of erroneous synchronizing signals, each matching signal stream beginning with an unmodulated carrier signal of given nominal duration having a characteristic carrier frequency of the transmission mode, the other unit being designated as the second unit for resumption-adjustment, in that each of the two units A and B is equipped so it can sense the frequency of said unmodulated carrier signal and in that the first and second units are equipped in order to accomplish the exchange of two matching signal streams in the following stages:

a) initialization by the first unit of resumption-adjustment, preferably following sensing by the first unit of at least one erroneous synchronization signal stream, and preferably two successive erroneous streams.

b) emission by the first set of a matching signal stream in the transmission mode used previously in half-duplex for exchanges of synchronizing signal streams.

c) analysis by the second unit of the unmodulated carrier signal frequency of said matching signal stream.

d) in case of recognition of this frequency which characterizes a request for resumption adjustment, placing the second unit in receiving mode by a matching signal stream.

e) in case of validation by the second unit of reception of the second matching signal stream, adaptation of the second unit in said transmission mode which is used, preferably by freezing the reception filter coefficients as adapted to the new transmission support characteristics.

f) emission by the second unit of a stream of matching signals in the recognized transmission mode.

g) analysis by the first set of the unmodulated carrier signal stream frequency of said matching signal stream.

h) in case of recognition of this frequency, maintaining the position of the first unit to receive in said transmission mode.

i) in case of validation by the first unit of reception of the matching signal stream emitted by the second unit, adjustment of the first unit in said transmission mode, preferably by freezing the receiving filter coefficients of the first unit.

j) renewal of synchronizing signal stream exchanges, possibly followed by application information without interrupting the higher logical levels of the communication protocol of the two units.

Said initialization can be effected at the initiative of the higher levels of the protocol (screen-packet) in order to attempt synchronization in V29 mode of doubled transmission in V27ter mode (upon sensing a small number or zero defective CRC codes). This case can occur in particular at the end of overloading a MIC-DA transmission. Such initialization can also occur at the initiative of the application itself. An initialization allows the modem to be placed in the mode for emission of a long stream.

In a mode of implementation which allows one to maintain communication in a doubling mode (case No. 12), the process in accordance with the invention is characterized in that the first and second units are equipped so that they can manage at least one second mode of transmission in half-duplex (for example V27ter) which is slower than the initial transmission mode (for example V29) but more robust vis-a-vis line disturbances and in that the first and second units are equipped in order to effect the following stages following stages a) to g):

k) in case of non-recognition by the first unit of the matching signal stream emitted by the second unit, and possibly at the end of a given time delay duration, emission by the first unit of a stream of matching signals in the second mode of transmission.

l) analysis by the second unit of the unmodulated carrier signal frequency of said matching signal stream emitted by the first unit.

m) in case of recognition of said frequency at the time of stage 1), which therefore characterizes a request for resumption-adjustment in the second transmission mode, positioning the second unit to receive a stream of matching signals in the second transmission mode.

n) in case of validation by the second unit of reception of said matching signal stream, adjustment of the second unit to the second transmission mode, preferably by freezing the receiving filter coefficients adjusted to the new transmission support characteristics and adjusted to the second transmission mode.

o) emission by the second unit of a stream of matching signals in the second transmission mode in order to allow the first unit its adjustment to the second transmission mode.

p) analysis by the first unit of the unmodulated carrier signal frequency of said matching signal stream emitted by the second unit.

q) in case of recognition of this frequency, maintaining the position of the first unit in the second transmission mode which is being used.

r) in case of validation by the first unit of reception of said matching signal stream emitted by the second unit, adjustment of the first unit to the second transmission mode, preferably by freezing the receiving filter coefficients in order to be adjusted to the new transmission support characteristics.

s) renewal, in the second transmission mode, of exchanges of synchronizing signal streams, (for example, short streams in V27ter mode), possibly followed by application information without interruption of the logical levels of the communication protocol of the two units.

The process in accordance with the invention also allows one to manage the case where the resumption-adjustment protocol is not successful during a first attempt, or after initial modulation at increased speed (V29, see case No. 11, or even V27ter, see case No. 10) (but with no possibility of doubled modulation), or beginning with doubled initial modulation following successful preceding procedure of resumption-adjustment (case No. 10).

For this purpose the process is characterized in that the first and second units are equipped to effect the following stages after stages a) to g):

t) in case of non-recognition of the stream of matching signals by the first unit, possibly at the end of a given time delay duration, renewal by the first unit of emission of a matching signal stream in said transmission mode.

u) stages c) to j).

It can also be characterized in that it includes the following stage (case No. 12b and 13):

v) in case of non-recognition by the first unit, at the time of stage g of said sequence u) of the matching signal stream emitted by the second unit, and possibly at the end of a certain time delay, the last attempt made by the first unit according to t) and u) before breaking the connection between the two sets.

According to a preferred method of implementation, the process is characterized in that the units are equipped, after reception of the matching signal streams, to fix the coefficients of their receiving filter following convergence of the coefficients of said receiving filter and in that the units are equipped to inhibit any possible modification of the receiving filter coefficients during exchange of synchronizing signal streams during communication in order to preserve, independently of the transmission physical support characteristics, the values of the receiving filter coefficients which are calculated when the last matching signal stream is being received. This can be implemented during a resumption-adjustment procedure in the same transmission mode or in a doubled modulation mode.

According to the invention, the carrier signal is characterized in that the unmodulated carrier signal is a segment of protection against the echo used on satellite links. This allows, without modification of the modem units, maintenance of communication through resumption-adjustment at the physical level in the same modulation or in a doubled modulation. The frequency of this unmodulated carrier signal becomes characteristic of a request for resumption-adjustment. The signal, during communication and in the presence of evolving characteristics and/or unstable characteristics of the physical support (telephone line), authorizes a new adjustment of the units strictly at the physical level without disturbance or intervention of higher logical levels (screen, packet) of the communication protocol.

According to an advantageous variant, said validation of communication by the unit includes emission of a synchronizing signal stream which does not begin with an unmodulated carrier signal in order not to degrade the useful throughput rate during communication. This allows one to validate reception of the second matching signal stream exchanged in the transmission mode adjusted to the two units.

The invention also pertains to a unit for implementing the previously mentioned process and includes a processing unit, a modem, a line interface and a command bus between the processing unit and the modem, the command unit representing a sequencer to sequentially program said modem, characterized in that said sequencer is equipped to:

10-1) program initialization of resumption-adjustment, preferably following the sensing of reception by the modem of an erroneous synchronizing signal stream, without modifying the values or coefficients of the receiving filter.

10-2) programming emission by the modem of a matching signal stream preceded by an unmodulated carrier signal, preferably in the same modulation as said erroneous synchronization signal stream, said matching signal stream constituting a request for resumption-adjustment.

10-3) programming sensing by the modem of at least one unmodulated carrier frequency located at the beginning of a received matching stream, and placing the modem in half-duplex transmission mode corresponding to said carrier frequency in order to allow the modem to sense a request for resumption-adjustment to receive the other signals of said received matching stream and to set the receiving filter coefficients after reception of the matching stream.

10-4) validate the physical adjustment resumption in half-duplex in said transmission mode once the modem has emitted and received in a manner which is in accordance with a a said matching signal stream during communication by exchange of the matching signal stream, which then permits the unit to exchange synchronizing signal streams (short streams).

The sequencer can be equipped so that when the modem is in receiving mode, said sensing of at least one unmodulated carrier frequency is effected permanently and is effected, in case of such sensing, while the unit is in half-duplex communication configuration, as well as reception in a manner which is in conformity with a matching signal stream, in order to program emission by the modem of a stream of matching signals preceded by an unmodulated carrier signal, in the same modulation as said matching signal stream received in a proper manner and to validate resumption-adjustment in this same modulation.

One can also arrange to validate said emission of a stream of matching signals according to paragraph 10-2 when the modem has sensed at least one synchronizing stream in a main transmission mode, in order to achieve at least one attempt at matching in the main transmission mode and, if this is not possible, to validate emission of a stream of matching signals in accordance with 10-2 in a doubled transmission mode with half-duplex modulation which is more robust than modulation of the main transmission mode.

According to another variant, one can also arrange to validate said emission of a stream of matching signals in a main transmission mode in order to achieve at least one matching attempt in the main transmission mode, in order to effect at least one matching attempt in the main transmission mode and, in case of failure, to validate one such emission of a stream of matching signals in accordance with stage 10-2) in a double transmission mode according to half-duplex modulation which is more robust than modulation of the initial transmission mode.

The sequencer is preferably equipped to manage higher logical levels of the communication protocol with time delay for disconnection of higher duration than that of execution of the resumption-adjustment process. In modes V27 and V29, the standard envisages a time delay for repetition of level 2 (screen) which is rearmed during emission of a screen. This time delay (2.5 s) is determined by a counter in case there is sensing of an erroneous stream or absence of sensing. The maximum value of this counter can be modified, its nominal value being 10. With this value and in the most unfavorable case of resumption-adjustment, the maximum limit is never reached, and the transfer is only slowed down momentarily during the interaction with level 3 (packet).

BRIEF DESCRIPTION OF THE DRAWINGS

Other characteristics and advantages of the invention will be clear from reading the description which follows, which is given by way of non-limiting example, referring to the drawings which show.

DETAILED DESCRIPTION OF PREFERRED EMBODIMENTS

Figure 1A:
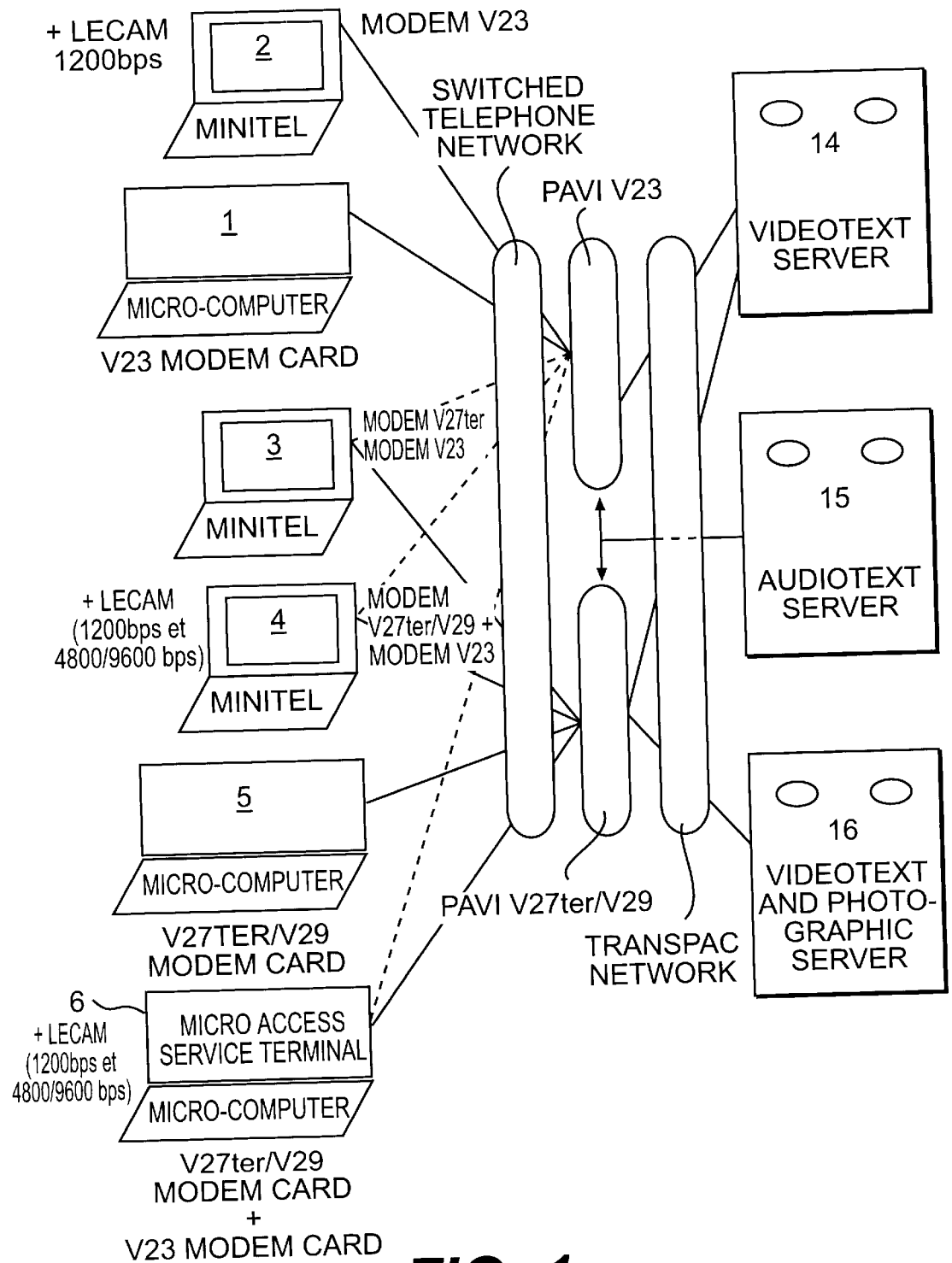
FIGS. 1a and 1b, a block diagram of a Teletel type transmission network illustrating different kinds of equipment and access points and a block diagram of a chart for equipping a terminal and placing an ETCD (data communication technical equipment) component in operation or a bus programmable modem and allowing one to implement the invention, FIGS. 2 to 20, cases 1 to 9 and 14, corresponding to different connection configurations, cases 10 to 13, corresponding to resumption-adjustment configurations in cases 15 to 20, corresponding to certain telephony switching configurations, the calling unit being in the left column, and the called equipment in the right column, FIGS. 21a to 21s for the R96-VFX modem, respectively, its programming in V29 mode (21a) and in V27ter mode (21b), the setting of its filter coefficients (21c), its programming in short stream mode (21d), its programming in transmission (21e) or receiving (21f) mode of a short stream or a long stream, in V29 or V27ter modulation, its frequency transmission programming (21g), successively for programming in transmission of one frequency and for stopping transmission of a frequency (21h), its programming in frequency sensing mode (21i), the programming coefficients of the filters FR1, FR2 and FR3 for sensing frequencies with the address in RAM memory of the coefficients as a function of the filters (21j), and the integration constants of the filters (21k), sensing 2100 Hz (21l), sensing 1300 Hz (21m), sensing 1800 Hz (21n), and sensing 1700 Hz (21o), the writing procedure in the RAM memory of the modem (21p), sensing a frequency with a filter (21q), validation of segment 1 (unmodulated carrier) in a given mode (21r) and validation of segments 3 and 4 (short stream or long stream) (21s).

In FIG. 1A, videotext servers 14, audiotext servers (voice) 15, videotext and photographic servers 16 connected to the Transpac network are accessible to users 1 to 6 by the switched telephone network via videotext access points (PAVI), V23 (asynchronous 7 bits plus parity bit, for example, dialing the number 3614 or 3615 in France) or even in V27ter and/or V29 mode (synchronous 8 bits). A terminal (V23), for example a microprocessor V23 1 or Minitel V23 2, can only allow access to a PAVI V23. On the other hand, a multi-modal terminal, for example a Minitel 3 (V23/V27ter) or 4 (V23/V27ter/V29), microprocessor 5 (V23/V27ter/V29) or microprocessor access service 6 V23/V27ter/V29, can have access to all PAVI units. A V27ter or V29 mono-modal terminal, for example a microprocessor 5, can have access to a V27ter or V29 corresponding PAVI.

Terminal 6 allows in particular a file transfer (STUTEL) and secure applications (LECAM: 1200 or 4800/9600 bps memory card reader). The invention therefore proposes a process which allows one to automate the connection procedures for mono-modal operation or even multi-modal operation in at least two modes.

The process according to the invention, while having the same behavior as in Minitel "full duplex" V23 connection authorizes and optimizes connection of the Minitel (ascending compatibility) via T.V.R. (V27ter and/or V29 high speed terminal) and via V23 access, without any particular action of the user (connection-end button), by automatic distinguishing the transmission speed. The discrimination of two modulations or three modulations rests on one or the other of two differentiating factors, the one to differentiate high speed from normal speed (V23), the other to separate the two retained modulations in high speed (V27ter/V29).

1) Physical establishment of communication.

During the evolution of the automatic response operation, the echo suppressors are neutralized by the 2100 Hz answer dial tone (see recommendation V25 of CCITT). The presence of this dial tone is justified for transmissions of the full-duplex or semi-full-duplex type as, for example, in V23. On the other hand, in half-duplex transmission, as in V27ter and V29, the devices which offer protection against echoes are actuated by a stop of the signal (silence) equal to or greater than 100 ms. During half-duplex or full-duplex transmission (V23), neutralization of these devices is maintained by the reappearance of the signal before expiration of a time delay of 75 ms + or −20 ms. These arrangements envisaged by the standards make sense only in the case of a satellite connection.

This difference at the level of the silence duration is utilized, according to the invention, to differentiate the V23 mode from the V27ter and V29 modes (first distinguishing factor). The specified values are the following:

silence of 75 ms + or −20 ms for V23 mode, silence of 150 ms + or −20 ms for V27ter/V29 high speed mode.

This first distinguishing factor has to be implemented only for equipment units which are capable of access to networks in the different types of duplex connection. One should note in particular that units in accordance with the invention can be envisaged, for example, to function only in V27ter and/or in V29 modes.

The first distinguishing factor can be implemented only for units which are envisaged to operate in V23 mode and in V27ter mode, or even in V23 mode and in V29 mode, in the case of the anticipated normal connection.

The second distinguishing factor, which allows one to identify two operating modes in half-duplex according to two different throughput rates, for example between V27ter and V29, is, according to the invention, the carrier signal frequency which is 1800 Hz in V27ter and 1700 Hz in V29.

According to the invention, an unmodulated carrier frequency signal is sent at the beginning of the long learning sequence (long stream). The unit which receives this signal senses its frequency and can automatically set its modem in the required mode (matching) or can even establish that it cannot operate in the modulation that has this carrier frequency. A long learning sequence then fulfills, according to the invention, the function of matching the two units at the same modulation.

According to a preferred method of implementation, segments which are used for echo suppression in satellite links are used as a distinguishing factor.

Indeed, these segments implement emission of an unmodulated carrier during a duration of 185 to 200 ms followed by a silence of 20 ms at the beginning of the long learning sequence (long stream); this emission corresponds to segments 1 and 2 described in V27ter and V29 recommendation of CCITT. In the prior art, the presence of these segments prior to learning sequences corresponds to the "start speaidng" mechanism on satellite links; indeed, the echo suppressor units utilize threshold detection systems which have a response time which is not negligible; it is to protect themselves from this response time that the "start speaking" mechanism, relying on segments 1 and 2, is used in satellite links.

The invention profits from recognition of the fact that the duration of segment 1 (185 to 200 ms) is compatible with the programming time of a modem, and in particular of its reception filter, which allows the anticipated application.

The speech beginning mechanism made available by the presence of segments 1 and 2 is thus in accordance with the invention separated from its first function to be used as the V27ter/V29 distinguishing factor. The V27ter and V29 modulations use different carriers: the V27ter carrier frequency is 1800 Hz and that of the V29 is 1700 Hz. By virtue of its capability of reliable sensing of dial tones by digital filtering, the ETCD component (or modem) allows one at the time of initial connection, as will be described subsequently, to distinguish these two frequencies when the long learning sequences are transmitted with segments 1 and 2. This then allows one to program the modem in the retained mode (matching), to correctly receive the corresponding long learning sequence. According to a preferred mode, a long learning sequence can be legitimately received only if its carrier frequency (segment 1) has been recognized by the receiving modem. If the carrier frequency is not recognized the learning sequence is sensed as non-conforming. The modem of a set is programmed to recognize the carrier frequency of the modulations that it can receive and transmit (for example, a unit which can not function in V29 does not necessarily recognize the 1700 Hz frequency, which allows efficient discrimination of different situations as will be described subsequently). According to the invention, segments 1 and 2 are not, on the contrary, used in the short learning sequences (synchronization) which are transmitted during each reversal of the modem in order not to slow down the useful throughput rate of communication.

One will recall that the exchange of data is made in packets. A packet transmitted in one direction is preceded by a short learning sequence (synchronization). Following reception of the package, the two modems are "reversed" so as to exchange their transmission-reception functions, and a packet is transmitted in the other direction preceded by a short learning sequence, and thus it continues.

2) Physical reestablishment during communication.

The mechanism which relies on the presence of fragments 1 and 2 allows one to implement the telephony data switching process. This alternation of using the telephone line in telephony mode and in data mode is currently available on M10-M12 models (V23 modulation) made by Minitel equipped with an integrated telephone set.

For V27ter and V29 modulations, at the time of return to connected mode (or data mode), the use of the same process with transmission of long learning sequences (and presence of segments 1 and 2) allows one to reliably manage physical reestablishment of communication in V27ter or V29 adequate modulation with a test in the fastest modulation. The application software must in this case control a context for the mode of reestablishing videotext V23 or V27ter/V29 communication in the absence of the normal speed/high speed distinguishing factor (silence duration). In addition, in high speed mode, contrary to the process of resumption and doubling, the communications software must totally reestablish the different higher levels (connection screen and calling packet).

For the record, let us recall that according to the prior art, in mode V23 the reconnection is of the simplified type by 600 ms sensing at less than 1300 Hz without searching for the 2100 Hz frequency; the error correction procedure is activated by the user.

The automatic processes of physical establishment of communication and reestablishment during communication permit one, in a preferred implementation, to automatically establish connection in three modulations and to return to connected mode for the telephony-data application.

The telephony-data application inherent in V23 is brought to high speed by introduction of the V27ter/V29 automatic connection process, which allows programmable alternations from speech mode to data mode, for example, for audiotext service or audio videotext service at 9600 bps.

3) Physical resumption during communication.

The process of physical resumption is employed especially during variations of the dimensions of the line or during disturbances which cause erroneous short sequences. It allows one to effect a new matching of units in the same modulation, allowing the resynchronization of modems at two ends as a function of the new line characteristics.

Because of the possibility of sensing the dial tone of the modem component during communication, it is possible to distinguish the unexpected presence of a carrier in the original modulation in V27ter or V29 transmission. This transition resumption mechanism is possible due to the presence of segments 1 and 2 of the long learning sequence indicating the beginning of the resumption process. The "speech initiation" mechanism is here also used as a signal indicating physical resumption, during communication, for example at the initiative of the distant unit.

The resumption mechanism can be based on the capability of receiving equipment, in the case of receiving one or several erroneous synchronizing short sequences (alternation), to effect a new matching at the physical level. During communication, indeed, asynchronism of two modems (non-convergence of the equalizers) can be caused by variations of the dimensions of the line or during disturbances over the telephone network. Contrary to the case of transmission in telephony mode, and in data mode, this connection phase is achieved only at the physical level without loss of connection of the higher level, which means at the screen and packet levels, and without modifying the parameters of these higher levels. This is made possible, as will be described subsequently, due to the fact that the time for establishing the new communication at the physical level, that is to say the time necessary for an exchange of long learning sequences, remains sufficiently short so that the automatic device which controls connection at the screen level and packet level remains in a data waiting mode. In other words, for the automatic device (screen/packet) everything occurs during a resumption phase, as if the other unit was slow in sending data.

It should be emphasized that the exclusive use of short learning sequences (without segments 1 and 2) to obtain a useful throughput rate which is appropriate to the envisaged applications is based on the hypothesis of a permanent transmission line (no permanently long learning sequence) and one with short distance (Minitel-PAVI).

4) Doubling the communication speed from V29 to V27ter.

Because of the possibility of dial tone sensing during communication and more particularly during resumption of communication, it is possible to distinguish the presence of a carrier in the doubling modulation (V27ter) in V29 transmission. This doubling mechanism is possible because of the presence and sensing by the receiving equipment of segments 1 and 2 of the long learning sequence which indicates the beginning of the doubling process and the employed modulation.

The speed doubling mechanism is based on the possibility offered by the receiving equipment, in the case of receiving an erroneous long learning sequence, during the resumption process in V29 modulation, of effecting resynchronization at the physical level of V27ter modulation modems. If the particularly difficult conditions of reception do not allow one to succeed in resuming communication in V29, it is then possible to effect resynchronization of the V27ter modems, considering the greater robustness of this modulation vis-a-vis line disturbances.

As in the case of physical resumption, the communication resumption and speed doubling mechanisms do not disturb the higher levels (screen and packet), although there has been a change of modulation.

These last two processes (resumption and doubling) offer the possibility of maintaining communication, specifically and at the physical level, even under difficult receiving conditions caused by disturbances which influence the quality of transmission support. At the application level they allow one to avoid interrupting the transmission prematurely, which is very important, especially in the case of file transmission; this automatic adjustment feature of V27ter/V29 transmission allows not only comfortable interactive communication no matter what the physical support is, but also vast and reliable information transfer.

The invention will now be described in a more detailed manner with examples corresponding to the modes of V23, V27ter and V29 transmission.

We will refer to the following documents as prior art:

recommendation V25 of CCITT (in particular the last paragraph of chapter 5, page 129), the connection procedure used in Minitel devices.

recommendation V27ter of CCITT (in particular the long and short learning sequences defined in table 3, page 202), recommendation V29 of CCITT (in particular the long learning sequence defined in table 5, page 221), appendix F of recommendation T104 of CCITT which allows one to normalize the short learning sequence in V29 with segments 1 and 2, which is necessary for the high speed function of the Minitel at 9600 bps, recommendation X32 of CCITT (in particular, LAPX screen and X25.3 packet synchronization, which is used in particular in the EBS (synchronous common input) Transpac network units, recommendation T71 of CCITT (particular features of LAPX), and for the high speed Teletel units (V27ter/V29):

recommendations T104 (or ETS 300221) and T105 (pr ETS 300223) of the CCITT,

STUPAV (technical specifications of videotext access point users) (version 1991) of France-Telecom, STUM (technical specifications of Minitel users (versions 2VRP, M1B, M2, and M12) of France-Telecom.

In order to improve convenience and speed in consulting Teletel services from a professional type Minitel unit there is a provision for increasing the transmission speed to 4800 bps and then to 4800/9600 bps between the Teletel access point and Minitel.

Some V27ter (4800 bps), V29 (9600 bps) modems of group 3 telecopy type are known (Rockwell R96 VFX). The transmission speed is 9600 or 4800 bps over the two channels, the modem operating alternately.

The real throughput rate of the PAVI-Minitel link is optimized by use of short learning sequences at each reversal of the modems, the short and permanent line characteristics of this connection allowing the utilization of this mode. The V27ter standard offers two types of learning sequence (long and short), but the V29 standard originally has only the long learning sequence. For this reason, based on the R96VFX component that the Rockwell company has developed, in collaboration with the applicant, the V29 short learning sequence [is] integrated in appendix F of the T104 recommendation of the CCITT.

The high speed communication protocol between PAVI and Minitel, at the establishment, management and releasing level, conforms to recommendations X25, X32 and T71 of the CCITT, to Transpac STUR and to recommendations T104 and T105 of the CCITT, as well as to base services of ETSI standard projects prETS 300 221 and ETS 300 223.

Physical connection procedure (line level).

The process of physical connection of the unit in accordance with the invention allows automatic adjustment of the transmission speed to that of the called unit, while offering the same process as in V23 connection and respecting recommendations V25 and V100 of the CCITT.

The main goal is to specify the physical connection processes of the Minitel V23/V27ter, of the V23/V27ter/V29 Minitel and the V27ter and V29/V27ter PAVI unit, with consideration of the following constraints:

optimize the connection times with the advanced Minitel units in terms of high speed V23/V27ter/V29, the V23/V27ter Minitel 2 photographic high speed and the V23/V27ter/V29 Minitel 2 high speed, and/or have a behavior compatible with the V29/V27ter PAVI access at 9600/4800 bps vis-a-vis terminals calling at 4800 bps or at 9600 bps (ascending compatibility), and/or allow connection of currently existing V27ter modem cards and control documents (for example, EBS Transpac), and/or automatically distinguish the connection of the Minitel to a PAVI V23 from that of a PAVI high speed V29/V27ter without any particular action required on the part of the user.

The retained basic principles are related to the possibilities of V27ter/V29 modems currently on the market (for example, the R96EFX/VFX) which, because of their internal signal processor, can also reliably ensure selective digital filtering functions.

The originality of the connection principle therefore rests on prior analysis of pure or tone signal frequencies present in the telephone connection. Indeed, before any attempt at connection a sensing of the tone signals allows one to discriminate the carrier frequencies of the V27ter, V29 modulations and the standby frequency of V23 modulation (1800 Hz, 1700 Hz and 1300 Hz respectively), or even telephone signalling (440 Hz rate). The unmodulated frequencies in V27ter and V29, with duration of 187.5 ms for the R96VRX correspond to the first segment of the long learning sequence (see recommendation V27ter and V29 for significance of the short and long learning sequence segments).

Also, the originality of the resumption-adjustment principle rests on analysis during communication of carrier frequencies of the V27ter, V29 modulations which allow resumption of the physical level (synchronization of the modem clocks) without disturbing the higher levels, either during variations of line dimensions or at the time of disturbances, and more generally in any case which causes erroneous short learning sequences, or on order of one of the units.

It should be emphasized that the complete resumption mechanism, which causes a change and especially a doubling of modulation (V29→V27ter), keeps the parameters of the higher levels (for example, the packet level anticipation window) conducting with a slight decrease of interactivity.

Based on this principle of tone signal sensing by digital filtering, this operation especially allows the Minitel V23/V27ter/V29 to adjust, rapidly and reliably, their transmission speed vis-a-vis a distant unit (V23, V27ter, V29) and vis-a-vis the used line (dimensions, disturbances, etc.).

The characteristic tone signals sensed by the modem in connection phase are:

440 Hz to sense telephone signalling,

1300 Hz to allow control of V23 connection,

1700 Hz to sense the V29 unmodulated carrier,

1800 Hz to sense the V27ter unmodulated carrier,

2100 Hz to control recommendation V25 of the CCITT.

The characteristic tone signals sensed in communication phase for possible resumptions at the physical level are:

1700 Hz to sense the V29 unmodulated carrier (resumption in V29),

1800 Hz to sense the V27ter unmodulated carrier (resumption in V27ter).

One can distinguish two cases: the operating principle for the called unit and that for the calling unit. It is the modem of the called unit which, after an incoming call, responds in the known manner by the 2100 Hz tone signal (see recommendation V25). In general the PAVI access point is the called unit, the Minitel is the calling unit. On the other hand, establishment of physical connection can be obtained, as will be seen subsequently, over one or the other of the units, based on the particular case, after an error-free exchange of long matching streams: the first unit sends a long matching stream; if the second unit receives it correctly it transmits in turn a long matching stream; if the first unit receives it correctly communication is established at the physical level, which is seen by transmission by the first unit of a short synchronizing stream, followed by data, or of signals to establish communication at the screen level, then returning to the packet level, in the known manner.

The equipment structure of the V27ter modem access of the high speed PAVI units (in general, called unit) is based on the Rockwell R96EFX box. That of the second generation PAVI high speed V29/V27ter access is based on possibilities that are at least equal to the R96VFX box (digital filtering capability, V29 short stream . . . ).

For the PAVI high speed access being called only at 9600/4800 bps, only sensings of the carrier frequencies of the V27ter (1800 Hz) and V29 (1700 Hz) modulations are necessary at this level.

Figure 1B:
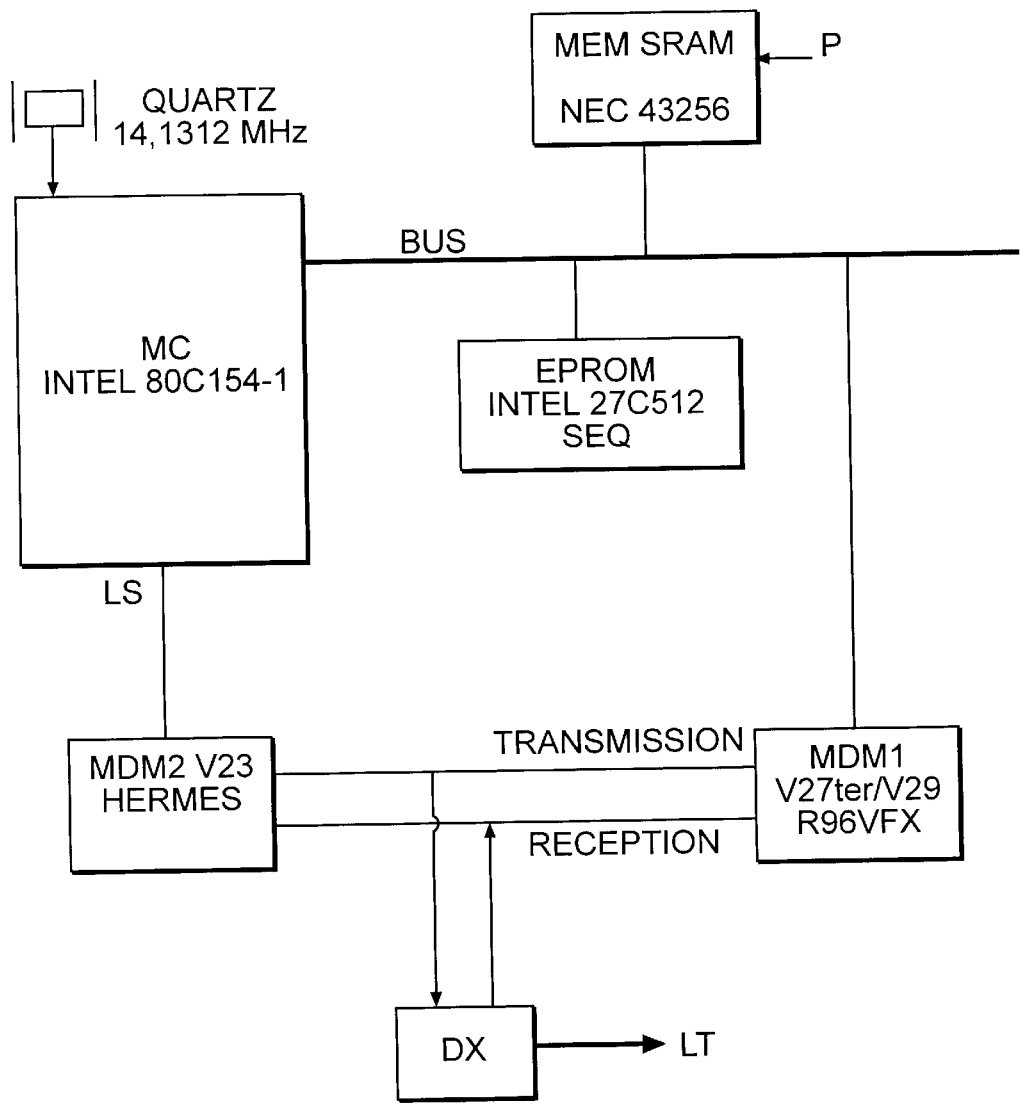

A block diagram of a V23/V27ter/V29 Minitel high speed chart in accordance with the invention is given in FIG. 1B. It includes an Intel 80C154-1 micro-controller connected by a BUS connection to an NEC 43256 32 kilobyte SRAM memory which has a safeguard P battery to a programmable read-only memory EPROM made by Intel company 27C512 at 64 kilobytes and to a MDM1 modem made by the Rockwell company R96VFX (V27ter/V29). The micro-controller is connected to a V23 (Alcatel) Hermes MDM2 modem through the intermediary of a TTL type LS series connection. The outputs of the MDM1 and MDM2 modems are applied to the inputs of a DX duplexer for connection with a telephone line. It will be understood that one such Minitel card can operate in V27ter/V29 only by suppressing the MDM2 modem. A Minitel card operating only in V27ter can be made by using a R96EFX modem as the MDM1 modem.

Sensing in connection phase:

1700 Hz and 1800 Hz sensing filters are connected in the V29 or V27ter long learning sequence. The receiving mode is active following transmission of 3.3 seconds of 2100 Hz followed by a silence of 150 ms plus or minus 20 ms.

The PAVI programs the modem in V29 receiving mode for reception of the complete long learning sequence (conditioning segment) for reception of segment 1 of the long learning sequence (identification during at least 100 ms of the unmodulated 1700 Hz frequency). The PAVI then changes to transmission for sending the corresponding long learning sequence (segments 1 to 5). Physical connection is established in V29 modulation.

The PAVI programs the modem in V27ter receiving mode for reception of the complete long learning sequence during reception of segment 1 of the long learning sequence (detection of at least 100 ms of the unmodulated 1800 Hz frequency). The PAVI then changes over to transmission to send the corresponding long learning sequence. Physical connection is established in V27ter modulation.

Two cases will be considered depending on whether the unit includes a V29/V27ter modem or only the V27ter unit.

a) The case of a V29/V27ter modem (such as the R96VFX).

Without receiving a known frequency, at the end of a time delay of 2 seconds following the end of transmission of the 2100 Hz tone signal, the PAVI V29/V27ter engages the following processing by default:

it sends a V29 long learning sequence, without answer from the distant unit at the end of 2 seconds, it renews sending a V29 long learning sequence, without answer from the distant unit at the end of 2 seconds, it makes a last attempt to connect in V29 mode by a new sending of a V29 long learning sequence, with no answer from the distant unit, connection attempt is made in the V27ter mode by sending one V27ter long learning sequence, without response from the distant unit at the end of 2 seconds, a short V27ter learning sequence is sent, then there is a complete renewal of the mechanism described in the two preceding indented paragraphs (long stream+ short stream) until expiration of the connection wait time delay (in general 40 seconds) or until response of the distant unit.

b) The case of a V27ter modem (such as the R96EFX).

Without receiving a known frequency, at the end of a time delay of 2 seconds following the end of transmission of the 2100 Hz tone signal, the PAVI exclusively in V27ter modulation carries out the following processing:

it sends a V27ter long learning sequence, without answer from the distant unit at the end of 2 seconds, it sends a V27ter short running sequence, then there is complete renewal of the mechanism described in the two preceding indented paragraphs (long stream+ short stream) until expiration of the disconnection time delay or until response of the distant unit.

Principle of sensing in communication phase (resumption process):

Two processes are considered as a function of the influence of line disturbances and real time variations of the dimensions of the transmission line:

resumption mechanism in V29 original modulation (case No. 11) or in V27ter modulation (case No. 10), V27ter modulation doubling mechanism with V29 original modulation (case No. 12 and 12b).

The hardware structure of the photographic high speed Minitel 2 and of the high speed Minitel 2 (in general the calling unit) is based on the R96 VFX modem box made by Rockwell and on the Hermes box or its equivalent, the SGS-Thomson ST7514 box. In fact, these Minitel units can be connected just as well to Teletel V23 and V27ter ports. Only the 2100 Hz, 1300 Hz and 1800 Hz tone signals are then sensed in connection phase. In addition, the 1800 Hz tone signal is sensed in communication phase in order to ensure a process of resumption-adjustment on an erroneous short stream.

It is possible to discriminate between V23 and V27ter modes exclusively with the first distinguishing factor (nominal duration of silence of 75 or 150 ms), and therefore not to sense the 1800 Hz frequency. Reception of a V27ter long learning sequence is effected on segments 3 to 5 exclusively, the modem having been placed in this mode following sensing of a 150 ms silence.

The V23/V27ter/V29 high speed Minitel units must be capable of being connected equally to Teletel V23, V27ter and V29/V27ter gates. As a consequence, the 2100 Hz, 1300 Hz, 1700 Hz and 1800 Hz tone signals are sensed in connection phase. In addition, the 1700 Hz and 1800 Hz tone signals are sensed in communication phase in order to ensure the physical resumption-adjustment process. The 440 Hz tone signal can be looked for permanently in order to monitor telephone signalling.

By touching the connection/end button, the Minitel is in connection phase with line capture and is able to sense the 2100 Hz, 1800 Hz, 1700 Hz and 1300 Hz frequencies, the 440 Hz frequency is searched for if there is enough energy present in the line, without the presence of the preceding frequencies. These frequencies are validated if the signal duration is at least equal to 300 ms for the 2100 Hz, 80 ms for the 1300 Hz, 100 ms for the 1700 Hz and 100 ms for the 1800 Hz.

The photographic high speed Minitel 2 transfers in V23 modulation if:

300 ms of 2100 Hz are sensed followed by 75 ms (+ or −20 ms) of silence then by 80 ms of 1300 Hz, the 2100 Hz frequency is not sensed, but the 1300 Hz frequency is sensed during 1.7 s(or 1.8 s from the M2).

This behavior meets demands of STUM recommendations for all handling and connection in V23 modulation.

The photographic high speed Minltel transfers in V29 modulation and transmits its long learning sequence if:

upon reception of the 2100 Hz frequency, the silence which follows is 150 ms (+/−20 ms) knowing that the most rapid modulation of the Minitel is V29, segment 1 of the long learning sequence (187.5 ms of 1700 Hz validated during 100 ms) is sensed by the digital filter; the Minitel programs the modem in V29 receiving mode for reception of the complete long learning sequence. Physical connection is established by programming the modem in V29 modulation in the mode of short learning sequences, following transmission of the V29 long learning sequence, it senses three consecutively erroneous short V29 sequences (resumption process).

The Minitel which is advanced in terms of high speed transfers in V27ter mode and transmits a long learning sequence if:

upon reception of the 2100 Hz frequency the silence which follow s is 150 ms (+/−20 ms) knowing that the most rapid modulation of the Minitel is V27ter, segment 1 of the long learning sequence (187.5 ms of 1800 Hz validated during 100 ms) is sensed by the digital filter, the Minitel programs the modem in V27ter receiving mode for reception of the complete long learning sequence. Physical connection is established by programming the modem in V27ter modulation in the mode of short learning sequences, following transmission of the V27ter long learning sequence.

upon reception of the 2100 Hz frequency, the silence which follows is 150 ms (+/−20 ms) knowing that the fastest modulation of the Minitel is the V29. The Minitel then emits the V29 long learning sequence. If at the end of a 10 s time delay the correspondent (in general a PAVI access point) has not transmitted its known frequency, the Minitel programs the mode in V27ter receiving mode in order to detect the presence of an incomplete V27ter learning sequence (absence of segments 1 and 2, as is the case for EBS). To do this it suffices to suppress in the sequencing the logical condition of sensing of segments 1 and 2. Validation of reception of a suitable long stream is effected in the traditional manner, on segments 1 to 5. Upon recognition of the incomplete V27ter long stream the Minitel trasmits and responds the complete V27ter long learning sequence (there is no disadvantage in transmitting segments 1 and 2) and communication is established in V27ter modulation, in the mode of short learning sequences, upon reception of the 2100 Hz frequency the silence which follows is 150 ms (+/−20 ms) and the most rapid modulation of the Minitel is the V29, the Minitel then emits the V29 long learning sequence. If the Minitel senses the presence of the unmodulated frequency (or segment 1) of the V27ter (187.5 ms of 1700 Hz validated during 100 ms), it then programs the modem for reception of the V27ter long learning sequence. In response to the complete V27ter long learning sequence, the Minitel transmits the complete V27ter long learning sequence. Communication is established in V27ter modulation, in the mode of short learning sequences.

consecutive sensing by, for example, three erroneous V27ter short sequences or, for example, by three erroneous V29 short sequences followed by one or two erroneous V29 long sequences (process of resumption).

According to the invention, a long learning sequence (segments 1 to 5) is preceded by transmission of, for example, 180 to 200 ms of unmodulated carrier (segment 1) followed by 20 ms of silence (segment 2). Emission of the long learning sequence is conditioned for the calling unit:

For V29 modulation:

either by recognition of the 2100 Hz frequency during 300 ms followed by a silence greater than 150 ms, or by recognition of the 1700 Hz frequency during 100 ms followed by recognition of the V29 long learning sequence transmitted by the called unit modem, or by recognition of the 1800 Hz frequency during 100 ms followed by recognition or not of the V27ter learning sequence transmitted by the called unit modem, or by consecutive sensing of three erroneous V29 short learning sequences (process of resumption).

For V27ter modulation:

either by recognition of the 1800 Hz frequency during 100 ms followed by recognition of the V27ter long learning sequence transmitted by the called unit modem, or by recognition of the 1700 Hz frequency during 100 ms followed by non-recognition of the V29 long learning sequence, uncontrolled modulation by the calling unit, or only by recognition of the V27ter long learning sequence received without presence of segments 1 and 2 (case of EBS), or by consecutive sensing of three erroneous V27ter short learning sequences (process of resumption), or by consecutive sensing of three erroneous V29 short learning sequences followed by an erroneous V29 long learning sequence (process of resumption).

For the called unit, transmission of a long learning sequence (matching) is also always preceded by transmission of 180 to 200 ms of unmodulated carrier (segment 1) followed by 20 ms of silence (segment 2). Transmission of the long learning sequence is conditioned:

For modulation V29:

either by recognition of 100 ms of 1700 Hz carrier followed by sensing of the V29 long learning sequence, or by expiration of the time delay of 2 seconds waiting for the tone signal, or by consecutive sensing of three erroneous V29 short learning sequences (process of resumption).

For V27ter modulation:

either by recognition of 100 ms of 1800 Hz carrier followed by detection of the V27ter long learning sequence, or by expiration of the 2 second time delay for tone signal waiting, or by recognition of a V27ter long sequence of learning without presence of segments 1 and 2 (case of EBS), or by consecutive sensing of three erroneous V27ter short learning sequences (process of resumption), or by consecutive sensing of at least one, and for example three sequences, of erroneous V29 short learning sequences followed by one or two erroneous V29 long learning sequences (process of resumption).

In order to transmit a short learning sequence (synchronization) which characterizes connection at the physical level, the two following conditions must be combined:

having recognized the long learning sequence sent out by the distant modem, having sent its own long learning sequence.

The modems of the two units are synchronized and the exchanges are effected then in the mode of short learning sequences.

During communication, if the modems get out of sync, the process of resuming connection calls for returning to the long learning sequences either in the same modulation or in V27ter in case of a synchronization and failure of resumption in V29 modulation (doubling process).

Diagrams of the different types of connection.

We have identified six configurations (see cases No. 3 to 9) of high speed connection considering the diversity of the Minitel V23, V23/V27ter, V23/V27ter/V29 and PAVI V23, V27ter, V29/V27ter units. In addition, we have studied the configuration (see FIG. No. 14) for connection of the Minitel at the Transpac synchronous common inputs.

Each case is the object of a diagram allowing one to visualize the sequence of the physical connection process and to evaluate the connection time.

Anticipated connection is the name given to any semi-automatic or manual connection in which the calling unit recognizes 300 ms of 2100 Hz. The order for connection (for example, pressing the connection-end button or sending a sequence in Minitel protocol) arrives before the 300 last milliseconds of the 2100 Hz tone signal in line management software.

Delayed connection is the name given to any connection (a priori manual) in which the calling unit cannot recognize 300 ms of 2100 Hz. The order for connection arrives in the line management software in the 300 last milliseconds of the 2100 Hz tone signal or later.

V23/V27ter unit or V23/V27ter/V29 unit is the name given to any called equipment unit, or a PAVI high speed unit, Minitel used in so-called "frontal" mode (micro-PAVI), or any apparatus that can be called and is able to respond in accordance with the specifications of this document. We can state that the behavior of the calling unit can just as well be applied to the Minitel terminal as well as to the PAVI terminal.

Segments 1 to 5 of a V27ter or V29 learning sequence are the following (according to CCITT recommendations):

Segment 1: unmodulated carrier

Segment 2: no energy transmitted

Segment 3: continual 180° phase inversions

Segment 4: conditioning sequence of the equalizer: 2 phases of 0° and 180°

Segment 5: continual emission of mixed "1"s.

SI=standard unit interval of the throughput rate; the durations of segments 3 to 5 are expressed in unit intervals.

On the diagrams the abbreviations represent respectively:

TL: long learning sequence or long stream (establishment of matching)

TC: short learning sequence or short stream (synchronization)

TLV27: V27ter long learning sequence or V27ter long stream

TLV29: V29 long learning sequence or V29 long stream

TCV27: V27ter short learning sequence or V27ter short stream

TCV29: V29 short learning sequence or V29 short stream

TLV27: segment 1: 185 to 200 ms of unmodulated carrier; segment 2: 20 to 25 ms without transmitted energy; segment 3: 50 SI (unit intervals); segment 4: 1074 SI; segment 5: 8 SI TC V27: no segments 1 and 2; segment 3: 14 SI; segment 4: 58 SI; segment 5: 8 SI TL V29: segment 1: 185 to 200 ms; segment 2: 20 ms; segment 3: 128 SI; segment 4: 384 SI; segment 5: 48 SI TC V29: no segments 1 and 2; segment 3: 100 SI; segment 4: 62 SI; segment 5: 18 SI.

The nominal duration of the learning sequences is from:

TL V27=915 ms (including segments 1 and 2),

TL V29=441 ms (including segments 1 and 2),

TC V27=50 ms (without segments 1 and 2),

TC V29=75 ms (without segments 1 and 2).

Physical connections are established after the exchange between the two ends, of the long learning sequences, during passage of short learning sequences in order to establish connections of the LAPX screen and X25.3 packet levels.

The summary table of the physical and resumption connection types (cases 1 to 14) is given here:

Summary of the physical and resumption connection types

| Caller | Called | Mode | Case No. |
| --- | --- | --- | --- |
| V23 | V23 | Anticipated | 1 |
| V23 | V23 | Delayed | 2 |
|  | V23 |  | 1 |
| V27ter/V23 | V27ter | Anticipated | 3 |
|  | V29/V27ter |  | 3 |
|  | V23 |  | 2 |
| V27ter/V23 | V27ter | Delayed | 4 |
|  | V29/V27ter |  | 5, 5b |
|  | V23 |  | 1 |
| V29/V27ter/V23 | V27ter | Anticipated | 6 |
|  | V29/V27ter |  | 7 |
|  | V23 |  | 2 |
| V29/V27ter/V23 | V27ter | Delayed | 4b |
|  | V29/V27ter |  | 8, 9 |
| V27ter/V23 | V27ter | Resumption | 10 |
| V29/V27ter/V23 | V27ter | Resumption | 10 |
|  | V29/V27ter |  | 11 |
| V29/V27ter/V23 | V29/V27ter | Resumption with change of mode | 12, 12b |
| V29/V27ter/V23 | V29/V27ter | Failure | 13 |
| V29/V27ter/V23 V27ter/V23 | EBS Transpac | Anticipated | 14 |

The time estimates for connection as a function of connection modulations, calling units (for example, the Minitel) and called units, are the following (see the summary table):

connection in V23 modulation (including transmission of the connection sequence 13, 53):

Case No. 1—connection anticipated at 1200/75 bps of a V23/V27ter/V29 unit (Minitel) to a V23 unit→0.9 s Case No. 2—delayed connection at 1200/75 bps of a V23/V27ter/V29 unit (Minitel) to a V23 unit→2.1 s Note: The connection time is 1.8 s from the Minitel 2.

The attempt to connect a V23 unit to a V27ter or V27ter/V29 unit makes no sense and will inevitably result in failure to connect. The same is true for a V27ter or V27ter/V29 unit calling in V23 exclusively.

In these cases the telephone line automatically disconnects after a certain delay time (40 seconds).

Connection in V29 modulation:

Case No. 7—connection expected at 9600 bps of a V23/V27ter/V29 unit (Minitel) to a V27ter/V29 unit→1.38 s Case No. 8—delayed connection at 9600 bps of a V23/V27ter/V29 unit (Minitel) to a V27ter/V29 unit→0.9 to 3 s Connection in V27ter modulation:

Case No. 3—connection expected at 4800 bps of a V23/V27ter unit (Minitel) to a V27ter or V27ter/V29→2.4 s Case No. 4—delayed connection at 4800 bps of a V23/V27ter (Minitel) or V23/V27ter/V29 unit to a V27ter unit→1.9 to 3.9 s Case No. 5—delayed connection at 4800 bps of a V23/V27ter unit (Minitel) to a V27ter/V29 unit→1.9 to 9 s Case No. 6—connection expected at 4800 bps of a V23/V27ter/V29 unit (Minitel) to a V27ter unit→2.9 s Case No. 14—connection at 4800 bps of a V23/V27ter/V29 unit (Minitel) or V23/V27ter unit to EBS Transpac→15 2.

Figure 2:
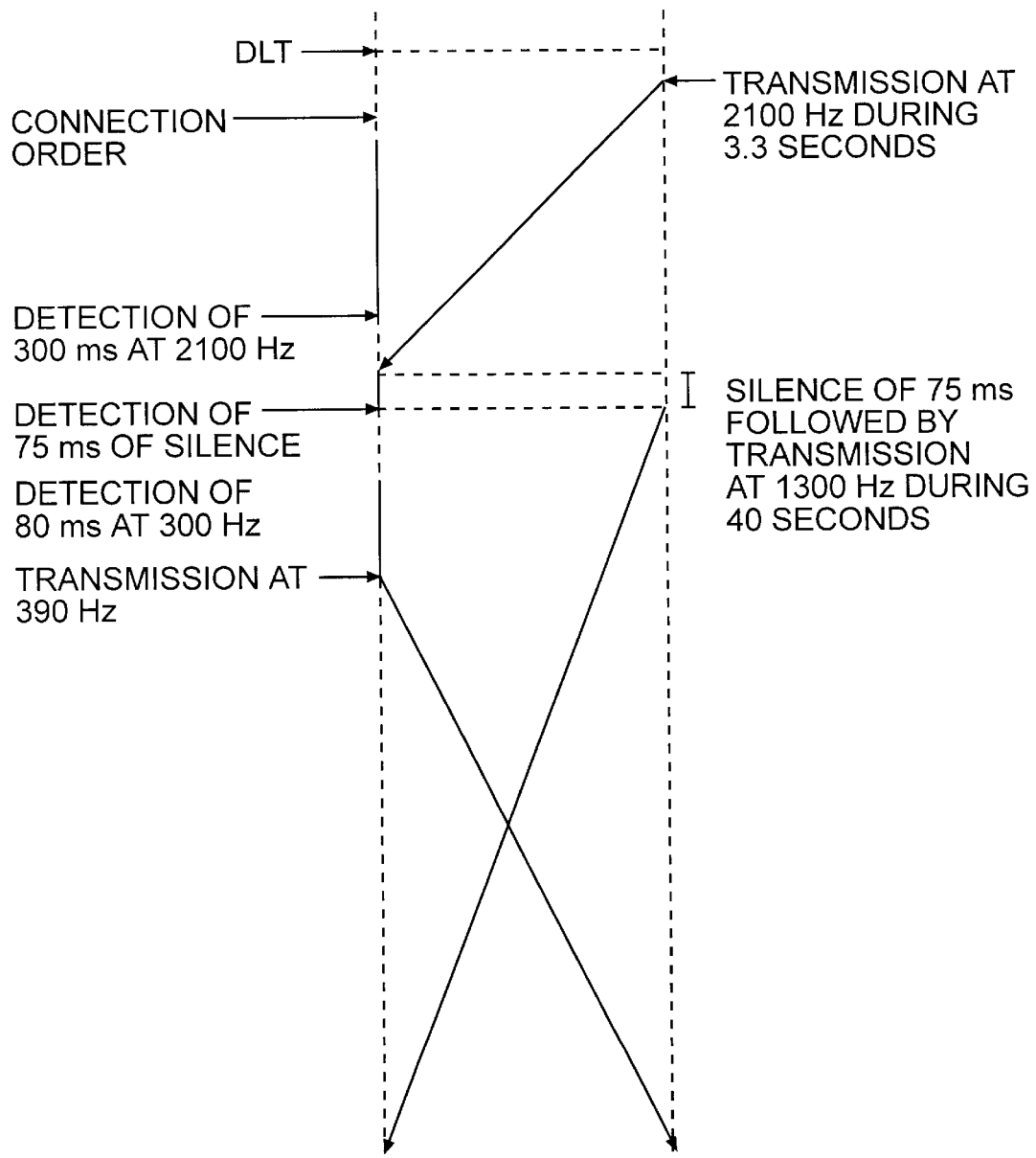

In case No. 1 (FIG. 2) following consecutive connection to a DLT request to which the called unit responds in 3.3 s at 2100 Hz, the connection order emitted by the Minitel calling unit which functions only in V23 mode, or even in V23 and V27ter mode, or yet again in V23, V27ter and V29 mode, is followed by detection by the latter of which the modem is in receiving mode for at least 300 ms of the 2100 Hz frequency emitted during 3.3 s by the called V23 unit (PAVI). Detection in accordance with the invention of 75 ms of silence following emission at 2100 Hz allows one to validate the procedure of connection according to the V23 mode (detection by the calling unit of at least 80 ms of a signal at 1300 Hz emitted during 40 seconds by the PAVI-V23, and emission by the calling unit of a frequency of 390 Hz, in establishment of connection in full-duplex).

Figure 3:
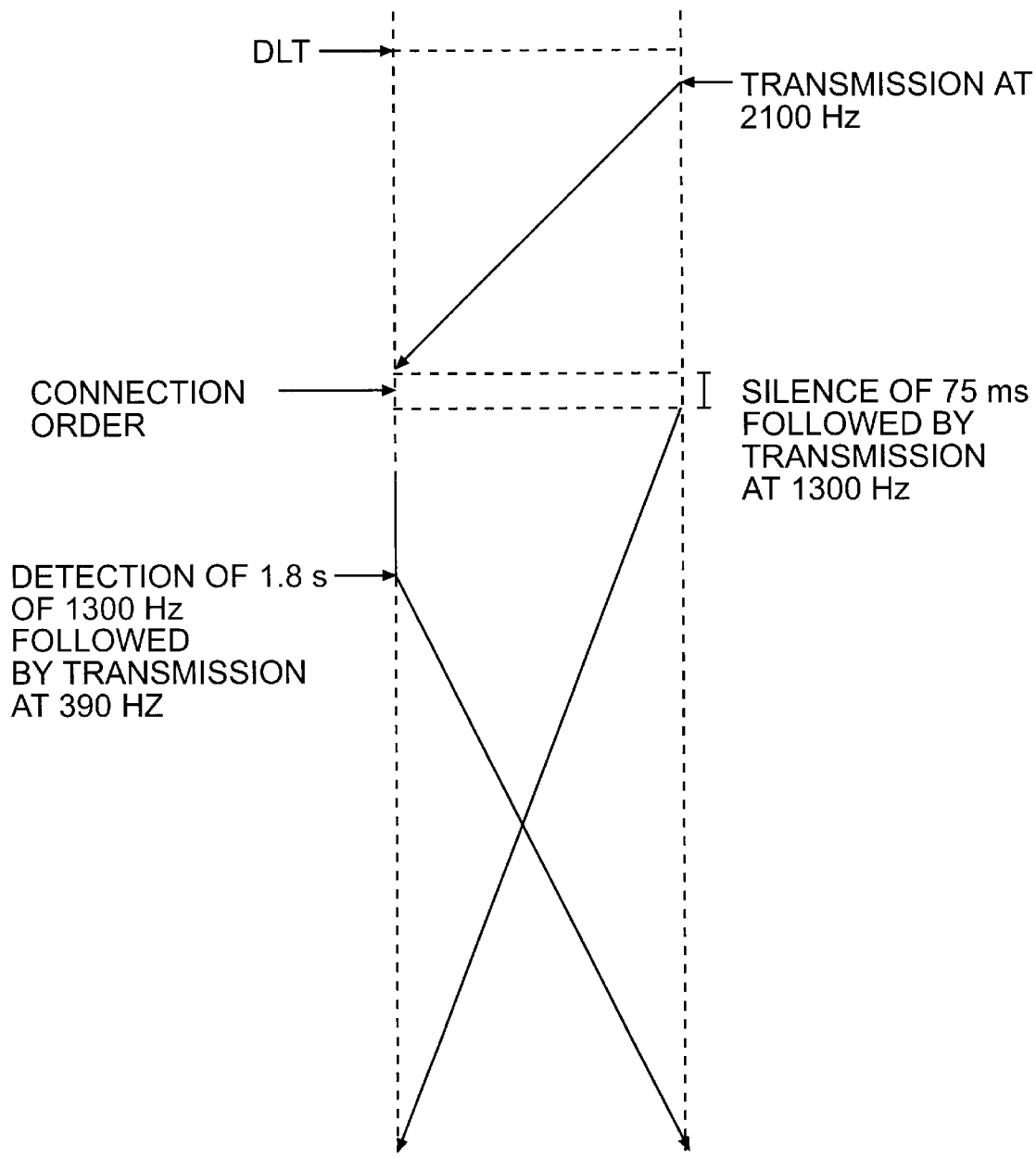

Case No. 2 (FIG. 3) corresponds to delayed connection. The connection order occurs after the end of the 2100 Hz emission (or too late so that the calling unit can detect 300 ms of the 2100 Hz frequency). In this case the calling unit identifies a called V23 unit by a detection time of 1.8 seconds of 1300 Hz signals.

Figure 4:
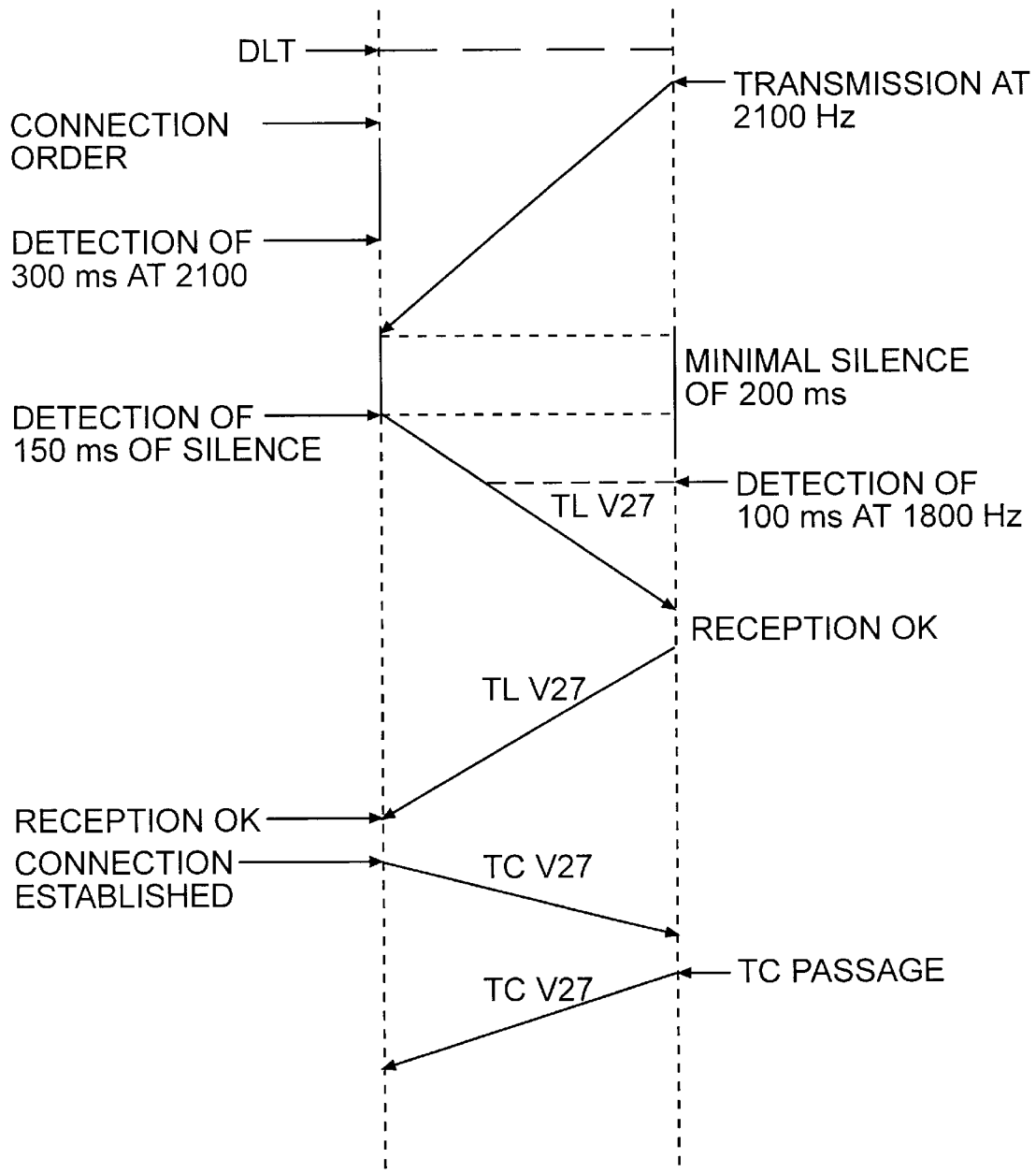

Case No. 3 (FIG. 4) corresponds to anticipated connection of a V23/V27ter Minitel to a unit which responds in V27ter mode. Following detection of 300 ms at a frequency of 2100 Hz, the calling unit detects a silence of 150 ms which indicates that the communication will not be in V23 mode. The calling unit sends a TL V27 long stream (including segments 1 and 2) and the called unit detects the carrier frequency (1800 Hz) which characterizes V27ter mode (detection of 100 ms of 1800 Hz of segment 1). The called unit (for example, PAVI V27ter or V27ter/V29) places (if necessary) its modem in V27ter mode and then emits a TL V27 long stream (including segments 1 and 2) which is received by the calling unit. If this reception is valid the connection is established (each unit has emitted and received a TL V27 long stream) and the communication is established by an exchange of TC V27 short streams in V27ter mode (without segments 1 and 2). At the time of the exchange of TC V27, a short stream connection is established first at the screen level (LAPX), then at the packet level (X25) in the known manner.

Figure 5A:
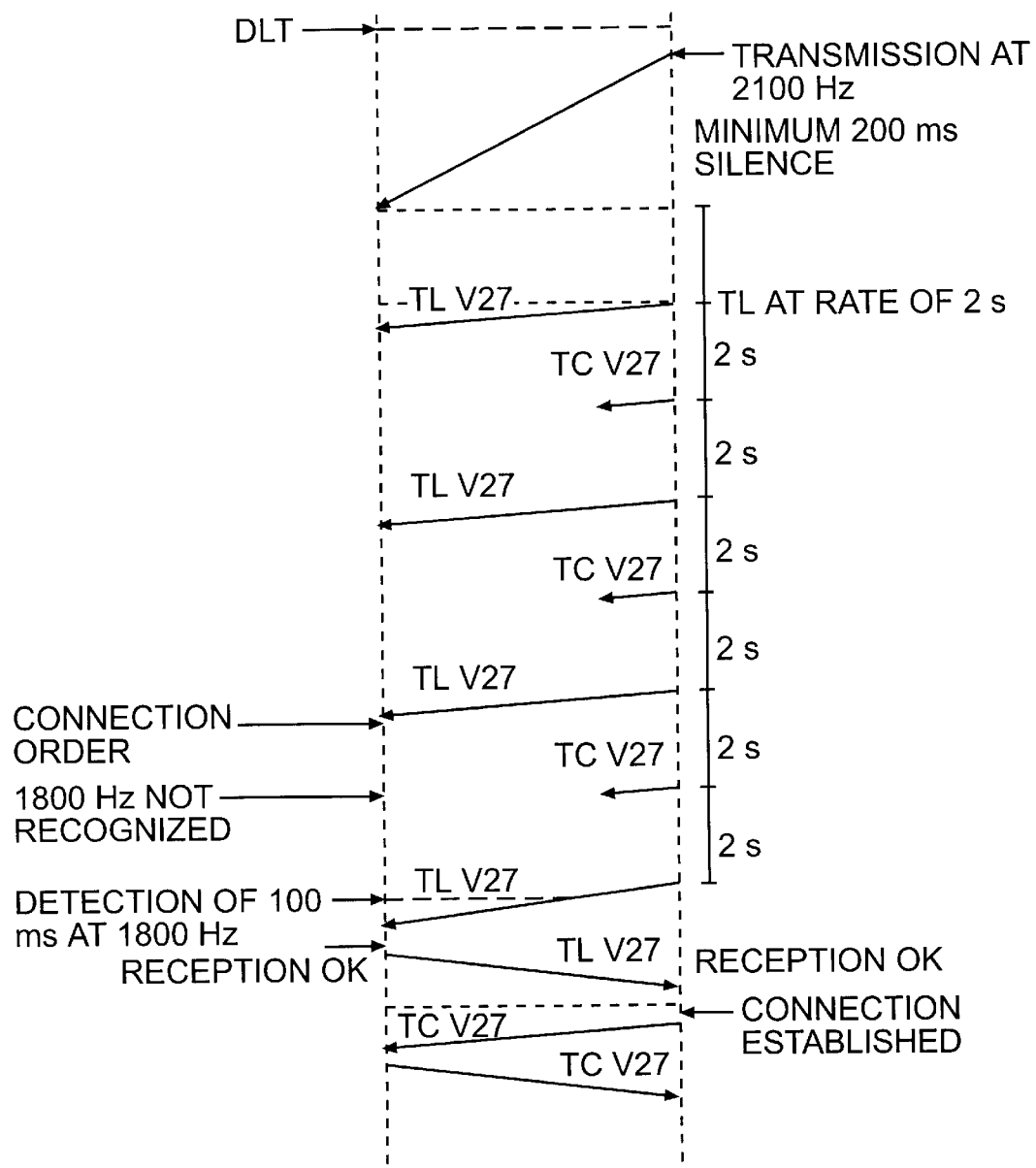

Case No. 4 (FIG. 5a) corresponds to a delayed connection to a V27ter unit. At the time of a connection order and without transmission of the calling unit, the called unit emits, after a time interval of 200 ms following the end of transmission of 2100 Hz (3.3 s), an alternation of TL V27 long streams and TC V27 short streams at a rate of 2 seconds (until a 40 second delay time duration passes after which, in absence of successful connection, the called unit automatically releases the link).

Following the connection order, the calling unit in receiving mode detects 100 ms of the 1800 Hz frequency of the TL V27 long first stream that it receives, and subsequent to this reception it sends in turn a TL 27 long stream which is received by the called unit. The connection is established at the physical level, each of the units having transmitted and received a V27 long stream.

Communication continues in V27ter mode by exchange of TC V27 short streams and establishment of synchronization of the higher levels (screen and package).

Figure 5B:
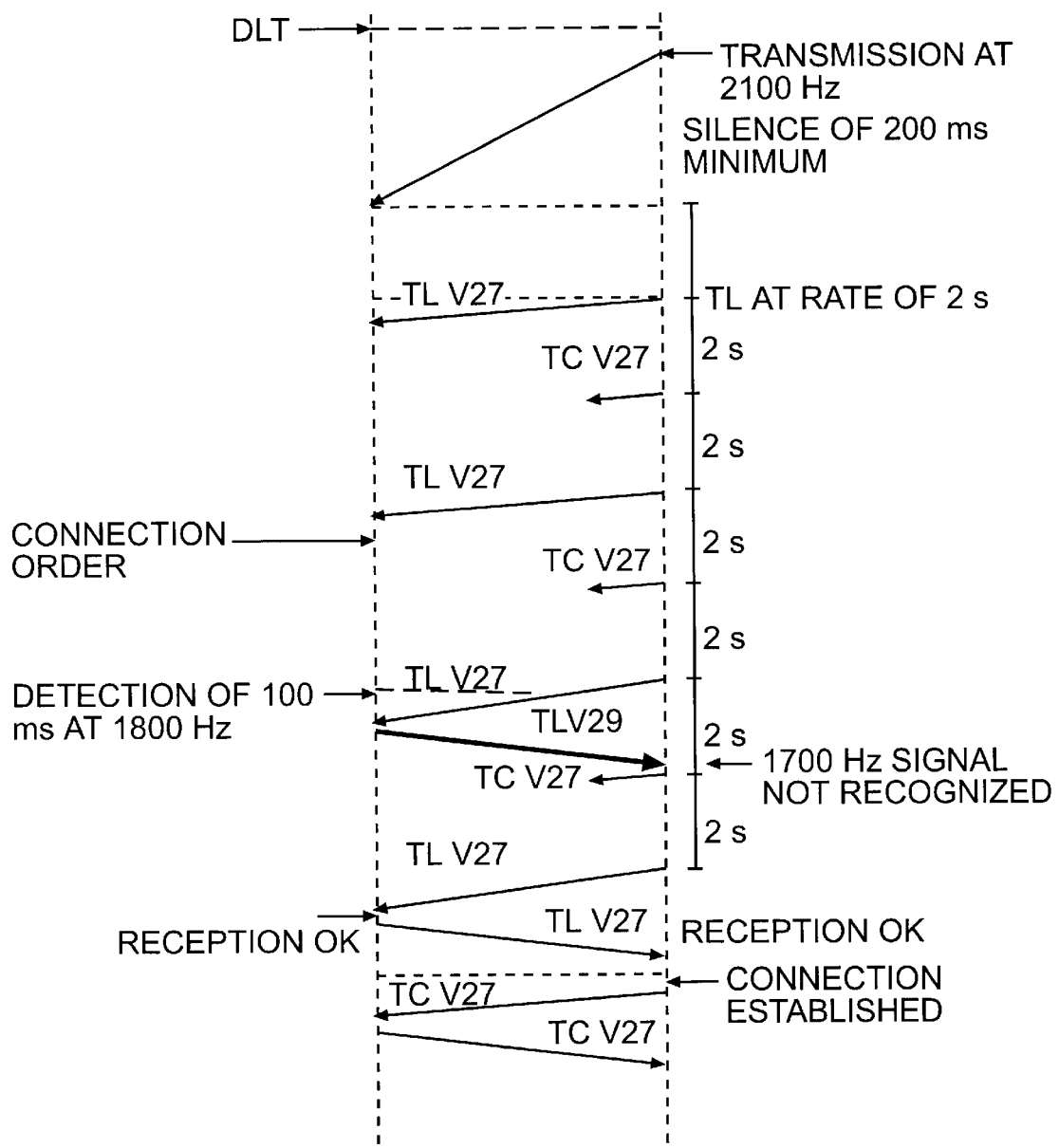

Case No. 4b (FIG. 5b) differs from the preceding one in that the calling Minitel functions in at least the V27ter/V29 modes, while the called unit does not function in V29 mode. The calling unit detects the 1800 Hz characteristic frequency of the V27ter mode, but in response it sends a V29 long stream on this occasion to make a connection attempt in V29. The called unit does not recognize the V29 long stream, transmits a V27ter long stream again, to which the calling unit responds by a V27ter long stream, which allows connection to be made. This procedure allows one to verify whether or not the called unit is capable of connecting in V29 mode (see case No. 9 subsequently).

Figure 6A:
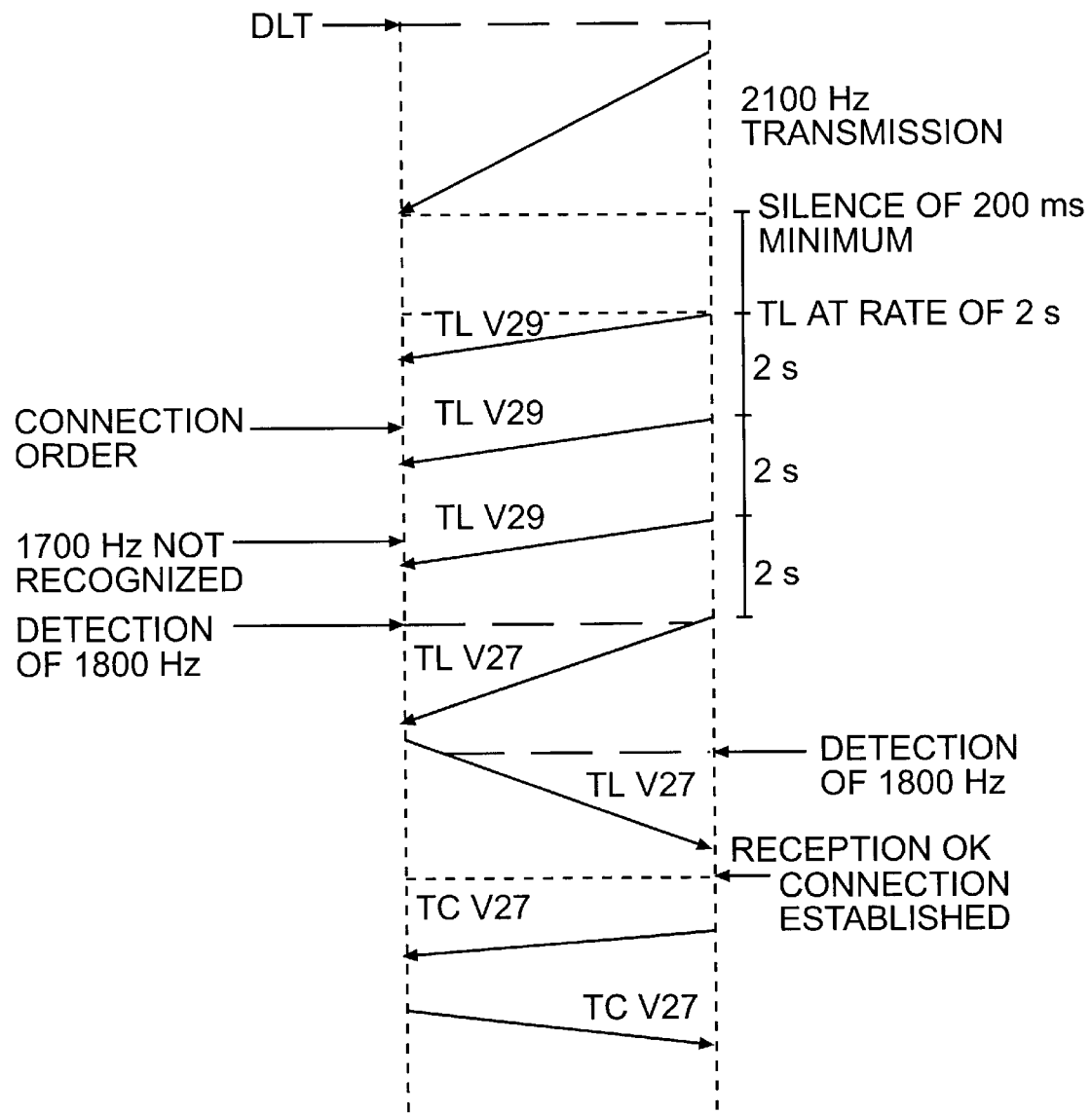
Figure 6B:
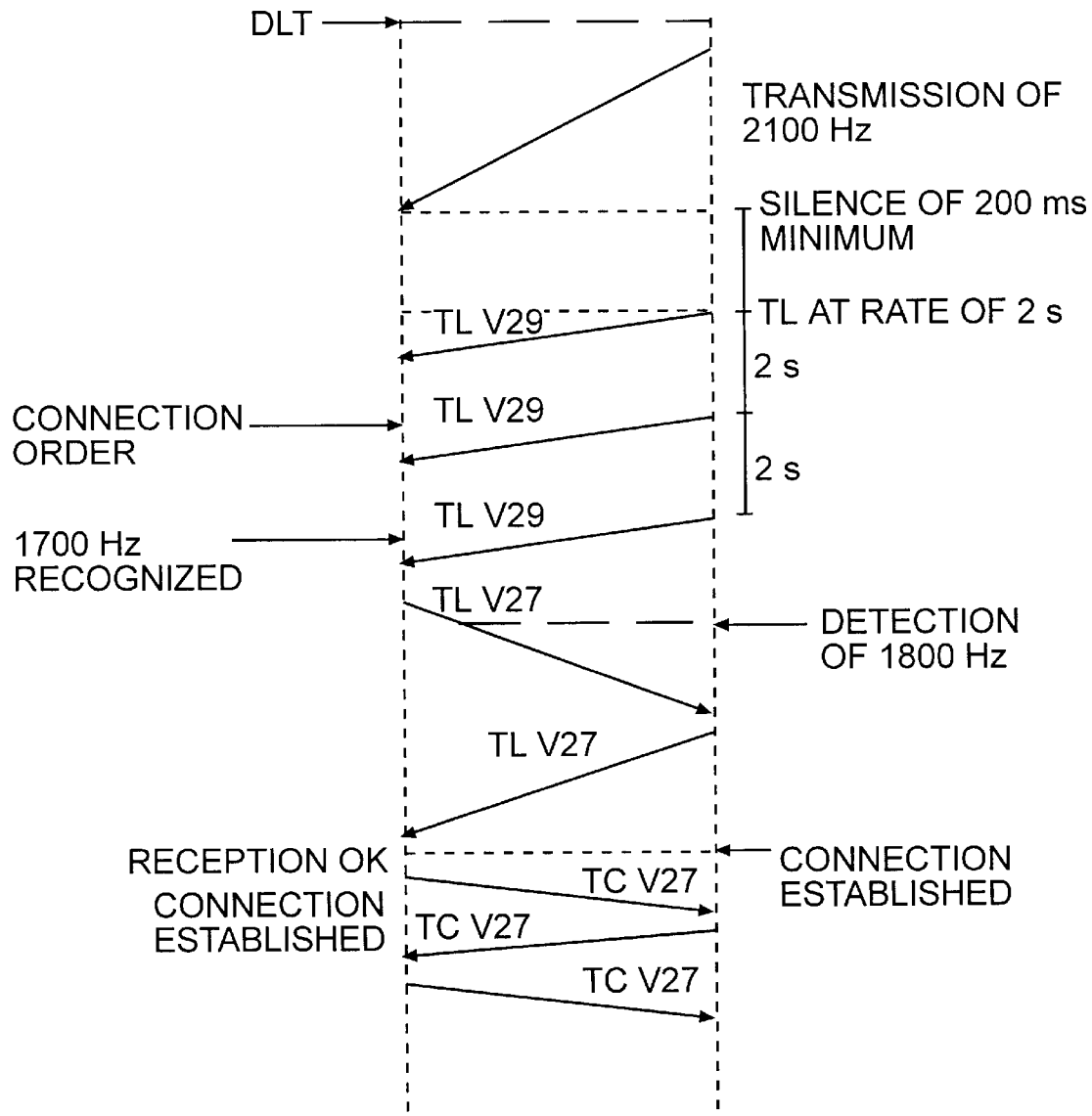

Case No. 5 (FIG. 6) corresponds to a delayed connection to a V29/V27ter unit. After a silence of 200 ms which follows transmission at 2100 Hz, the called unit tries to establish communication in V29 mode. The V27ter/V23 calling unit remains "quiet" because its modem in receiving mode after the connection order does not recognize the V29 carrier frequency (1700 Hz) in segment 1 of the TL V 29 streams. After three unsuccessful attempts in V29 mode (6 seconds total), the called unit emits a TL V 27 long stream whose unmodulated carrier at 1800 Hz of segment 1 is detected by the calling unit modem, which transmits in turn a TL V27 long stream whose unmodulated carrier at 1800 Hz is detected by the called unit modem. Connection is then established at the physical level, and continues by an exchange of TC V27 short streams and establishment of the higher levels (screen and packet).

In case No. 5b (FIG. 6b) the calling unit is capable of recognizing the 1700 Hz frequency, although it does not function in V29 mode, (for this purpose it suffices to add a filter in addition to the modem), and it transmits a V27ter long stream directly, hence a more rapid connection than in case 5, by exchange of two V27ter long streams.

Figure 7:
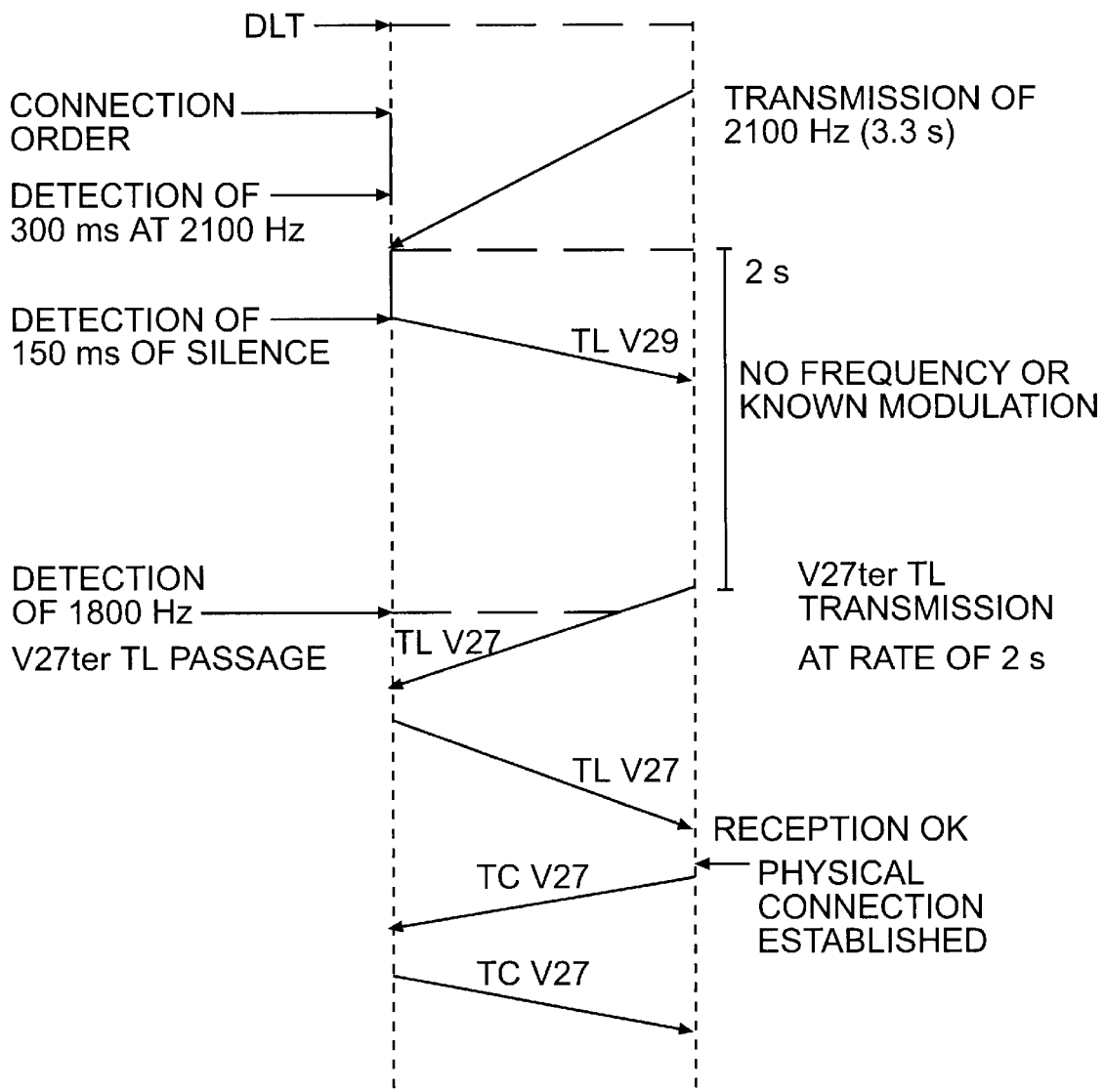

Case No. 6 (FIG. 7) pertains to anticipated connection of a V29/V27ter or V29/V27ter/V23 calling unit to a V27ter called unit. After detection of 150 ms of silence following detection of 300 ms at 2100 Hz, the calling unit places its modem in V29 transmitting mode and sends a TL V29 long stream. The called unit not recognizing a TL 29 long stream will send in turn, following a time delay of 2 seconds, a TL V27 long stream. The calling unit detects 100 ms of the 1800 Hz frequency of segment 1 of the TL V27 long stream and positions its modem in V27ter mode. The duration of segments 1 and 2 enables this operation to be effected before arrival of segment 3. The calling unit then recognizes the TL V27 long stream and responds in turn with a TL V27 long stream. Communication is established at the physical level, and continues as previously (exchange of short streams . . . ).

Figure 8:
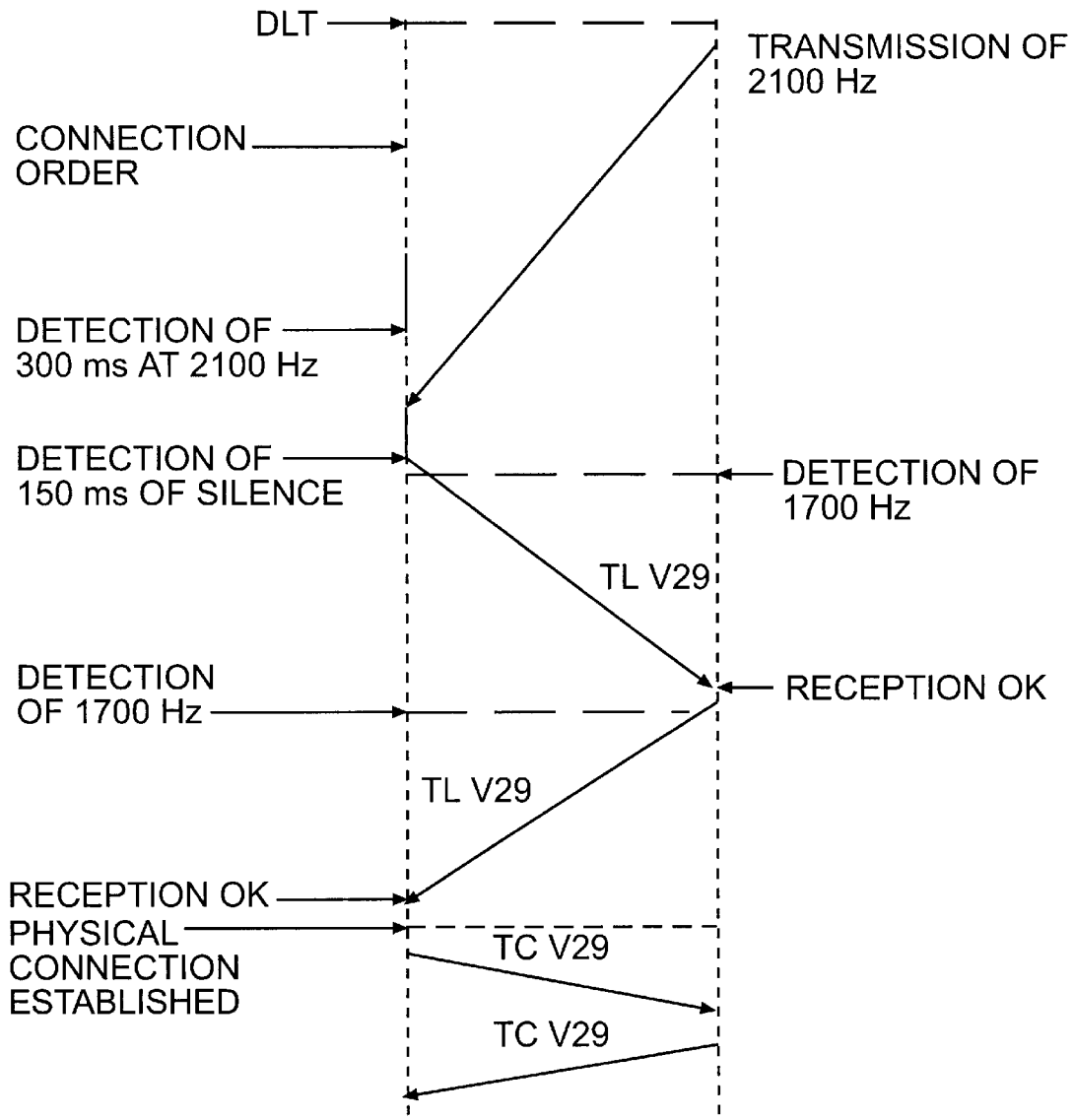

Case No. 7 (FIG. 8) is similar to case No. 3, except that communication is established in V29 mode in which the two units can operate.

Figure 9A:
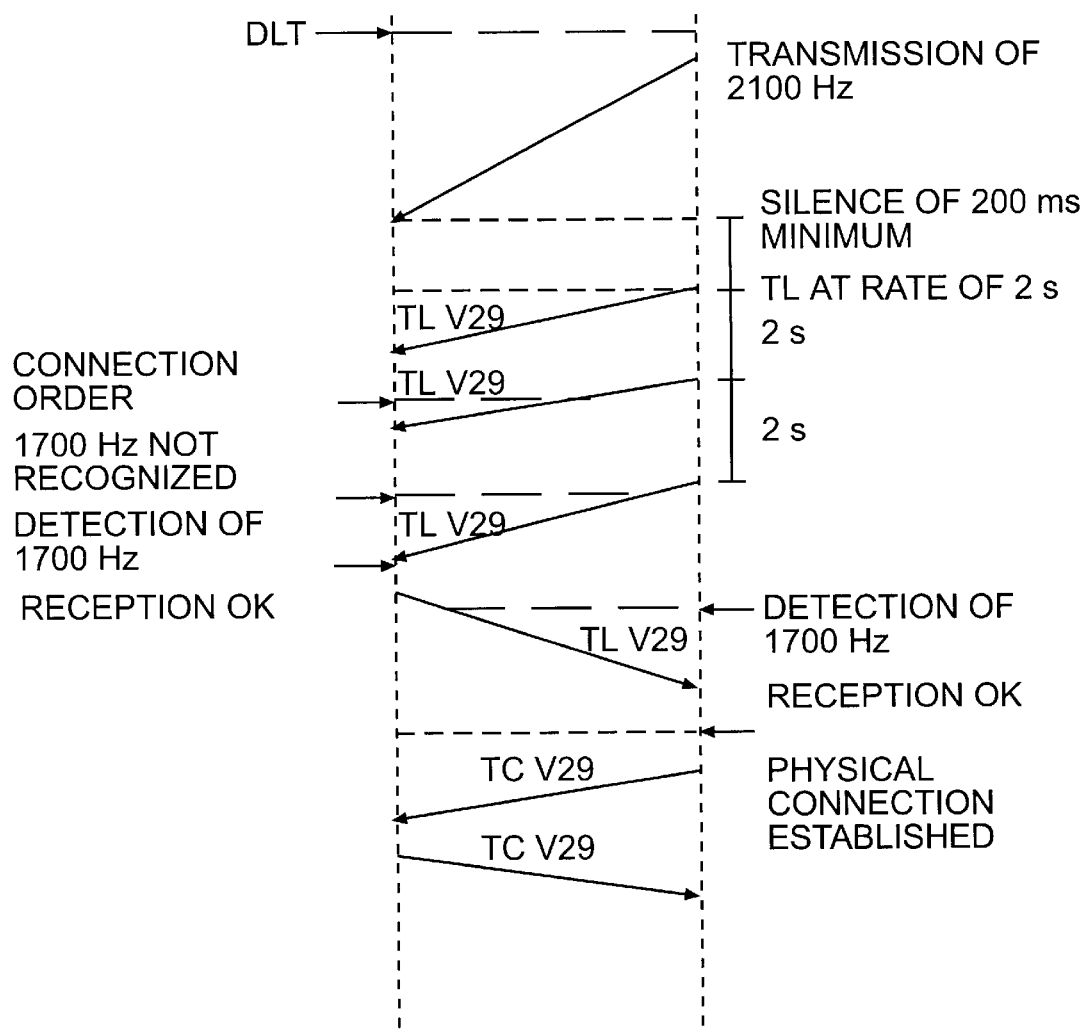

Case No. 8 (FIG. 9a) is similar to case No. 4, except that communication is established in V29 mode.

Figure 9B:
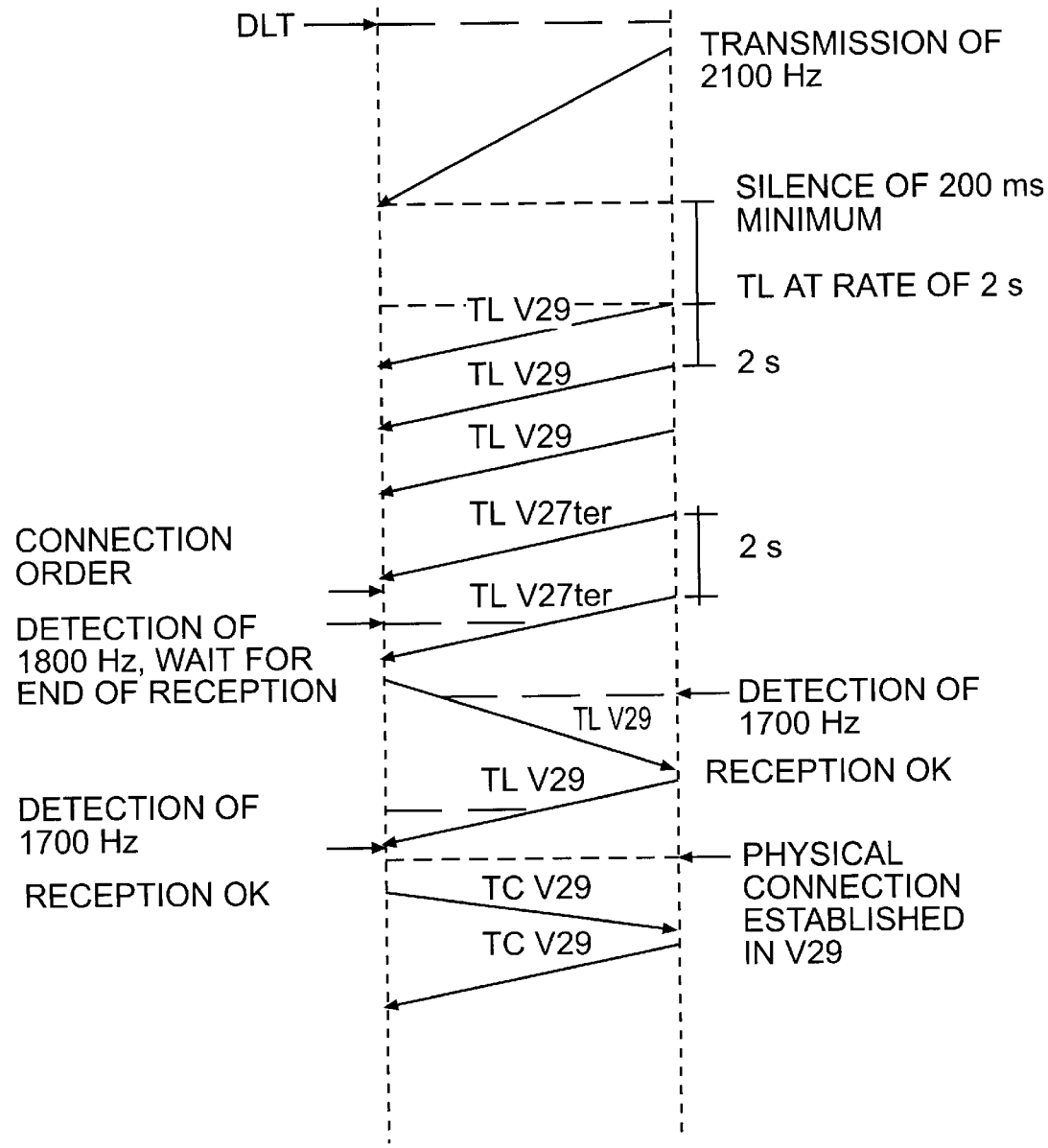

Case No. 9 (FIG. 9b) is similar to cases No. 4b and No. 8, but the order of delayed connection occurs while the called unit is sending long streams in V27ter double mode, after three attempts at transmission of V29 long streams. In this case the calling unit sends a V29 long stream which enables establishment of communication in V29 mode.

Figure 10:
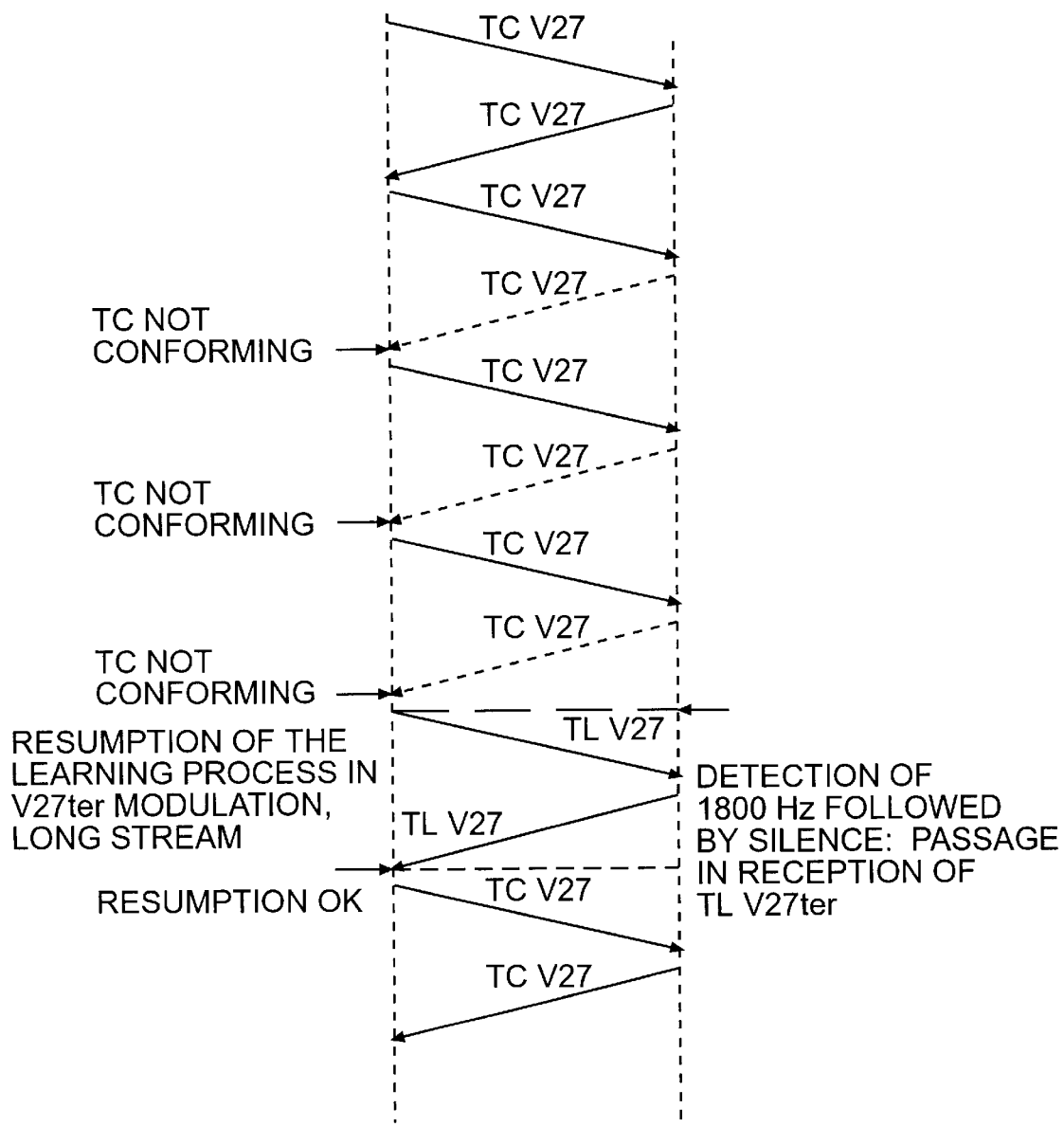

Case No. 10 (FIG. 10) pertains to a process for resuming transmission in V27ter mode (without changing mode). Following reception of three non-conforming TC 27 short streams, a unit (here the calling unit) resumes the learning process in V27ter modulation by sending a TL V27 long stream. The called unit, whose modem in receiving mode is constantly searching for the unmodulated carrier frequency, discovers the 1800 Hz frequency in segment 1 of the TL V27 long stream, which allows it to identify the resumption process (segments 1 and 2 do not have the short streams). It receives the TL V27 long stream and sends in turn a TL V27 long stream which is received by the calling unit. The process of resumption is successful and communication continues by an exchange of TC V27 short streams. This process does not disturb the higher levels (streams and packets), because no disconnection signal is emitted. The process of resumption has a duration less than the time delay of automatic disconnection of the higher levels for which everything occurs as if there was a delay in sending data.

Figure 11:
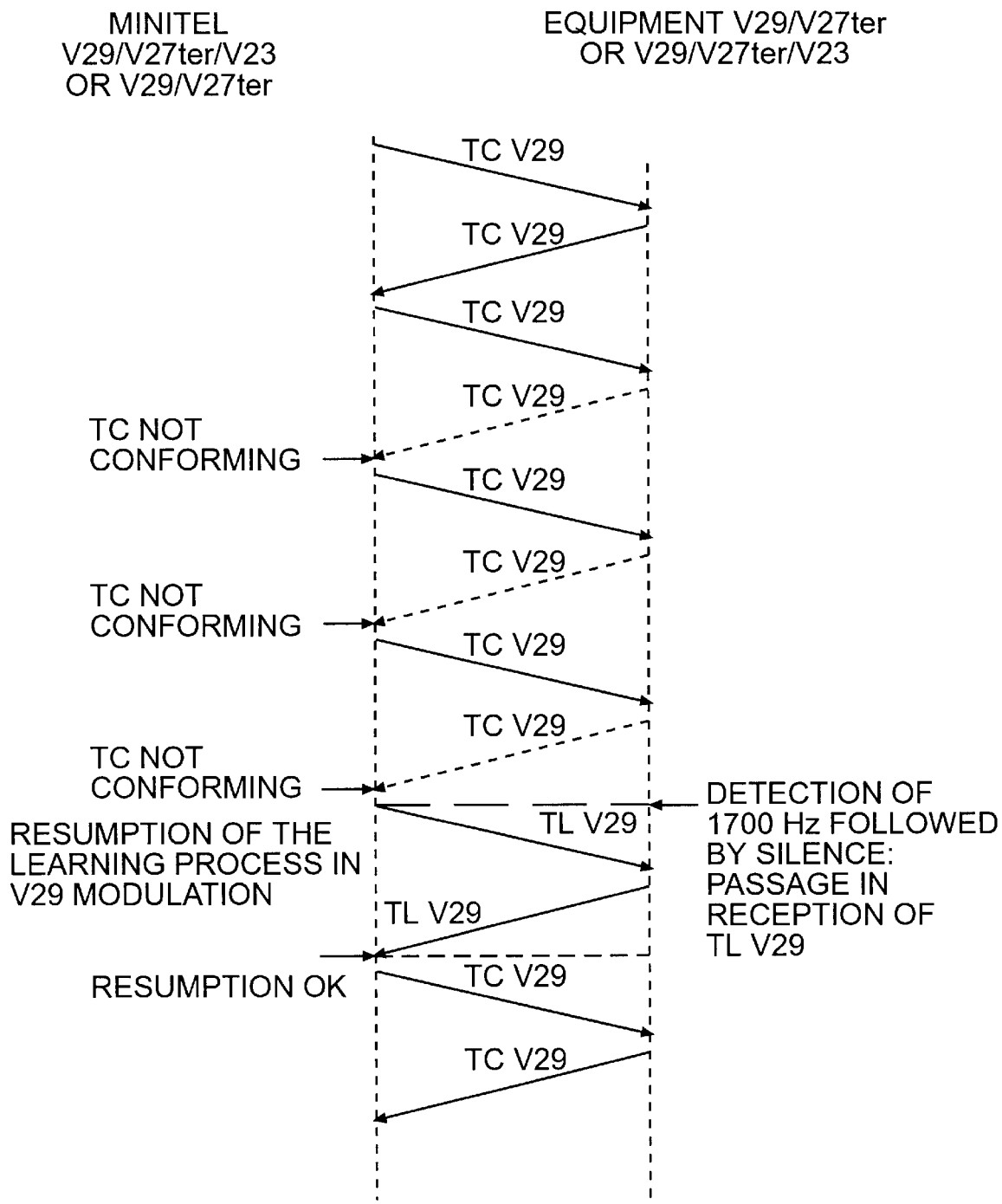

Case No. 11 (FIG. 11) is similar to case No. 10, except that resumption is effected in V29 mode (without a change of mode) with detection of the unmodulated 1700 Hz frequency (segments 1 and 2 of TL V29) by the called unit.

Figure 12A:
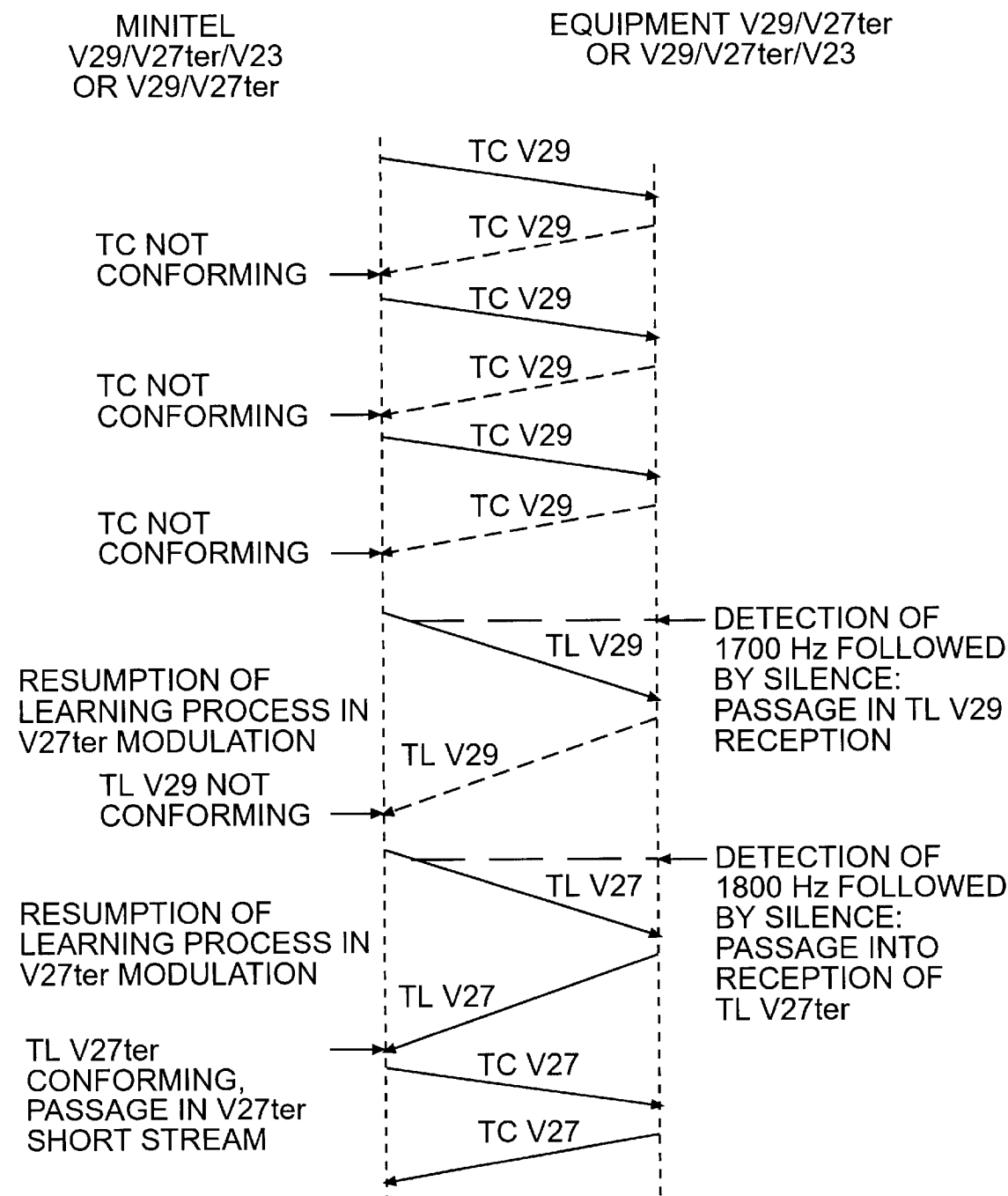

Case No. 12 (FIG. 12a) describes a process of resumption with change of mode following reception of three non-conforming TC V29 short streams (for example, a line disturbance), and a unit (here the calling unit) resumes the process of learning in V29 modulation by sending a TL V29 long stream. This attempt being unsuccessful (here a single attempt), the calling unit sends a TL V27 long stream whose carrier frequency of segment 1 is detected by the called unit. The latter places its modem in V27ter mode before reception of segments 1 to 5 of the TL V27 long stream, and it sends in turn a TL V27 long stream which is received by the called unit. Communication continues by exchange of TC V27 short streams without disturbance of the higher levels (screen and packet) because of their compatibility in a few parameters.

Figure 12B:
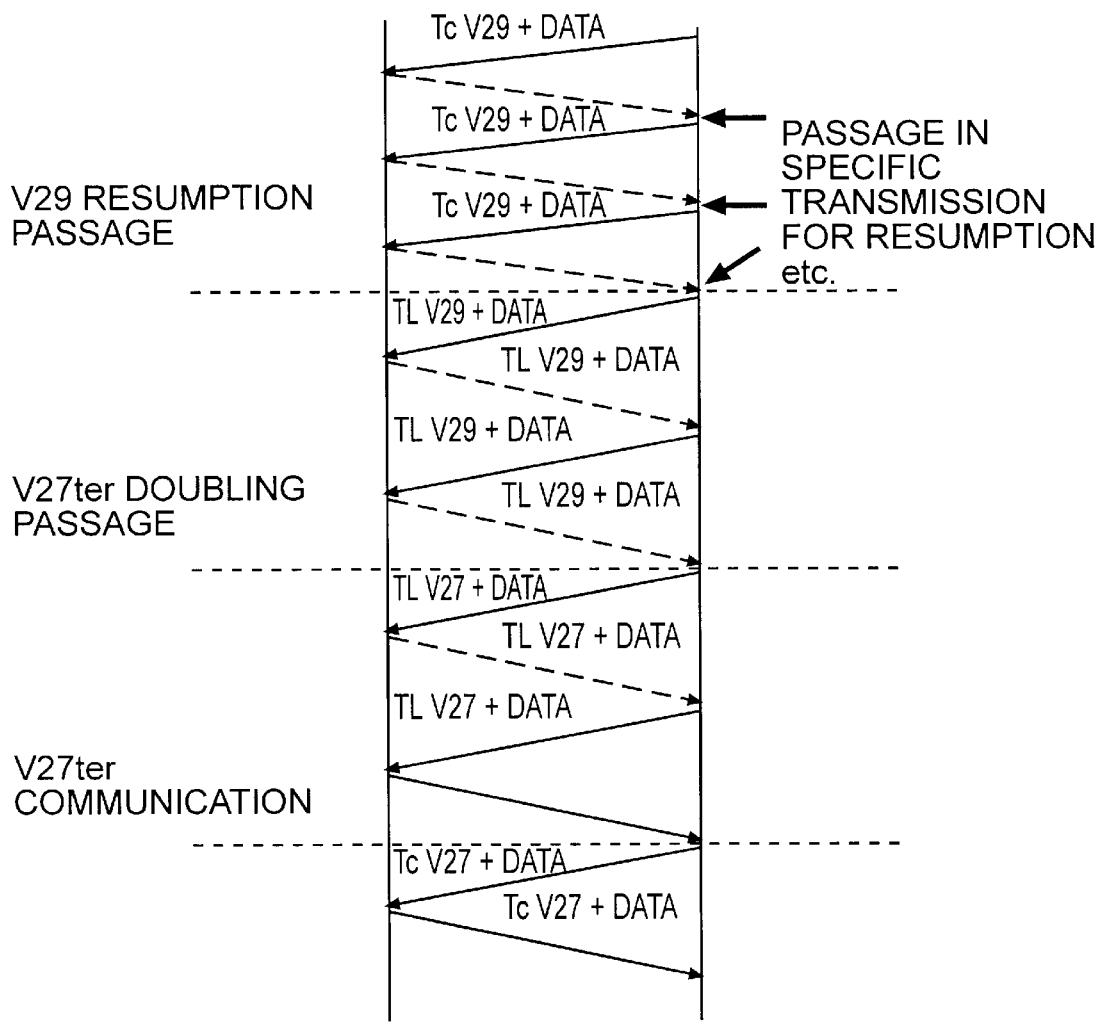

Case No. 12b (FIG. 12b) corresponds to the preceding case, but the learning process is repeated two times in V29 mode (two attempts) and two times in V27ter mode (two attempts).

Figure 13:
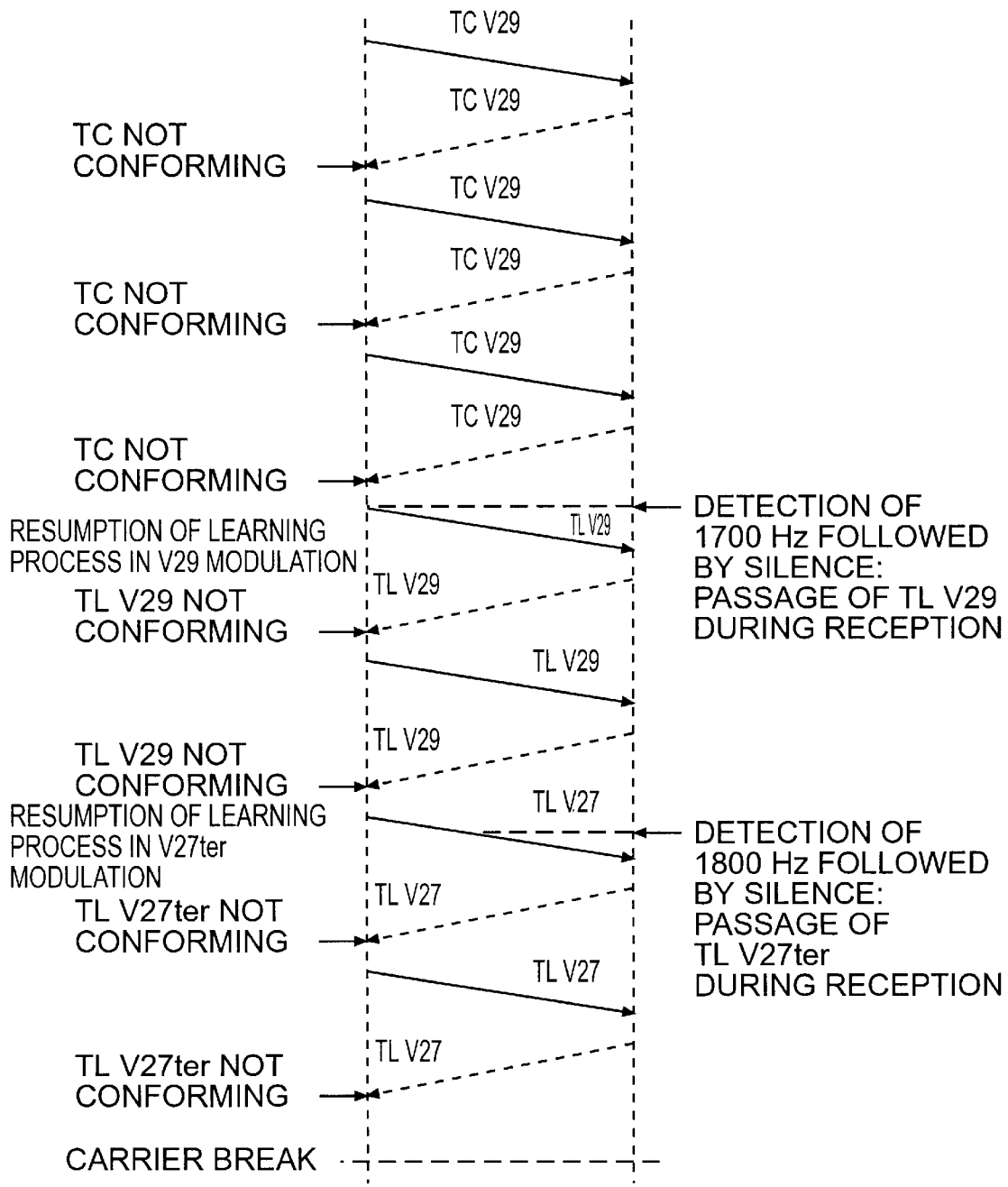

Case No. 13 (FIG. 13) pertains to an aborted resumption following communication in V29 mode. A unit (for example, the calling unit) receives three non-conforming TC V29 short streams. It makes an attempt at learning in V27ter mode (as in case No. 11). Following reception of two non-conforming TL V27 long streams (two attempts), the calling unit interrupts communication. The number of two attempts is given by way of example, but one could also envisage making a single attempt.

Figure 14:
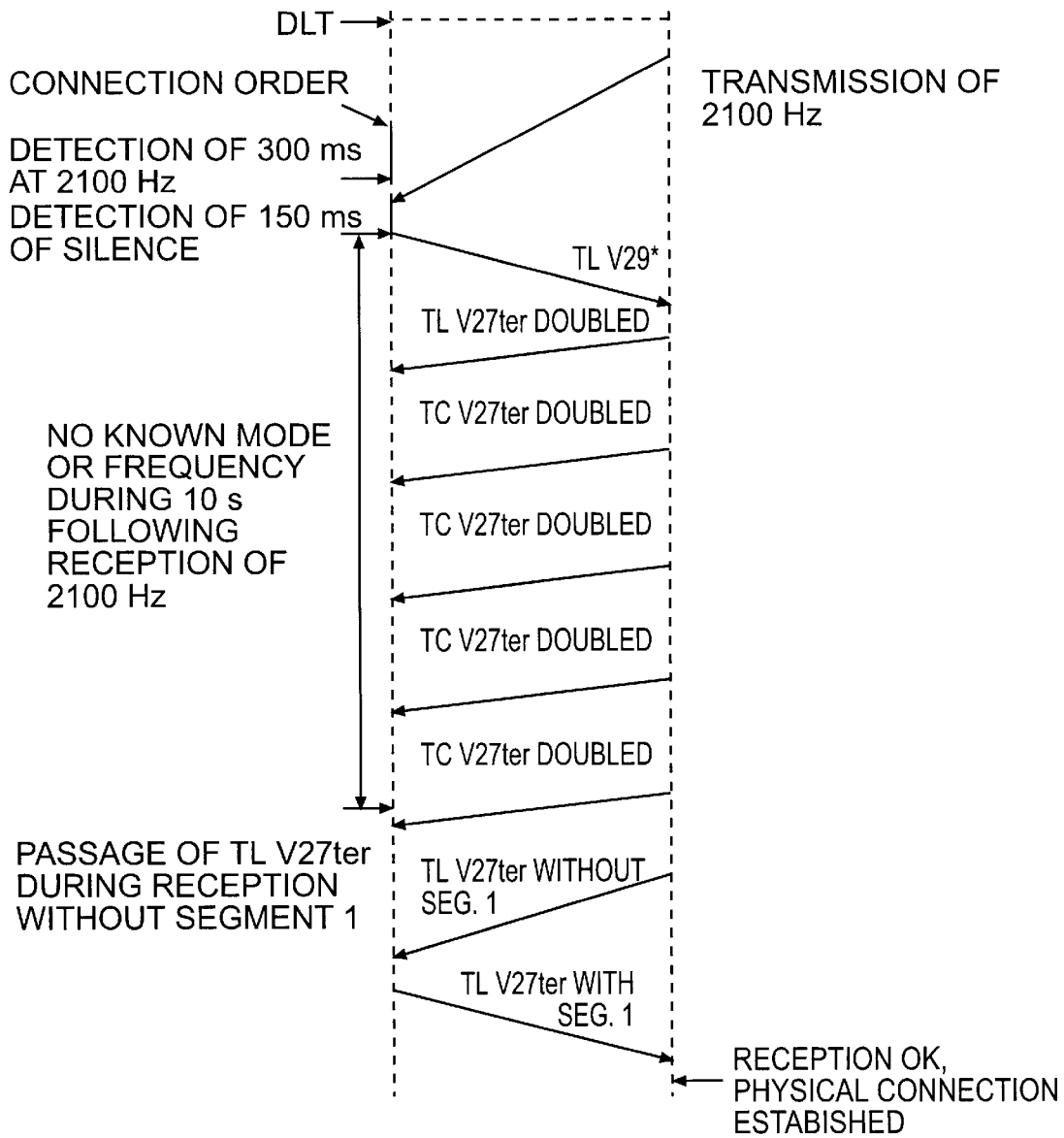

Case No. 14 (FIG. 14) pertains to connection to a synchronous common input (EBS) of the current Transpac network in V27ter mode. The process starts as in case No. 7. The TL V29 long stream (or possibly TL V27) is not recognized by the EBS receiver, which sends a long stream (TL 27 double) corresponding to a doubling mode at 2400 bps, and then short streams (TC V27 double) corresponding to the doubling mode. The calling unit, which does not receive any known mode during a time delay duration of 10 seconds (failure of detection of the unmodulated carrier), automatically programs its modem for receiving TL V27 long streams without segments 1 and 2, that is to say that it suppresses the logical condition of detection of the unmodulated carrier frequency. The 10 second duration is sufficient to distinguish this case with respect to the others (notably case No. 5).

Figure 15:
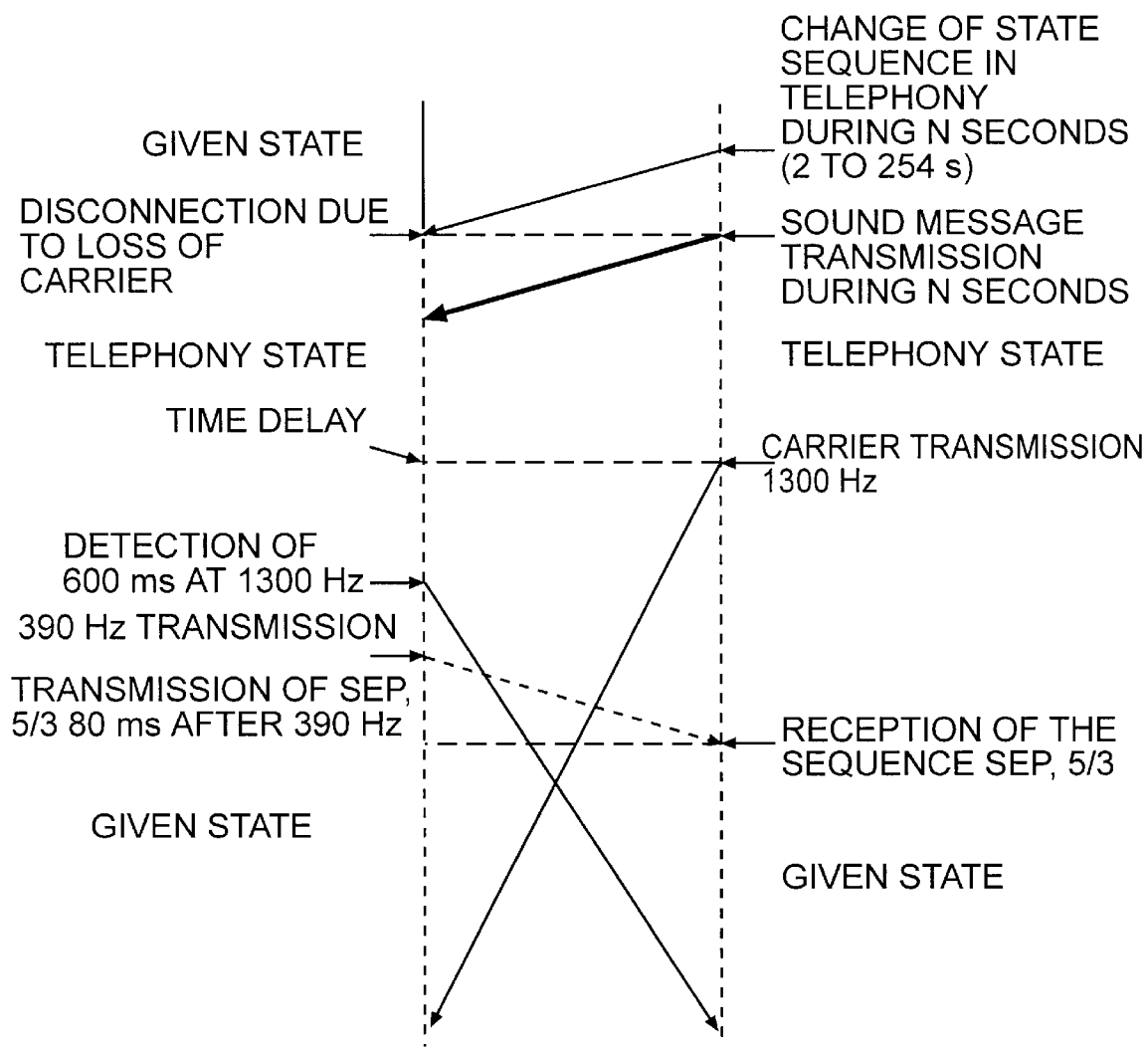

Case No. 15 (FIG. 15) pertains to the known procedure of passage in telephony data mode with V23 modulation. The called unit sends a change of state sequence in telephony mode for N seconds. A disconnection is made by loss of carrier without breaking the telephone connection and a sound message is transmitted during a selected time delay duration. Upon expiration of the time delay the full connection is again made in the traditional manner (Minitel V23 unit).

Figure 16:
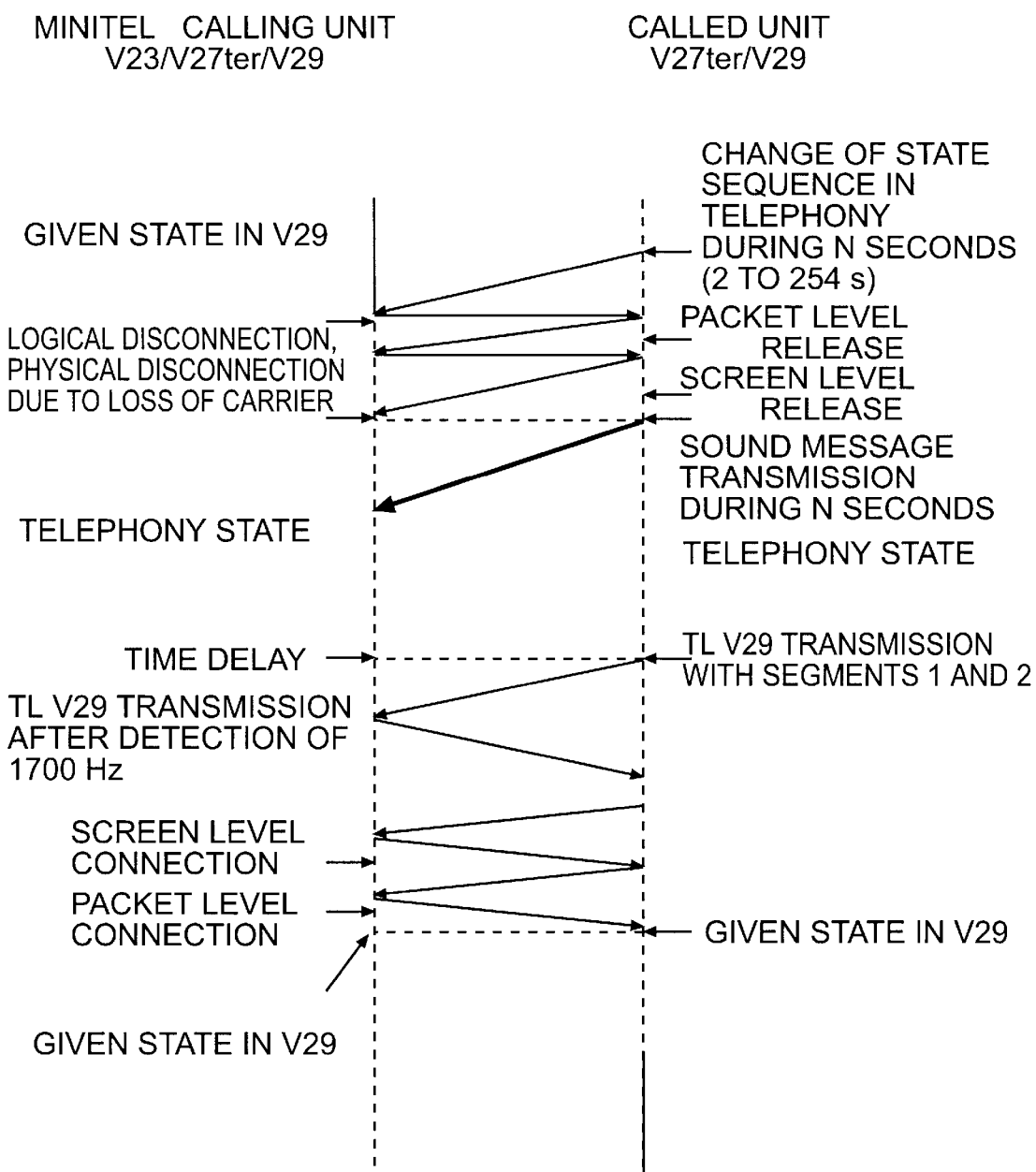

Case No. 16 (FIG. 16) pertains to a telephony data process in accordance with the invention in V29 modulation. The change of state sequence in telephony produces a logical disconnection with release of the higher levels (packet and screen) and physical disconnection due to loss of the carrier. A sound message is transmitted during a certain time delay interval (telephony mode). Upon expiration of the time delay the connection is resumed in V29 mode at the initiative of the called unit (transmission of TL V29) and physical connection is made after an exchange of TL V29 long streams, then at the packet and screen level in TC V29 short streams which follow for reestablishment of the prior given state in V29 modulation.

Figure 17:
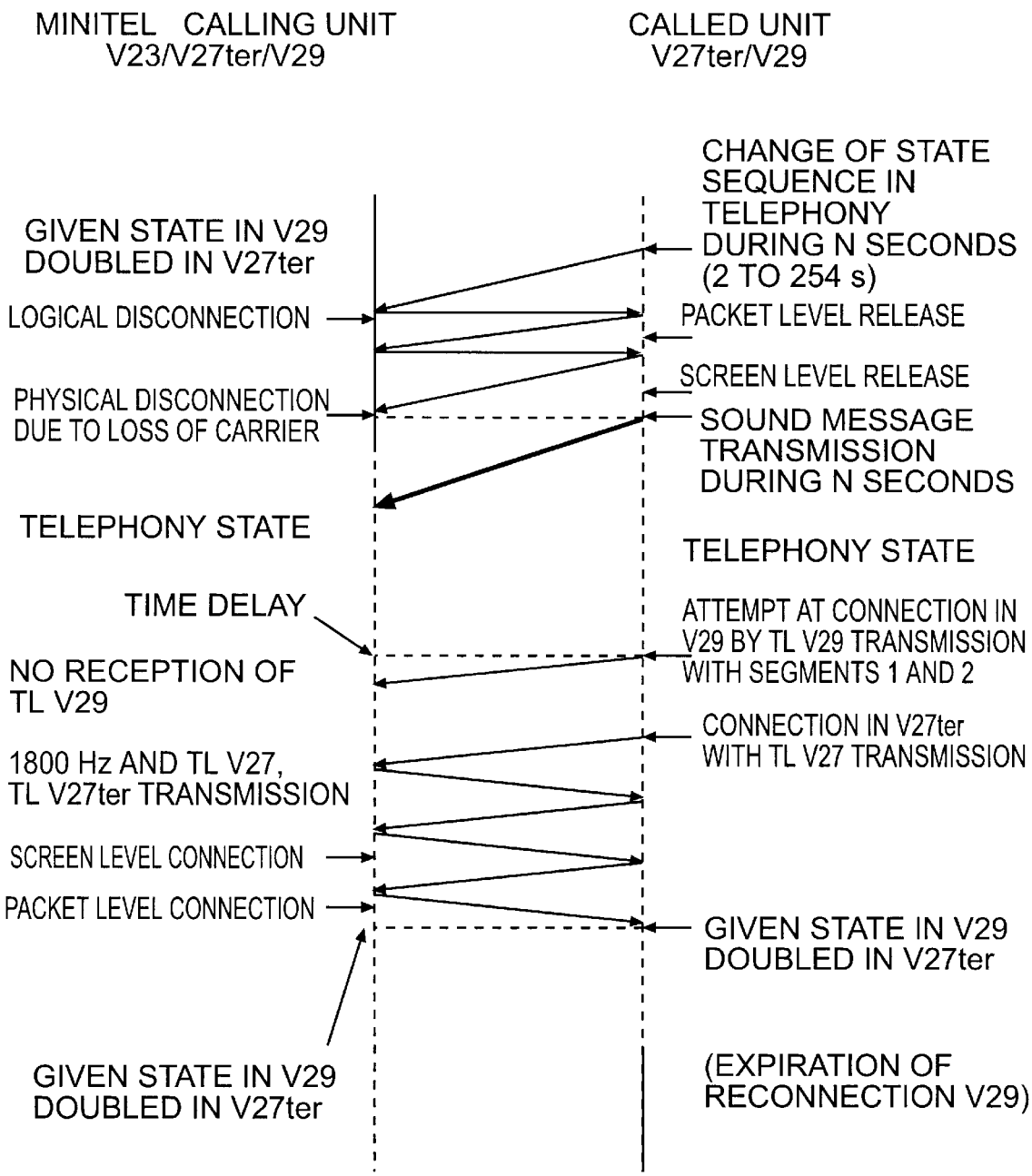

Case No. 17 (FIG. 17) is similar to the preceding one, except that the given mode is V27ter mode doubled beginning with V29 mode. Upon reconnection in the given mode the called unit attempts resumption in V29 mode. Following failure of this attempt resumption is made in V27ter double mode which is clearly less sensitive to line disturbances.

Figure 18:
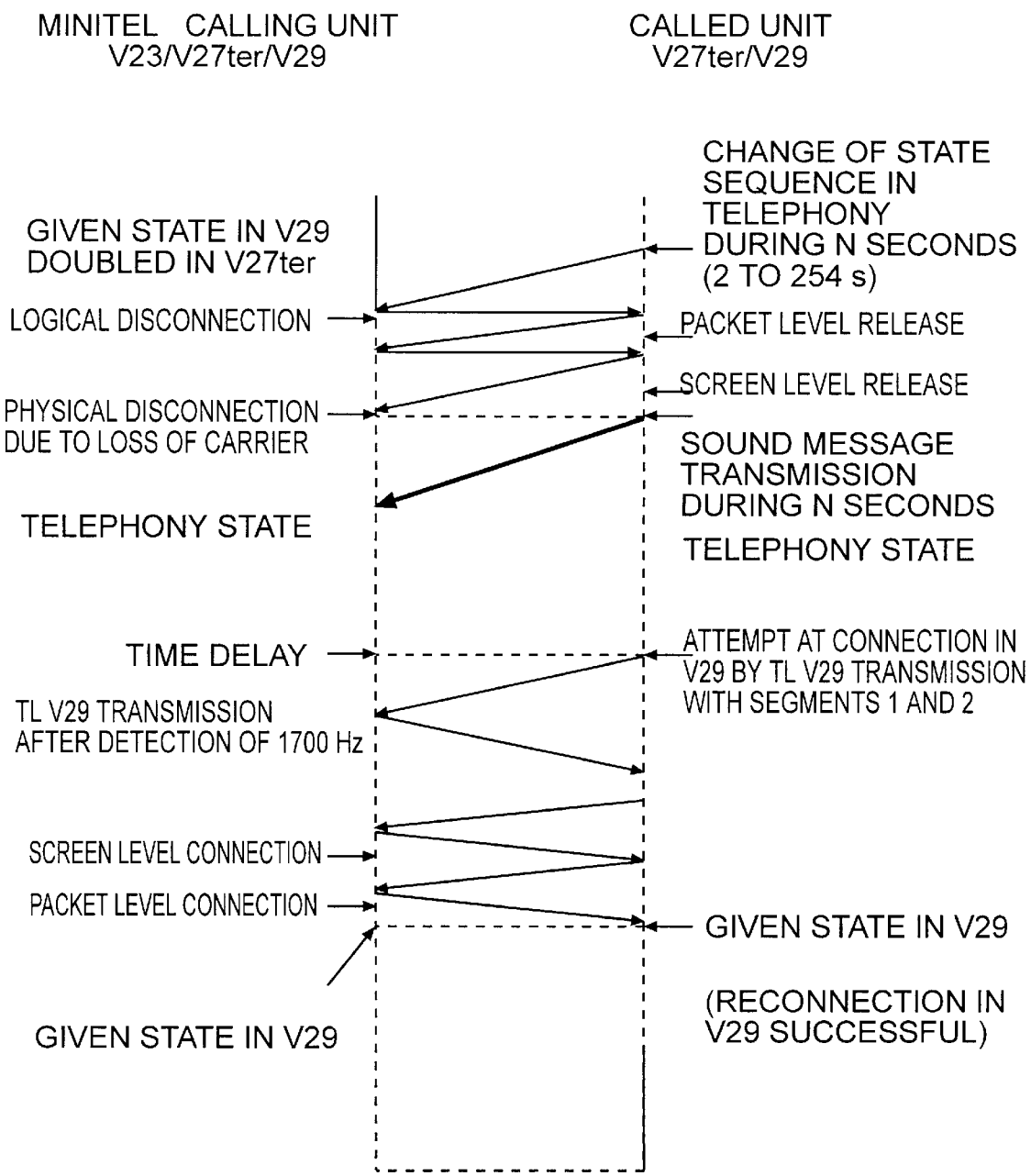

Case No. 18 (FIG. 18) is similar to case No. 17, but resumption in V29 mode is successful and the connection is made at the physical level in the TL V29 long streams, then at the screen level and packet level in TC V29 short streams which follow.

Figure 19:
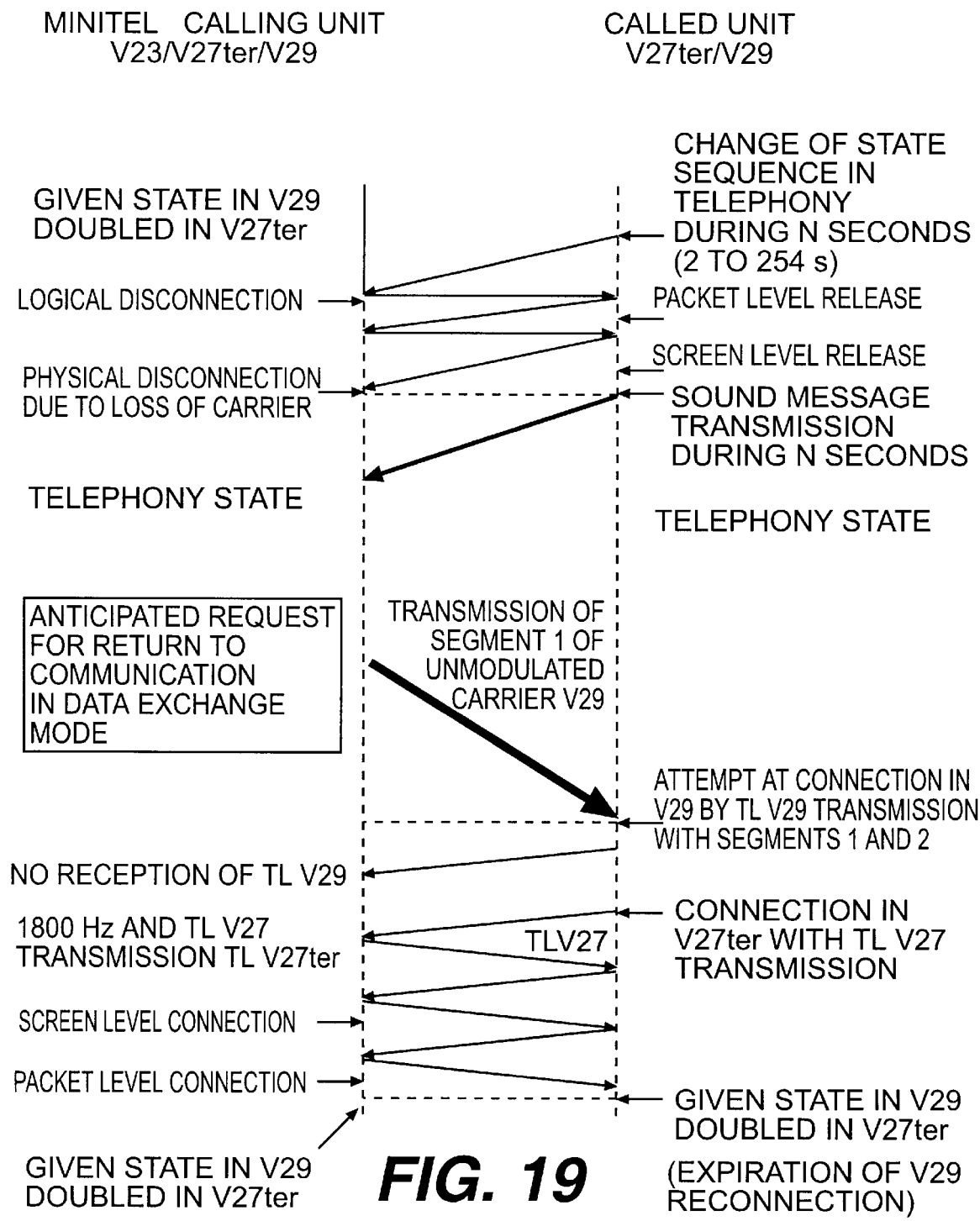

Case No. 19 (FIG. 19) also pertains to a telephony data process in which the calling unit effects an anticipated request for return to communication in data exchange mode before the end of the time delay duration of N seconds of the telephony mode. This anticipated request is manifested in the form of the transmission of segment 1 of V29 unmodulated carrier, to which the called unit responds by an attempt at connection in V29 mode (transmission of V29 long streams). In such a case the connection cannot be established in V29 mode. The called unit then sends V27ter long streams (doubled mode) which leads to synchronization in V27ter mode. One will note that the anticipated request for return to data exchange mode by V27ter unit is effected exclusively by transmission of segment 1 of V27ter unmodulated carrier.

Figure 20:
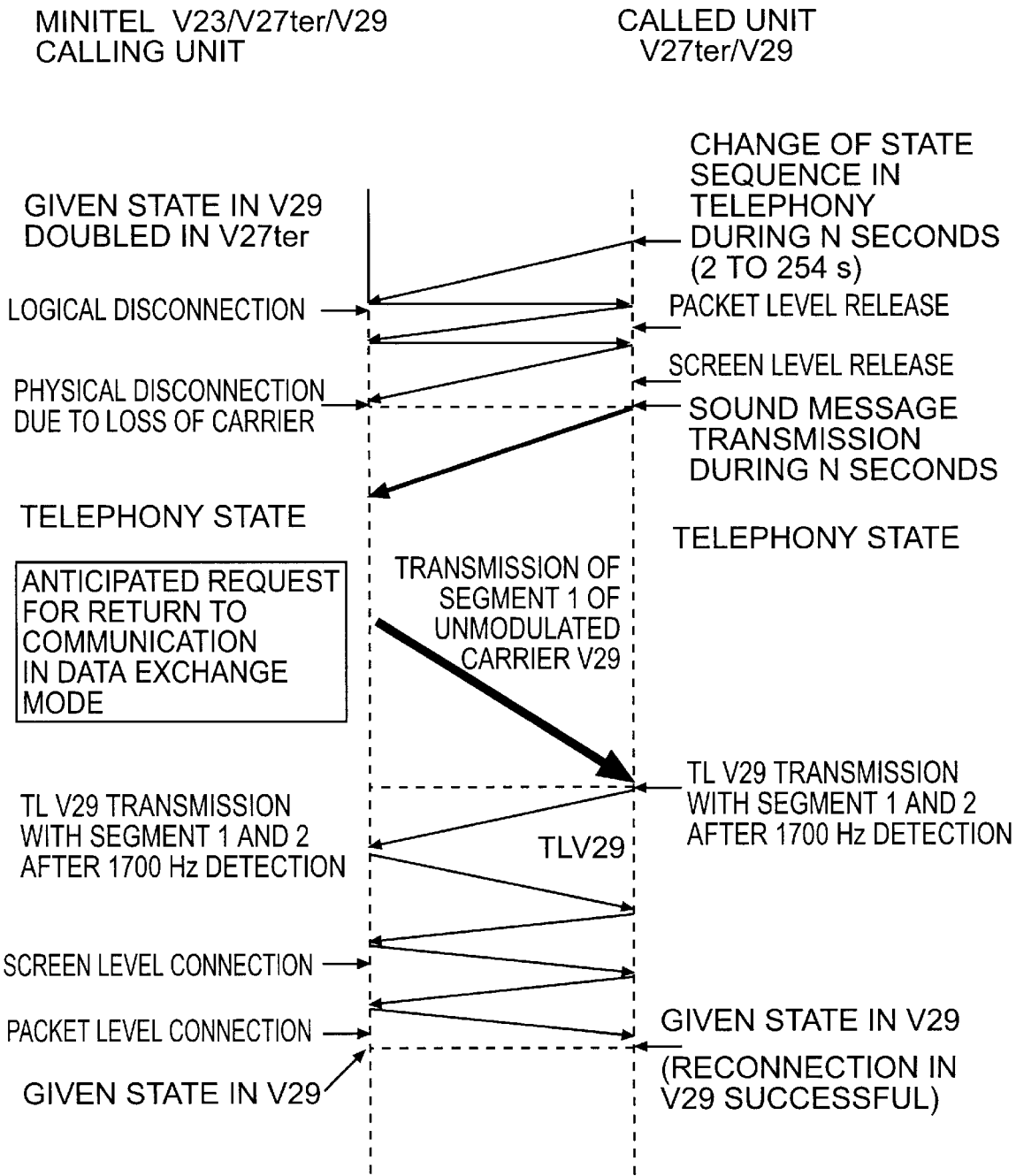

Case 20 (FIG. 20) is similar to case 19, except that the return to data exchange mode is effected successfully in V29 mode.

Figure 21A:
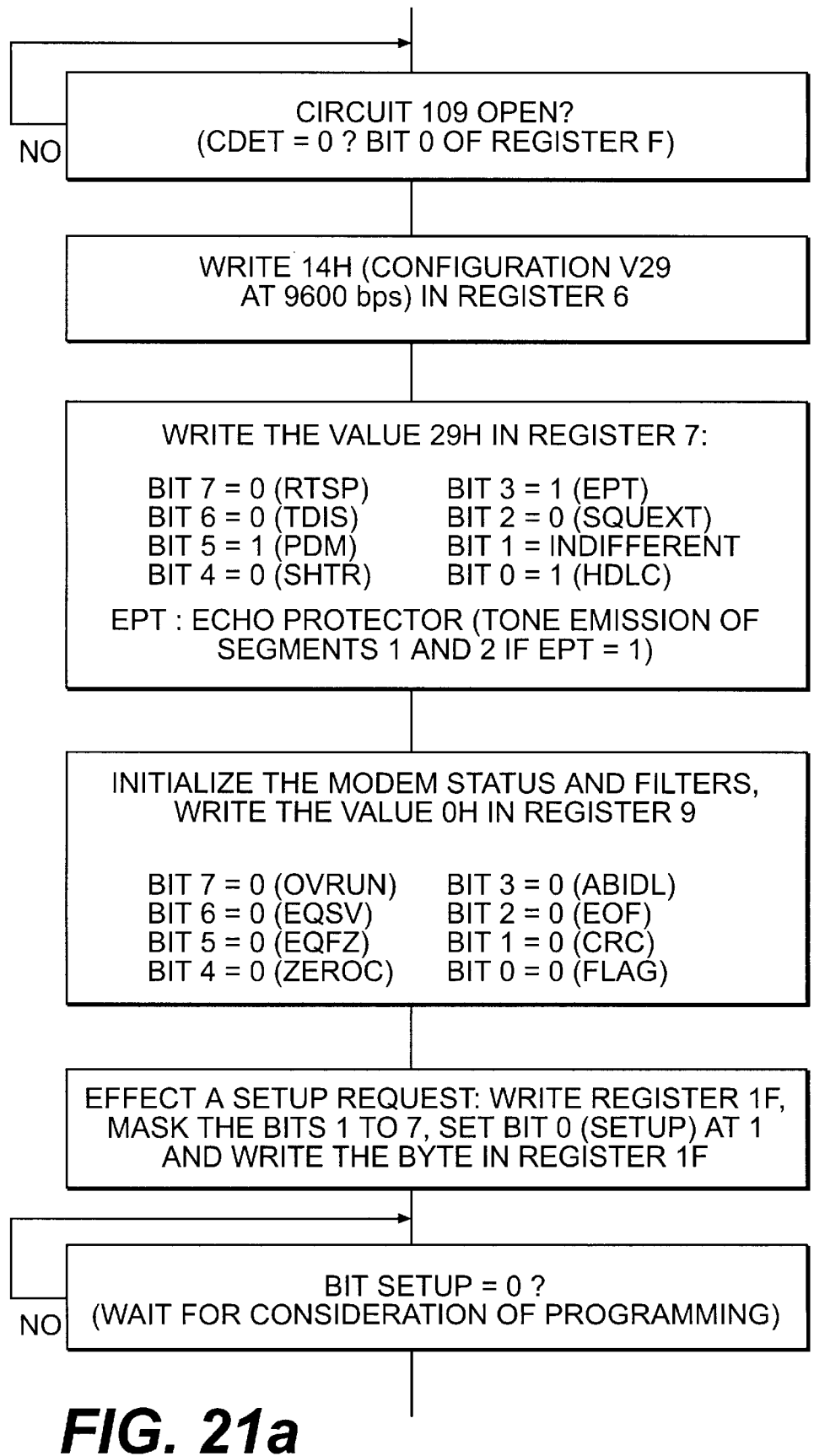
Figure 21B:
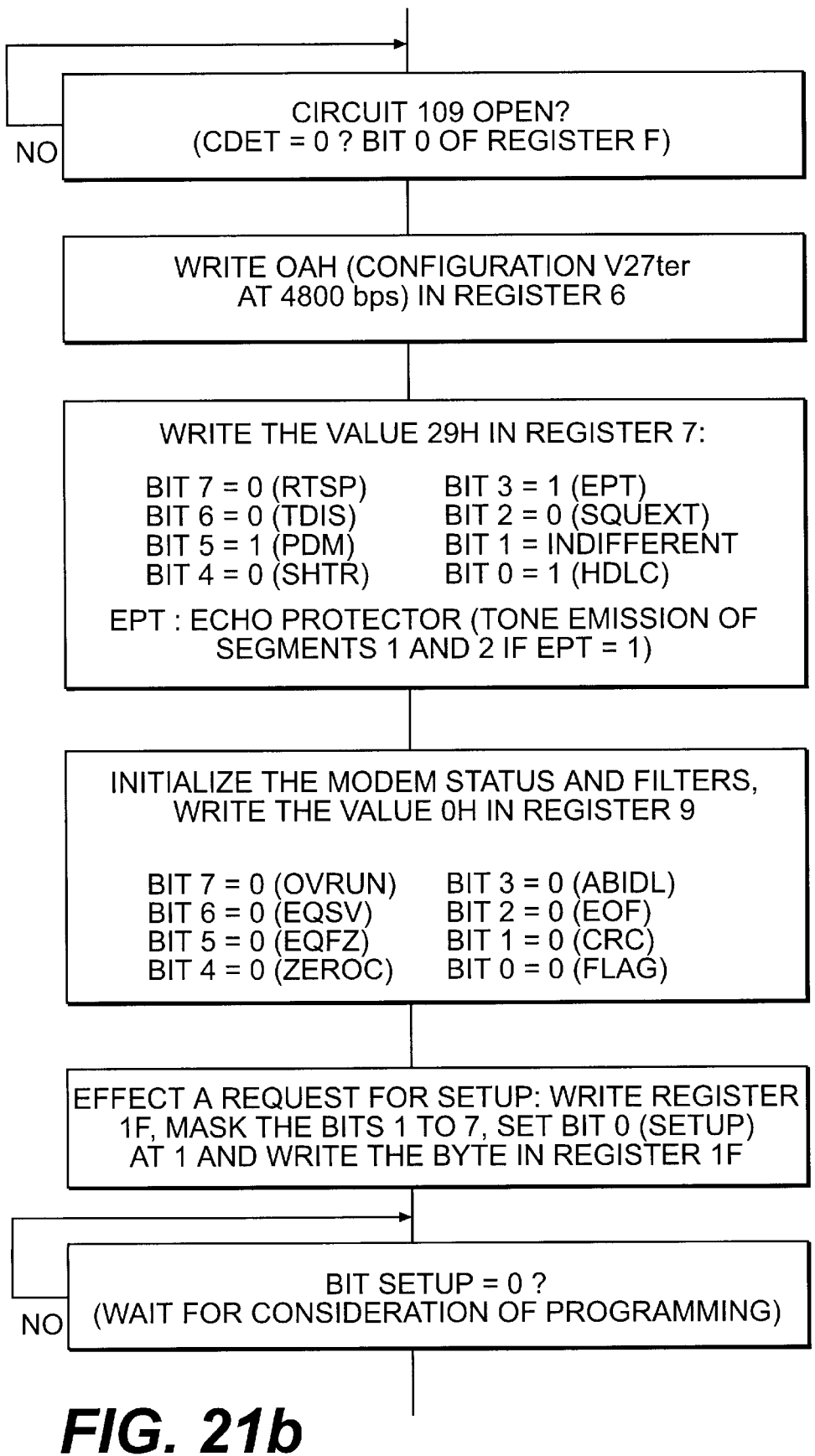
Figure 21C:
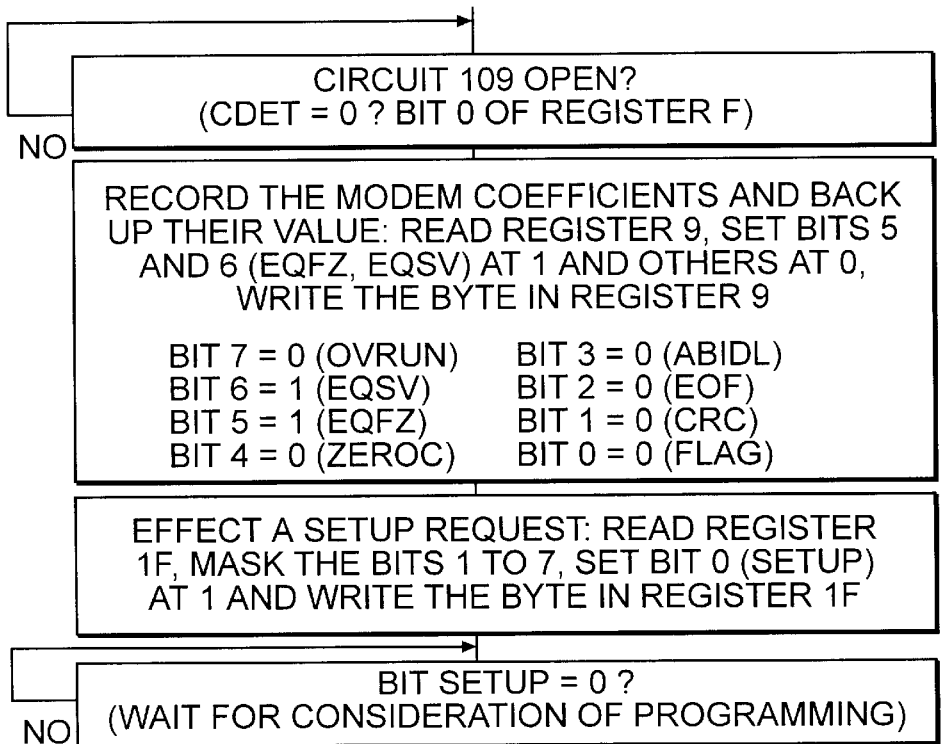
Figure 21D:
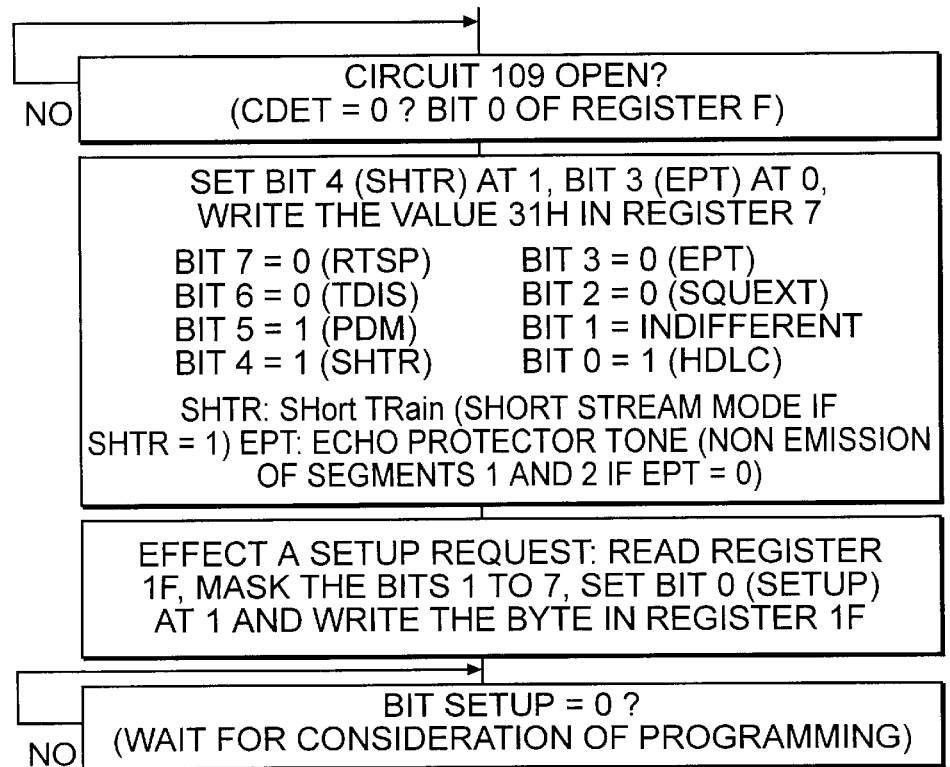
Figure 21E:
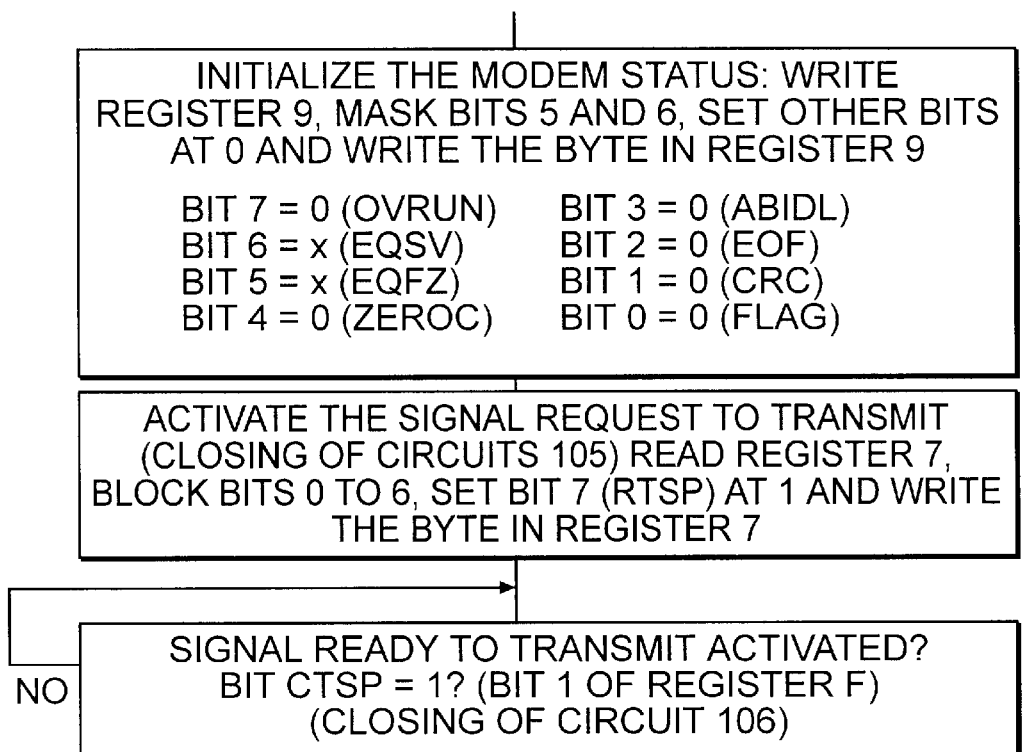
Figure 21F:
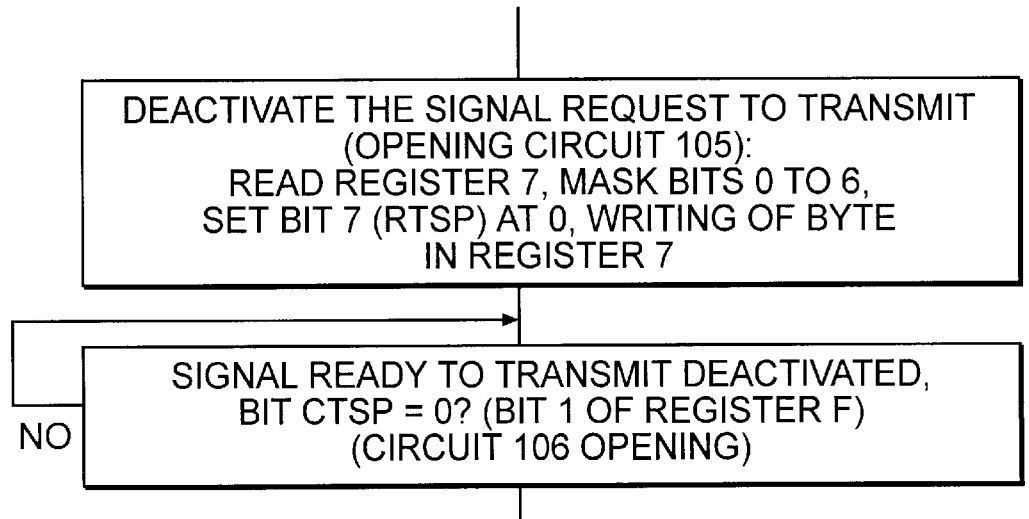
Figure 21G:
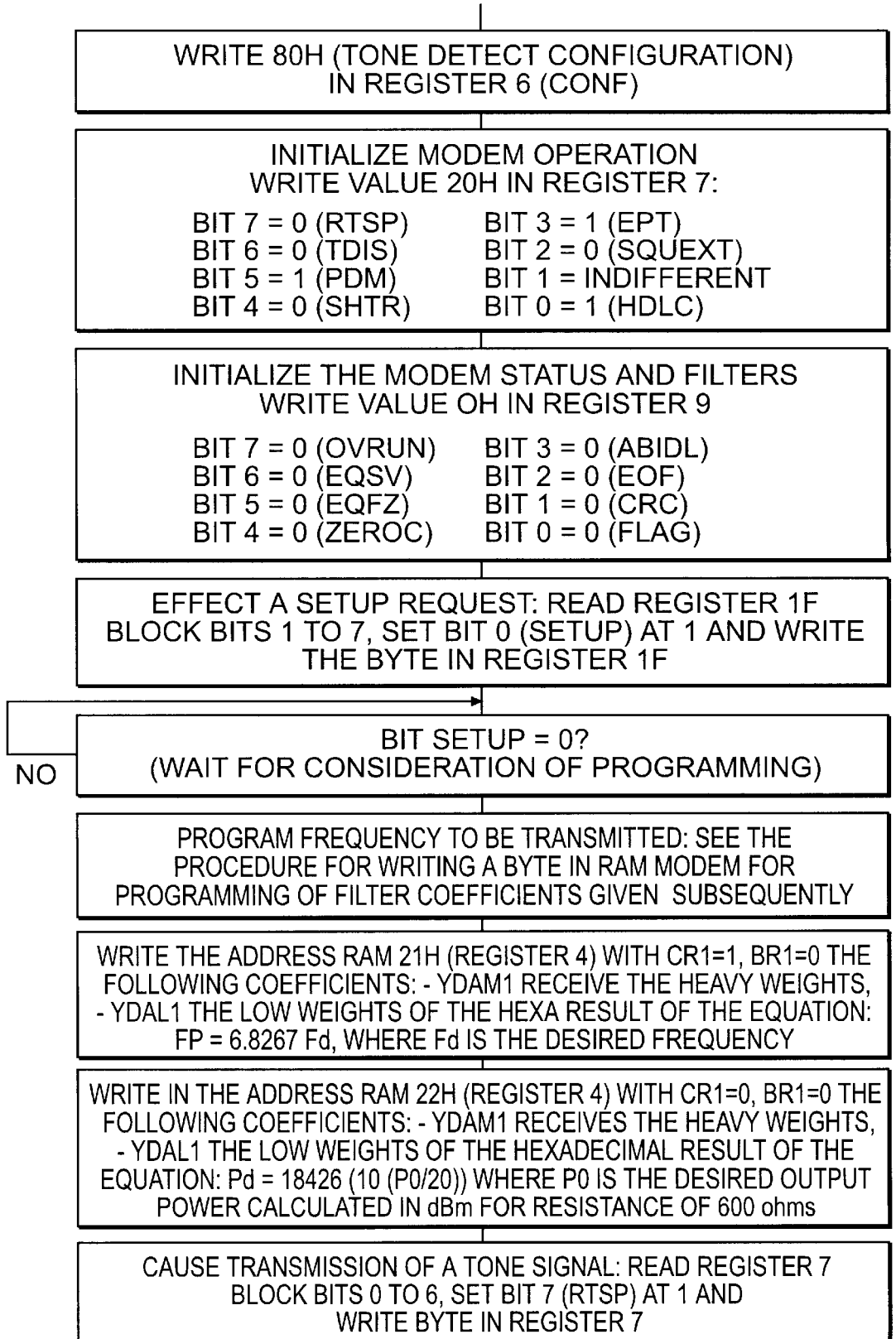
Figure 21Q:
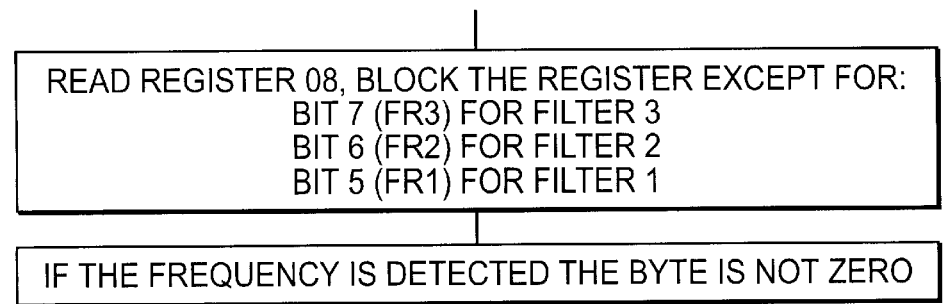
Figure 21R:
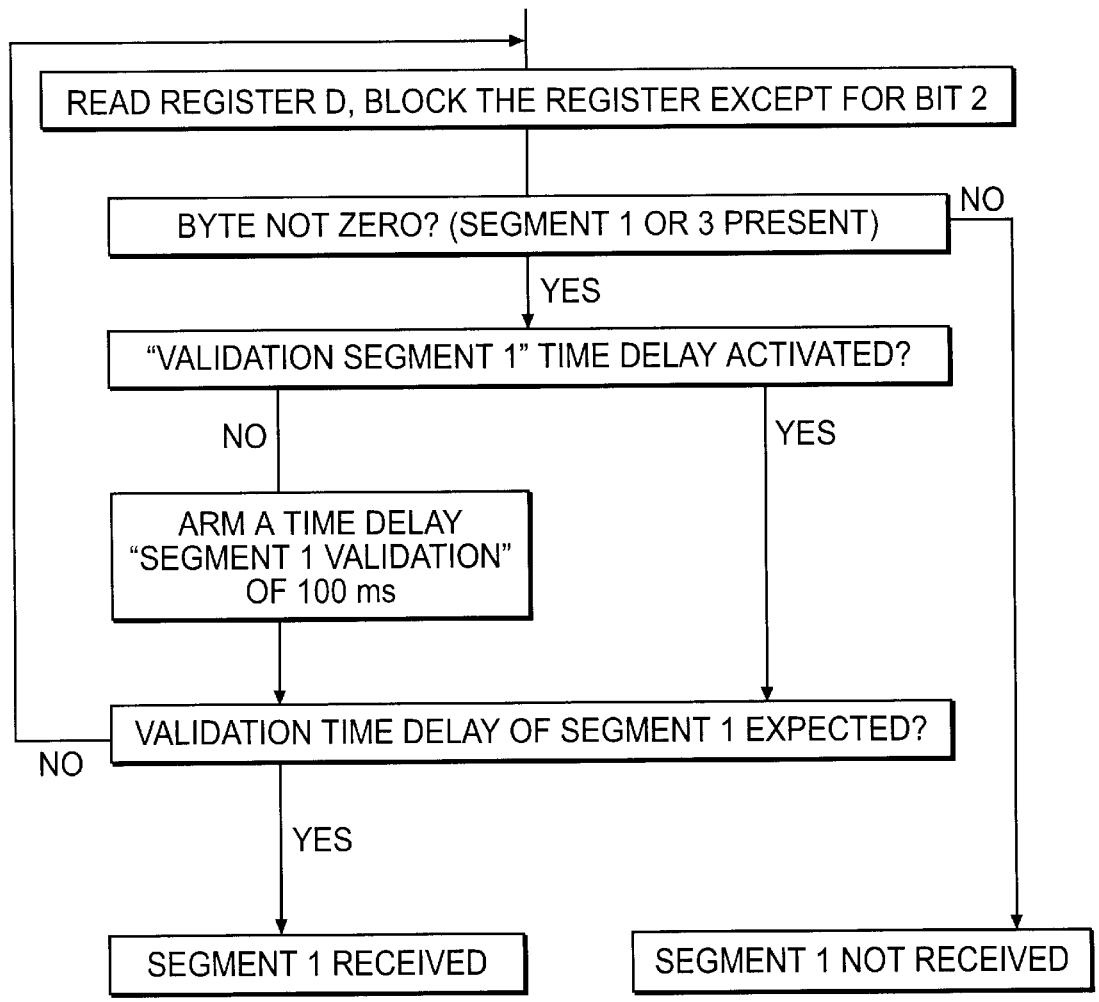
Figure 21S:
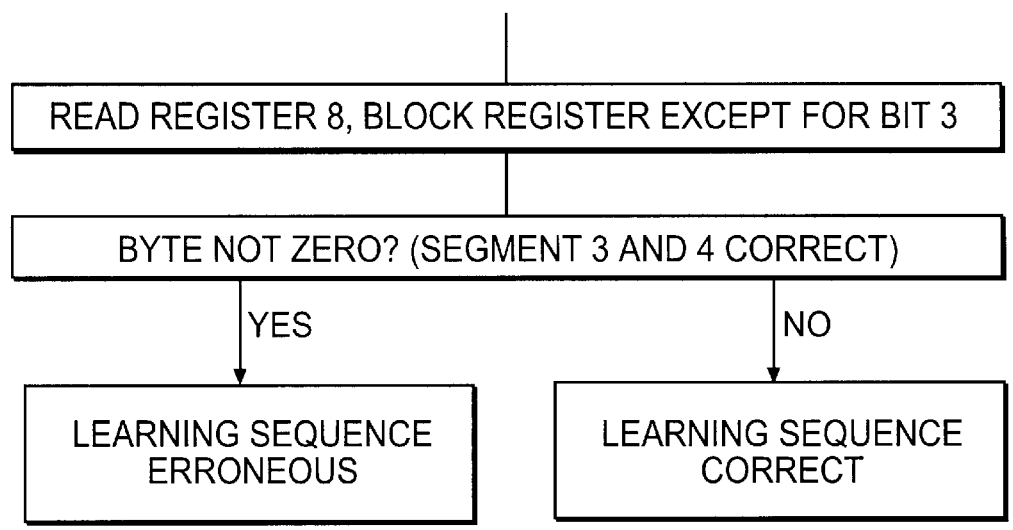
Figure 22A:
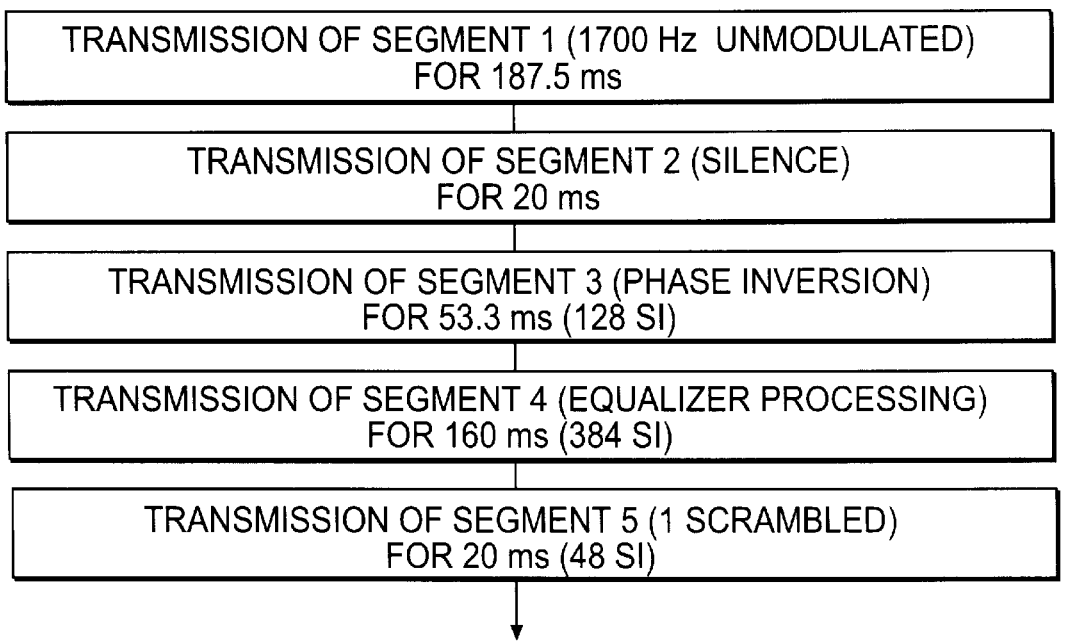
FIGS. 22a to 22d, a transmission sequence of a long stream V29, a long stream V27ter, a short stream V29, and a short stream V27ter respectively, SI designating a unit interval based on the standard, FIGS. 23a to 23d, a receiving sequence of a long stream V29, a long stream V27ter, a short stream V29, and a short stream V27ter respectively, FIGS. 24a to 24d, an end sequence of transmission in long stream mode V29 (24a), in long stream mode V27ter (24b), a data transmission sequence and end of transmission in short stream mode V29, as well as in long stream mode V29 in case of resumption (24c), and a data transmission sequence and end of transmission in short stream mode V27ter, as well as in long stream mode V27ter and, respectively in case of resumption (24d), FIGS. 25a to 25f, a receiving end sequence respectively following a long stream V29(25a), after a long stream V27ter (25b), a receiving sequence of flags and data and end of receiving in short stream mode V29 (25c), in short stream mode V27ter (25d), in long stream mode V29 (25e) and in long stream mode V27ter (25f), FIG. 26a, an automatic communication apparatus of a unit (caling mode and called mode) being understood that a particular unit can implement both modes, or only one of the modes, and FIG. 26b showing the beginning of the automatic connection device (connection) in the two modes.
Figure 22B:
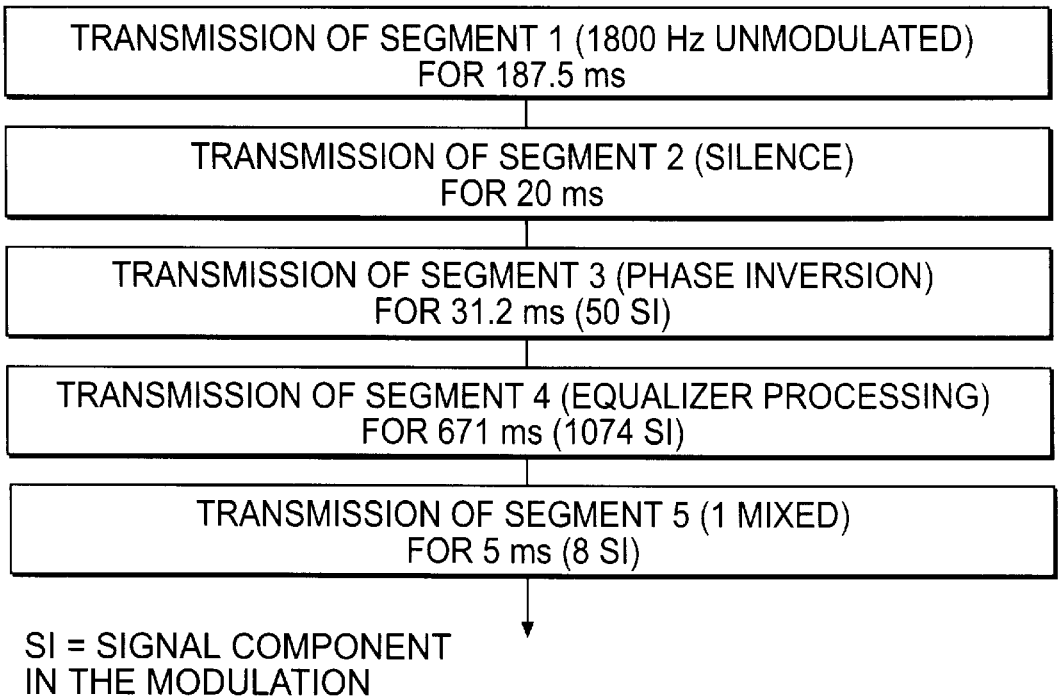
Figure 22C:
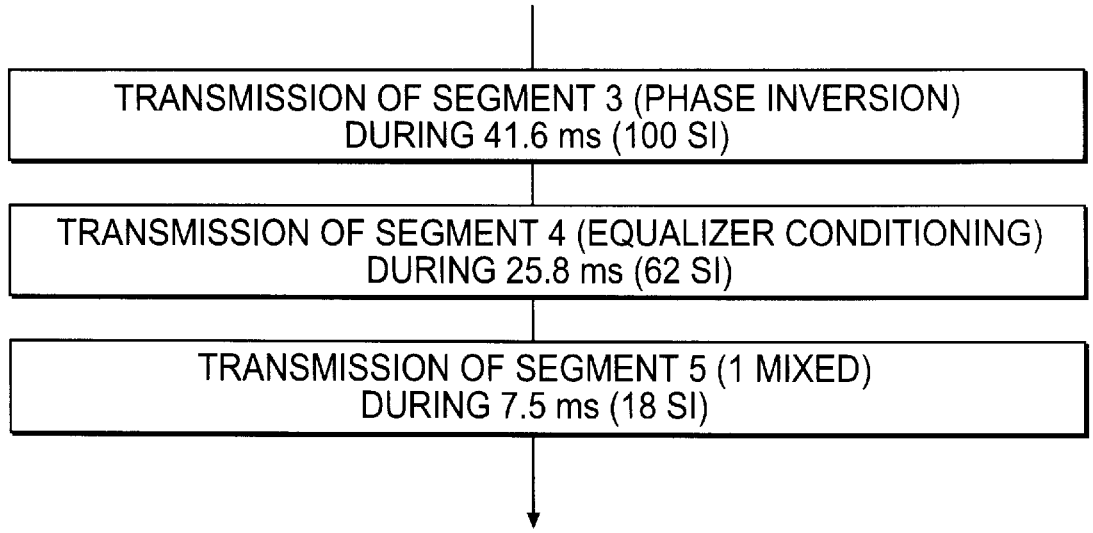
Figure 22D:
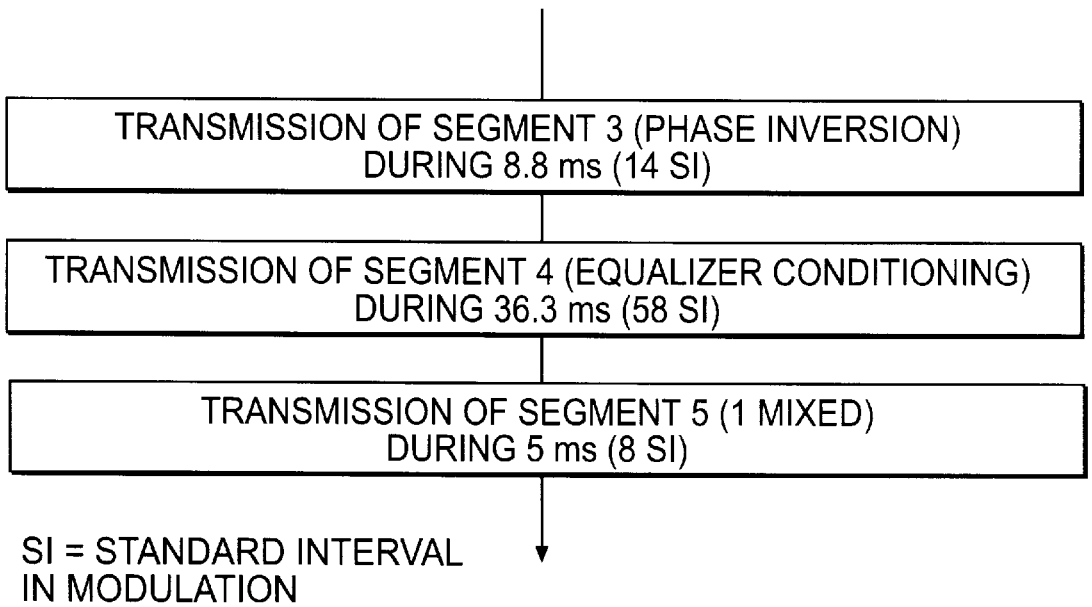
Figure 23A:
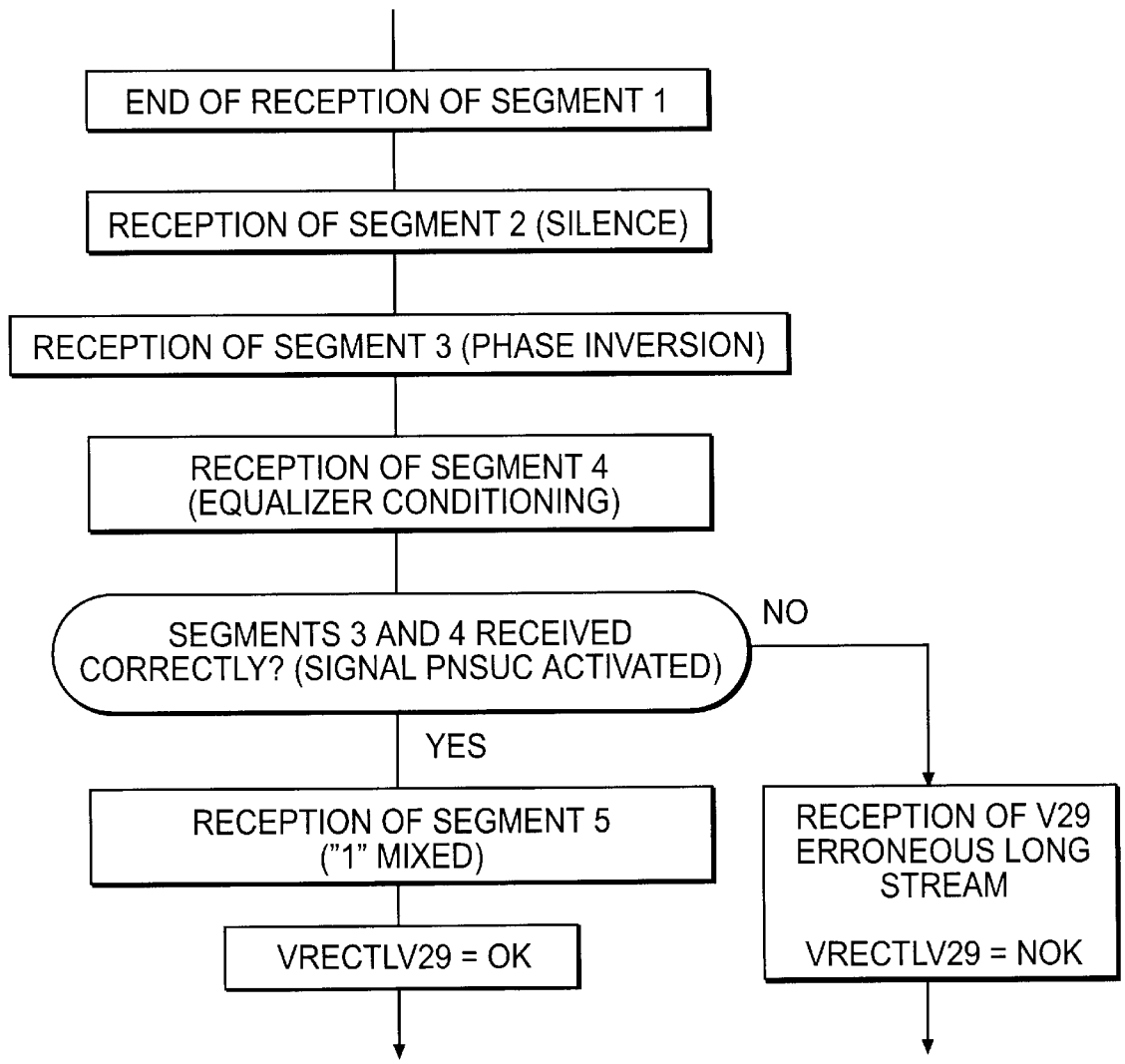
Figure 23B:
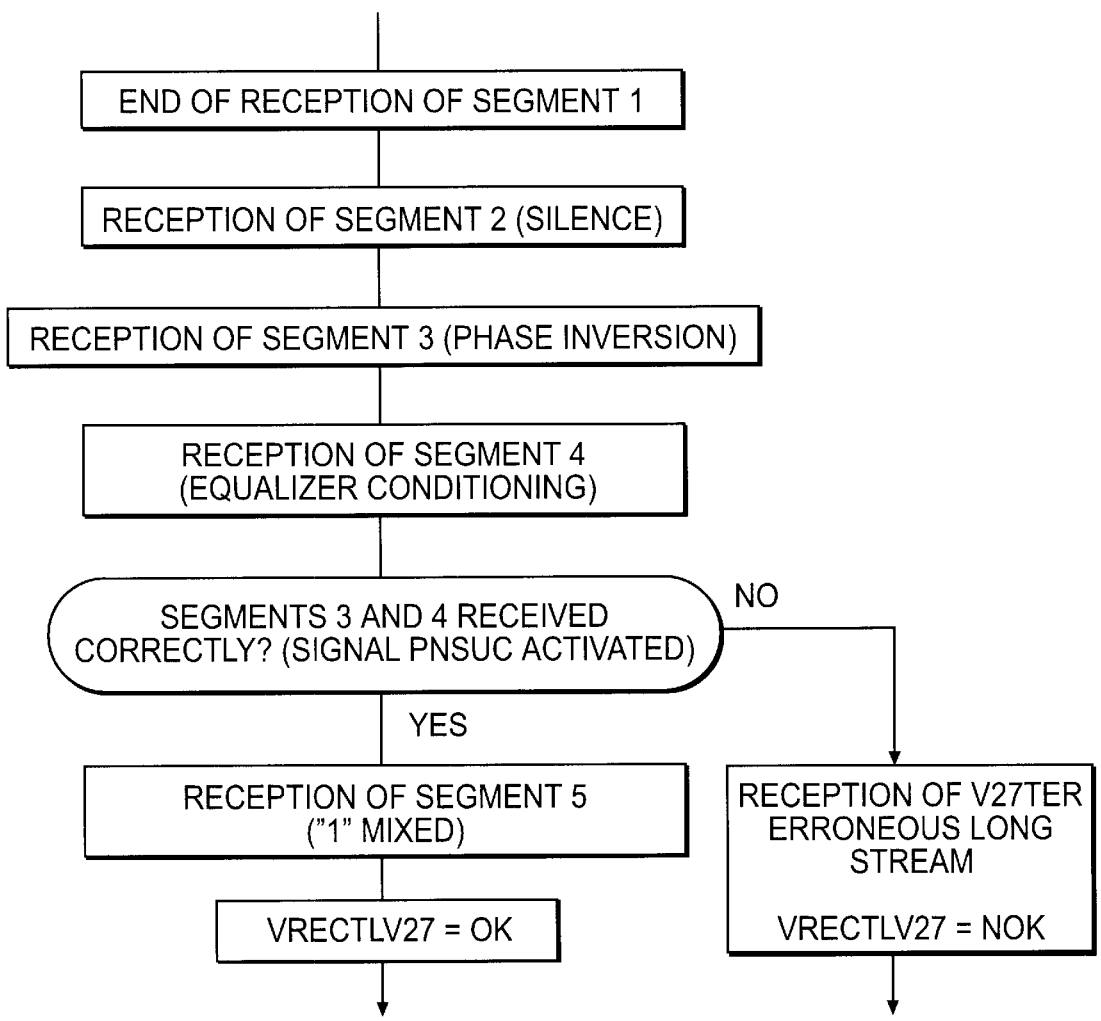
Figure 23C:
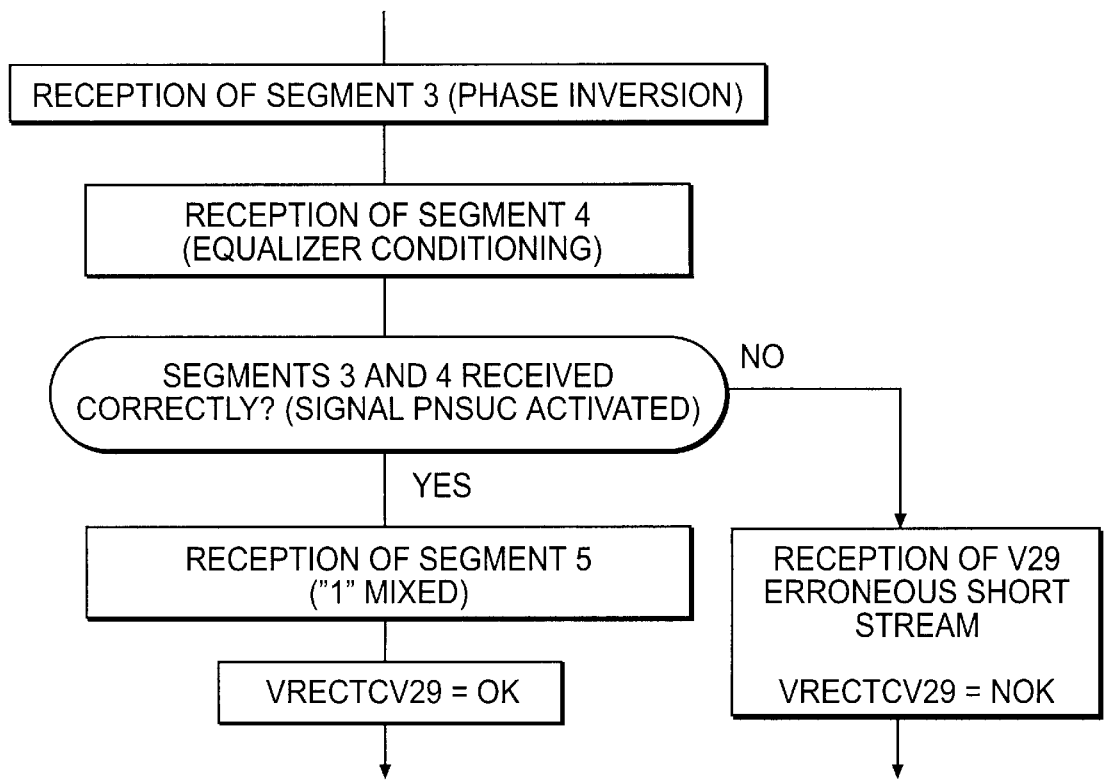
Figure 23D:
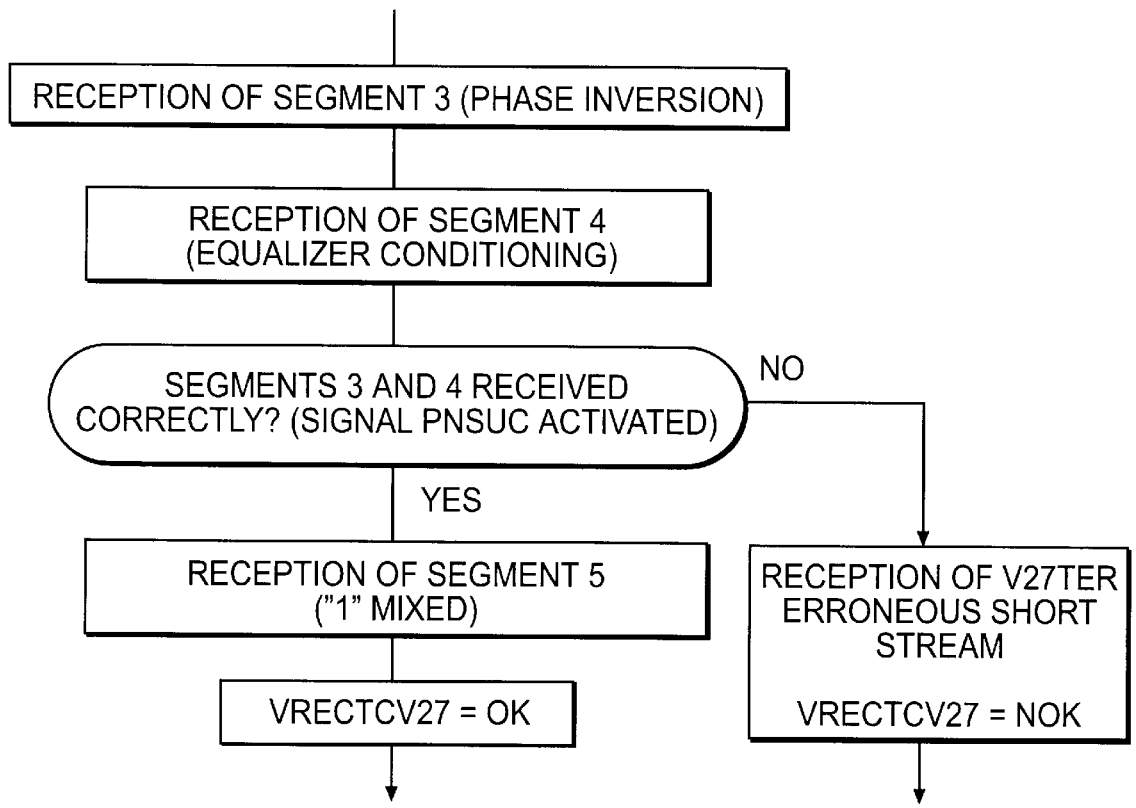

FIGS. 21a to 21s give writing instructions for elementary operations which are implemented in the sequencer, starting with a set of instructions of Rockwell R96-VFX modem, for operation in V27ter or in V29. These instructions are implemented in the sequences of the level immediately higher of FIGS. 22a to 22d for transmission of long and short streams in V27ter and V29, and for reception of these streams in FIGS. 23a to 23d, for which one will note in particular the characteristic signals VRECTL V29 and VRECTC V29, VRECTTL V27 and VRECTTC V27 which characterize correct reception (=OK) respectively of a V29 long stream, of a V29 short stream, of a V27ter long stream and a V27ter short stream.

Figure 24A:
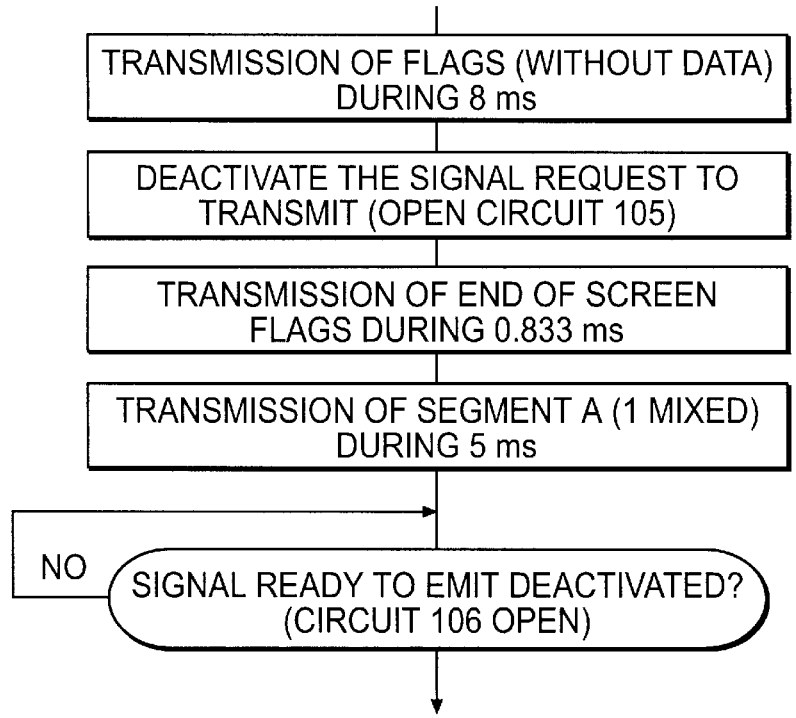
Figure 24B:
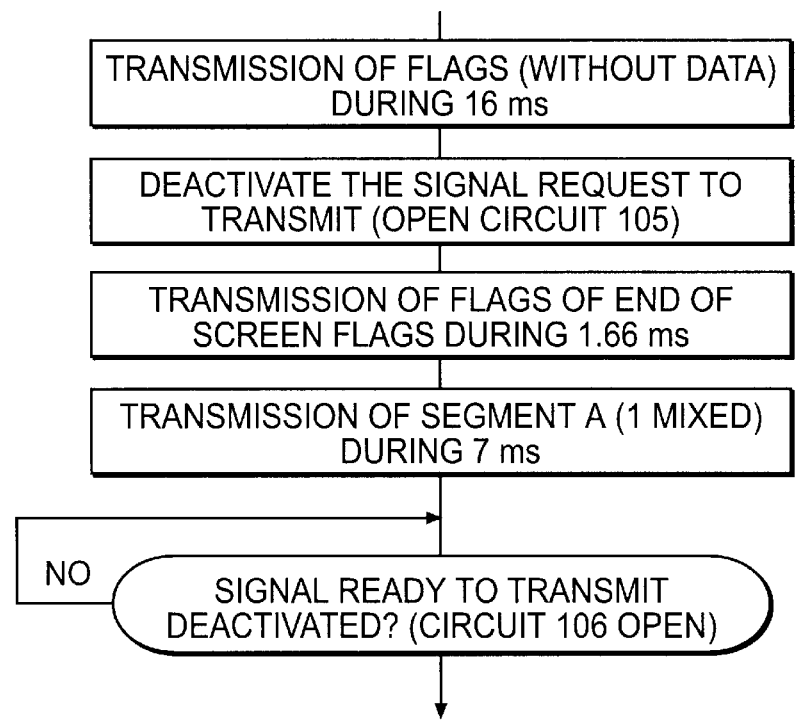
Figure 24C:
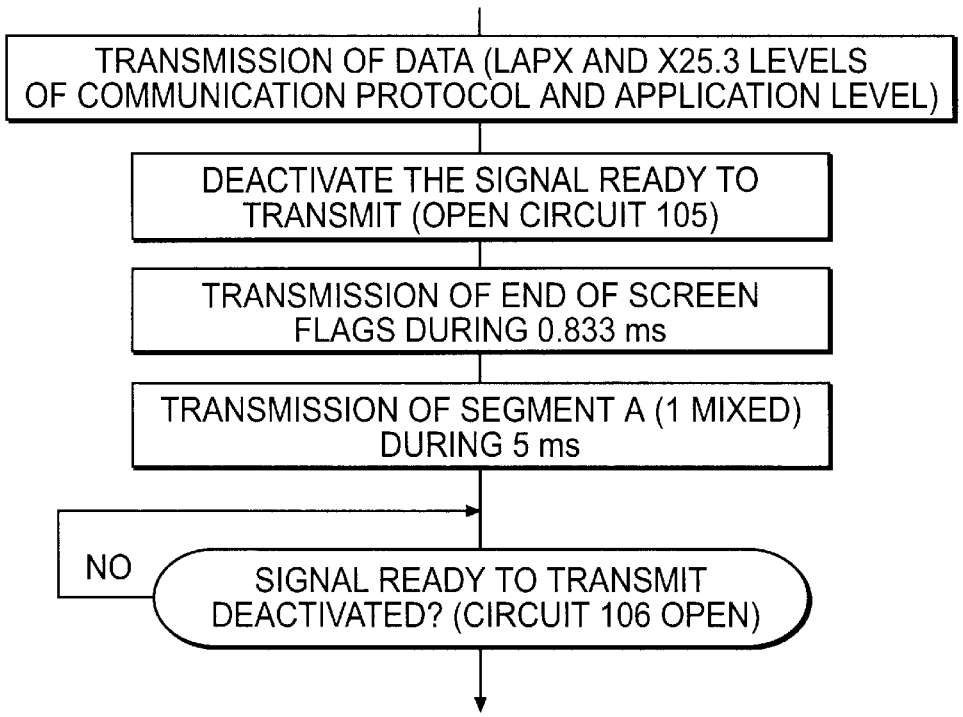
Figure 24D:
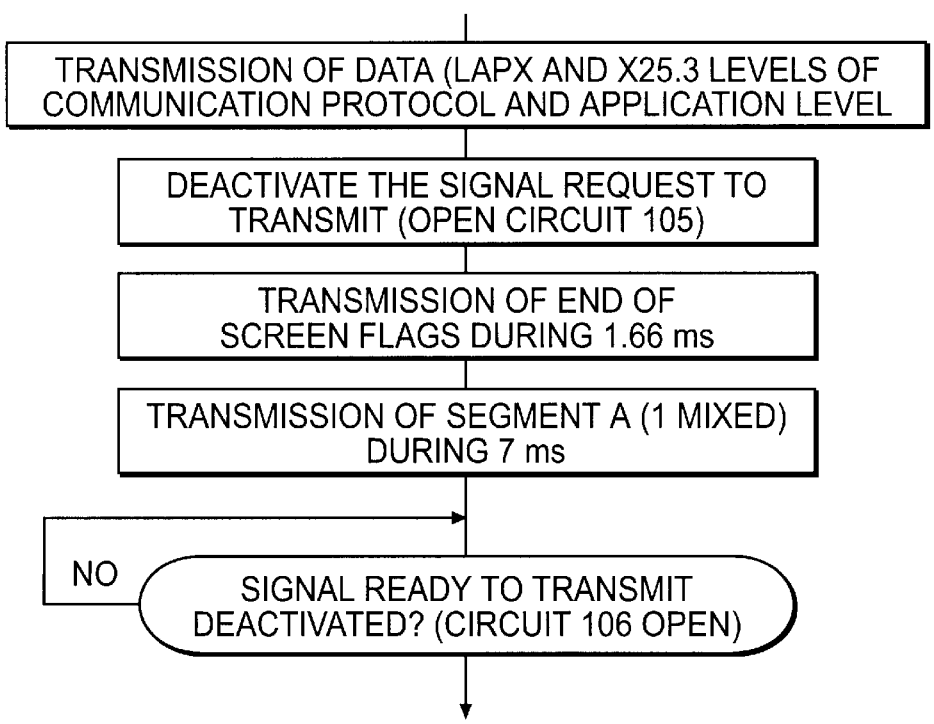
Figure 25A:
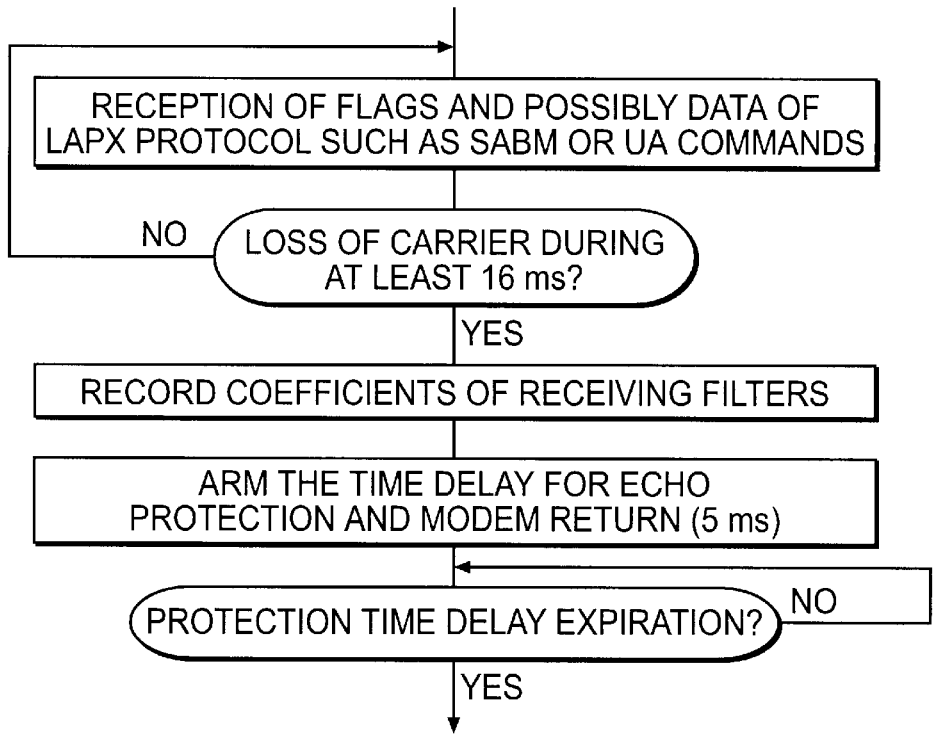
Figure 25B:
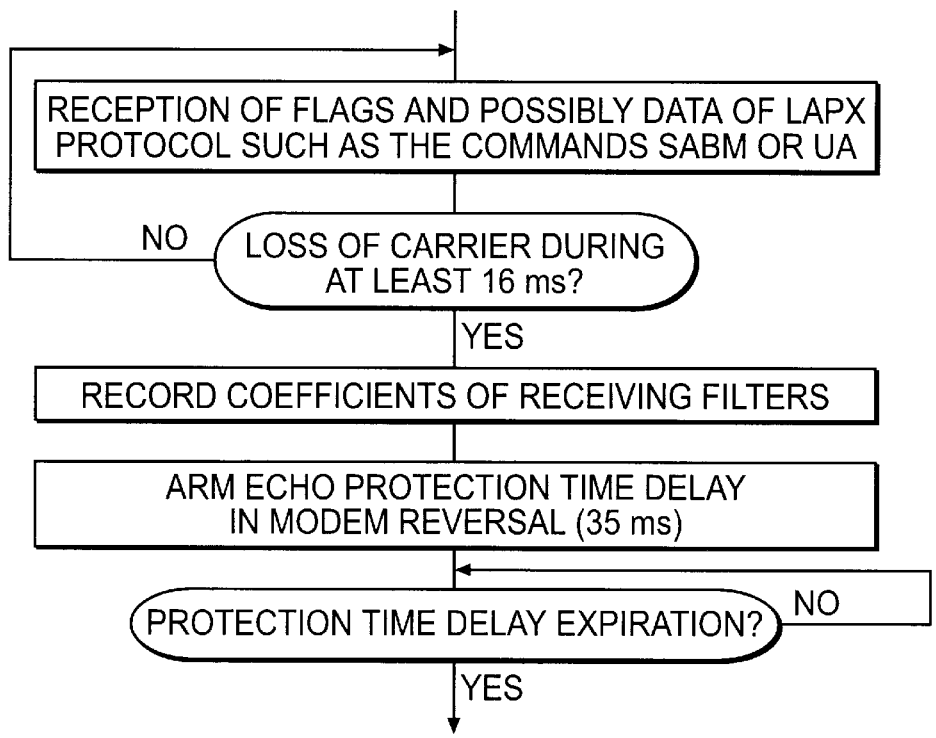
Figure 25C:
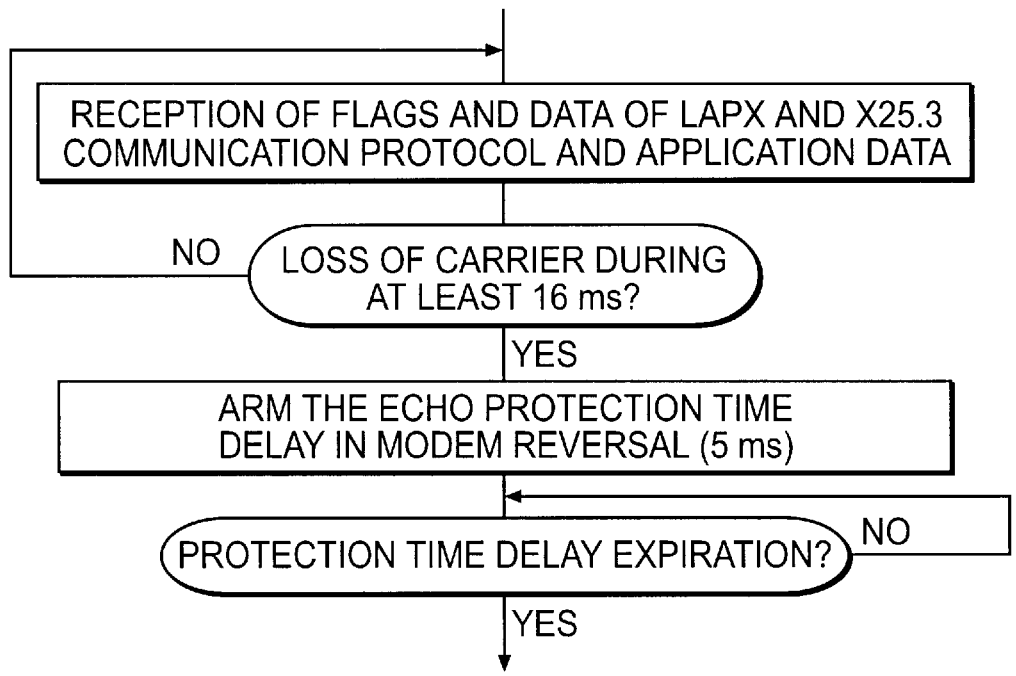
Figure 25D:
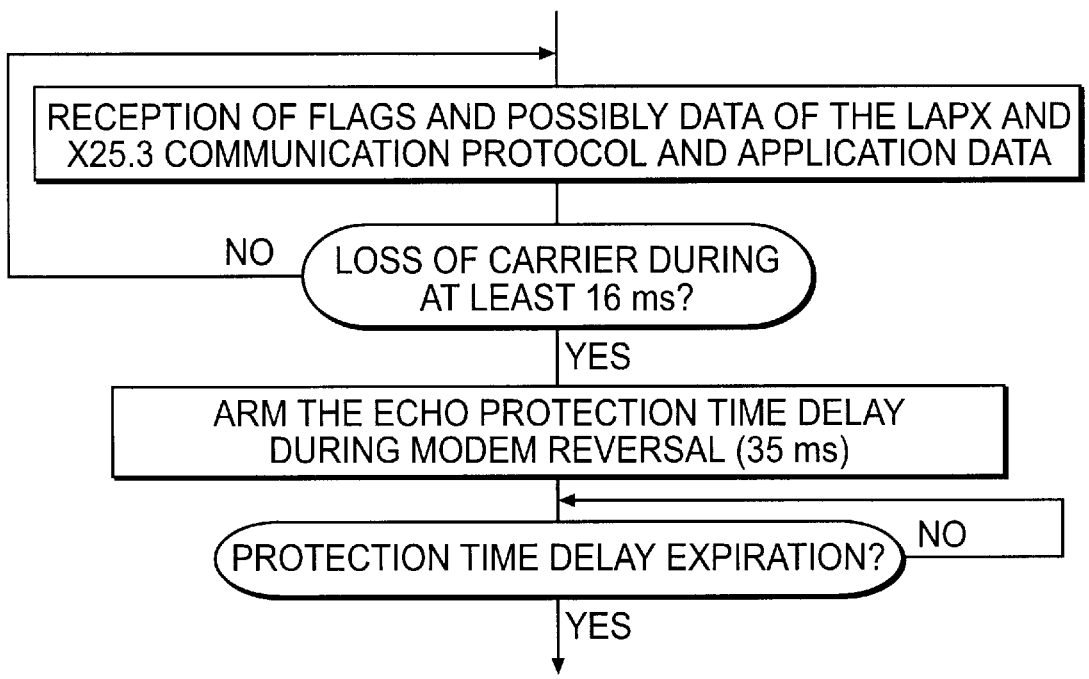
Figure 25E:
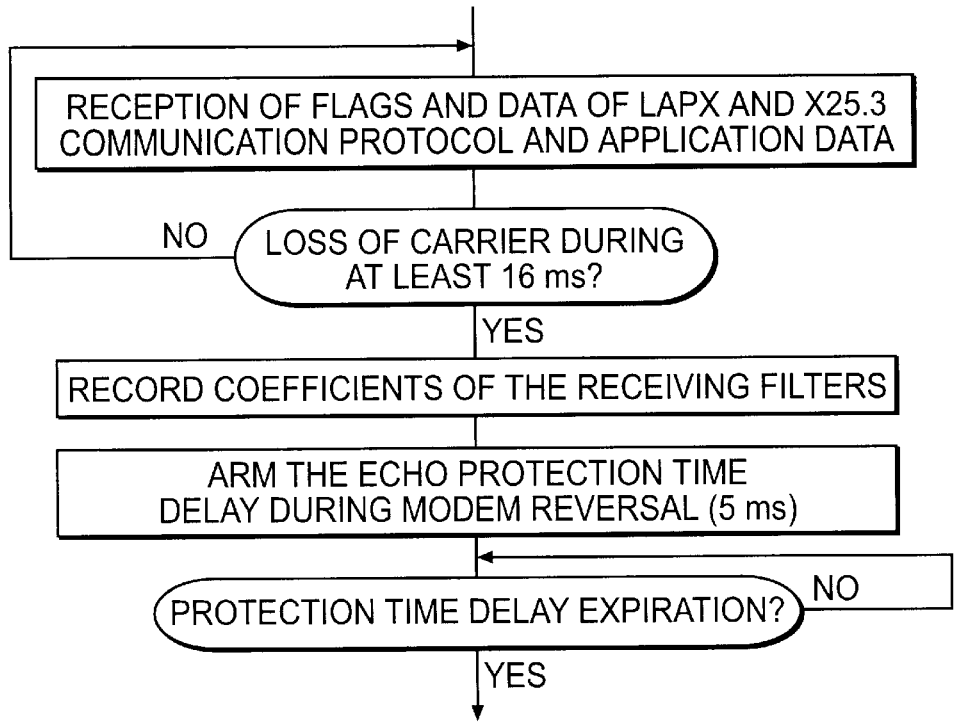
Figure 25F:
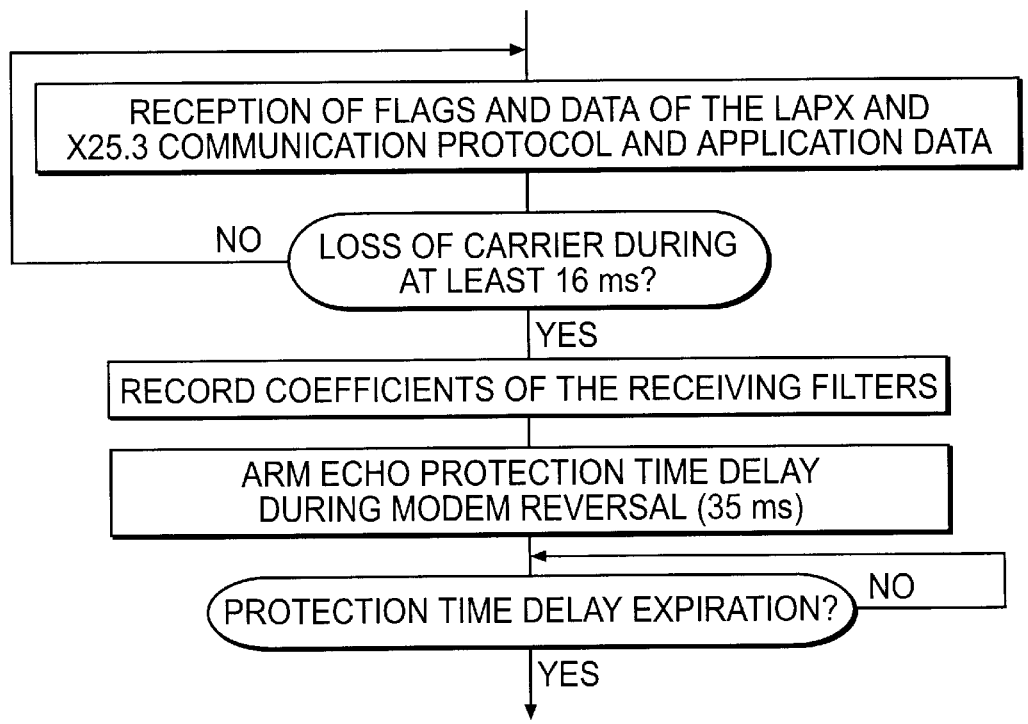

FIGS. 24 to 24d characterize the end of transmission phases of such streams, FIGS. 25a to 25f characterize the end of reception of such streams, and FIG. 25c to f pertains to the case of long or short streams which have certain applications (pennant or "flags" and data).

Figure 26A:
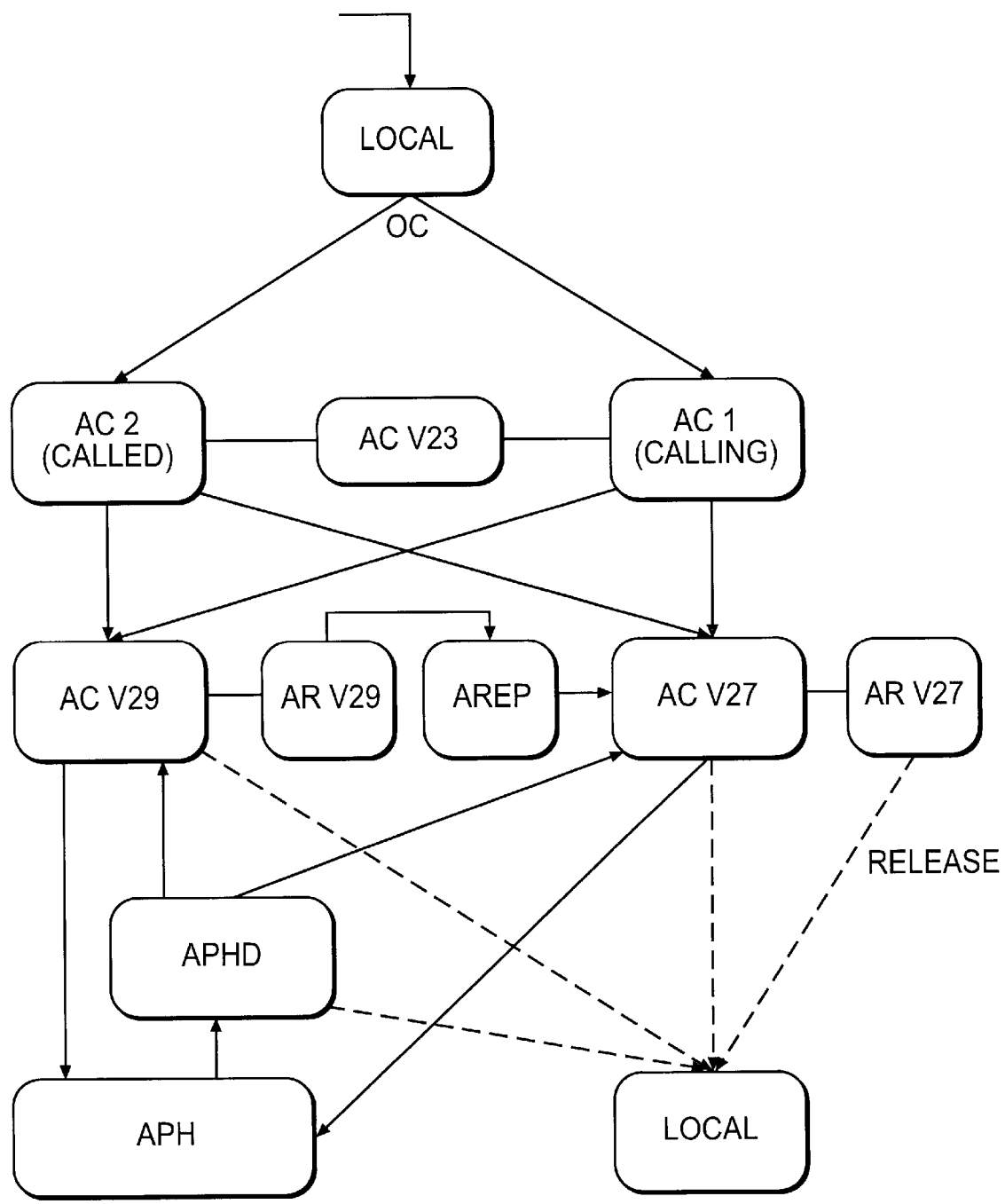

The automatic unit of FIG. 26a includes a sequence for functioning in local mode, allowing one to switch following a transmitted or received connection order to an automatic unit for connection in AC1 calling mode, or to an automatic unit for connection in AC2 called mode, which are also connected to an automatic unit for ACV23 communication in V23 mode. Each of the automatic units AC1 and AC2 is connected to an ACV27ter automatic unit in V27ter mode and/or to an ACV29 automatic unit in V29 mode. The ACV29 automatic unit is connected to an automatic unit for resumption in ARV29 V29 mode, in order to allow one or several attempts at resumption-adjustment in V29 mode which can also be connected to an AREP automatic doubling unit allowing doubling to automatic unit ACV27. Automatic unit ACV27 can also be joined to an automatic unit ARV27 for resumption in V27 mode in order to allow one or several attempts of resumption-adjustment in V27ter mode. Automatic units ACV27 and ACV29 are also connected to an automatic unit APH which allows passage in telephony mode, which is in turn connected to an automatic unit APHD for telephony-data switching for return to positioning in V29 mode (automatic unit ACV29), or in V27ter mode (automatic unit ACV27).

In addition, the line can be released (returned to "local") from automatic units ACV29, ACV27, ARV27 and APHD.

Figure 26B:
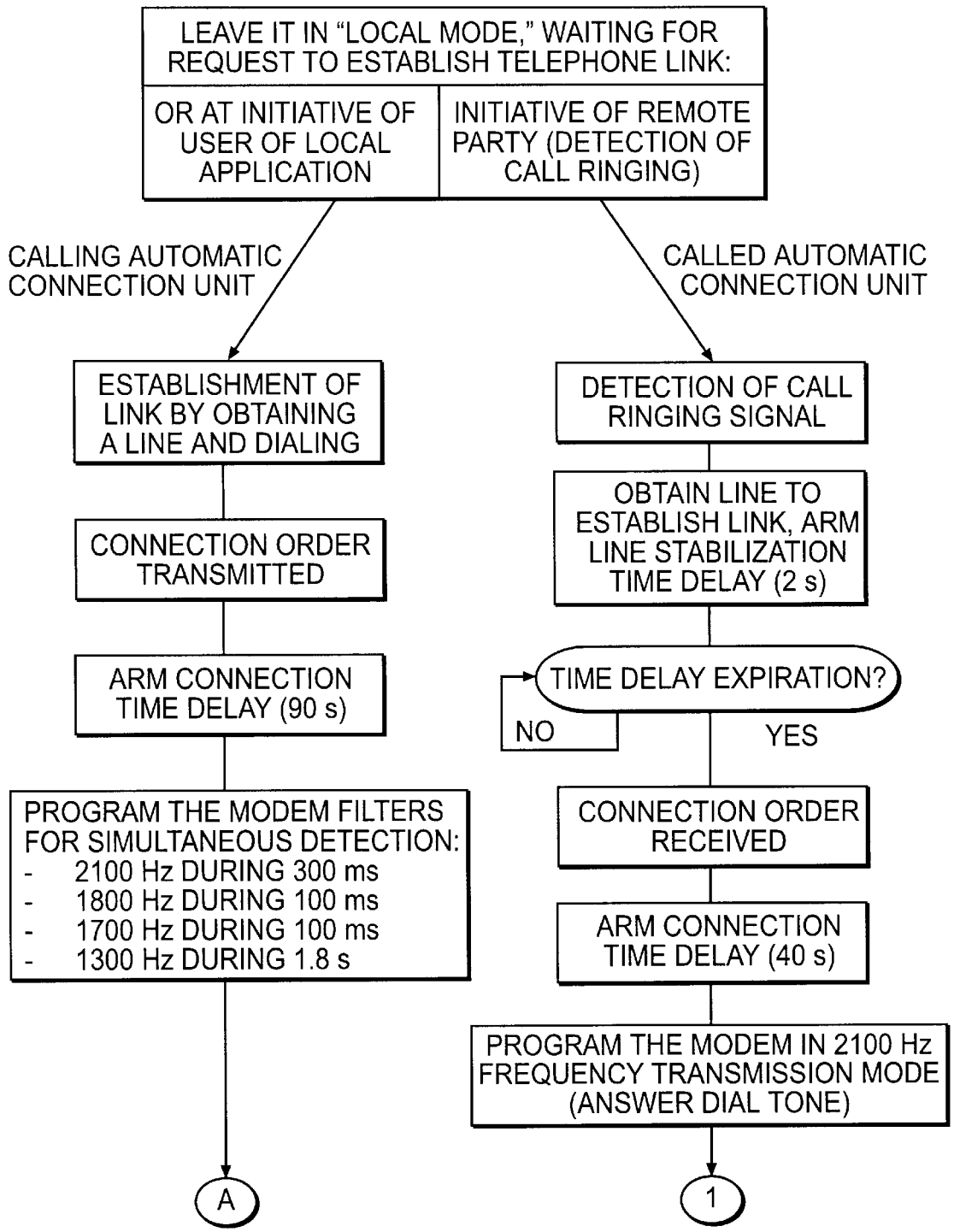
Figure 27A:
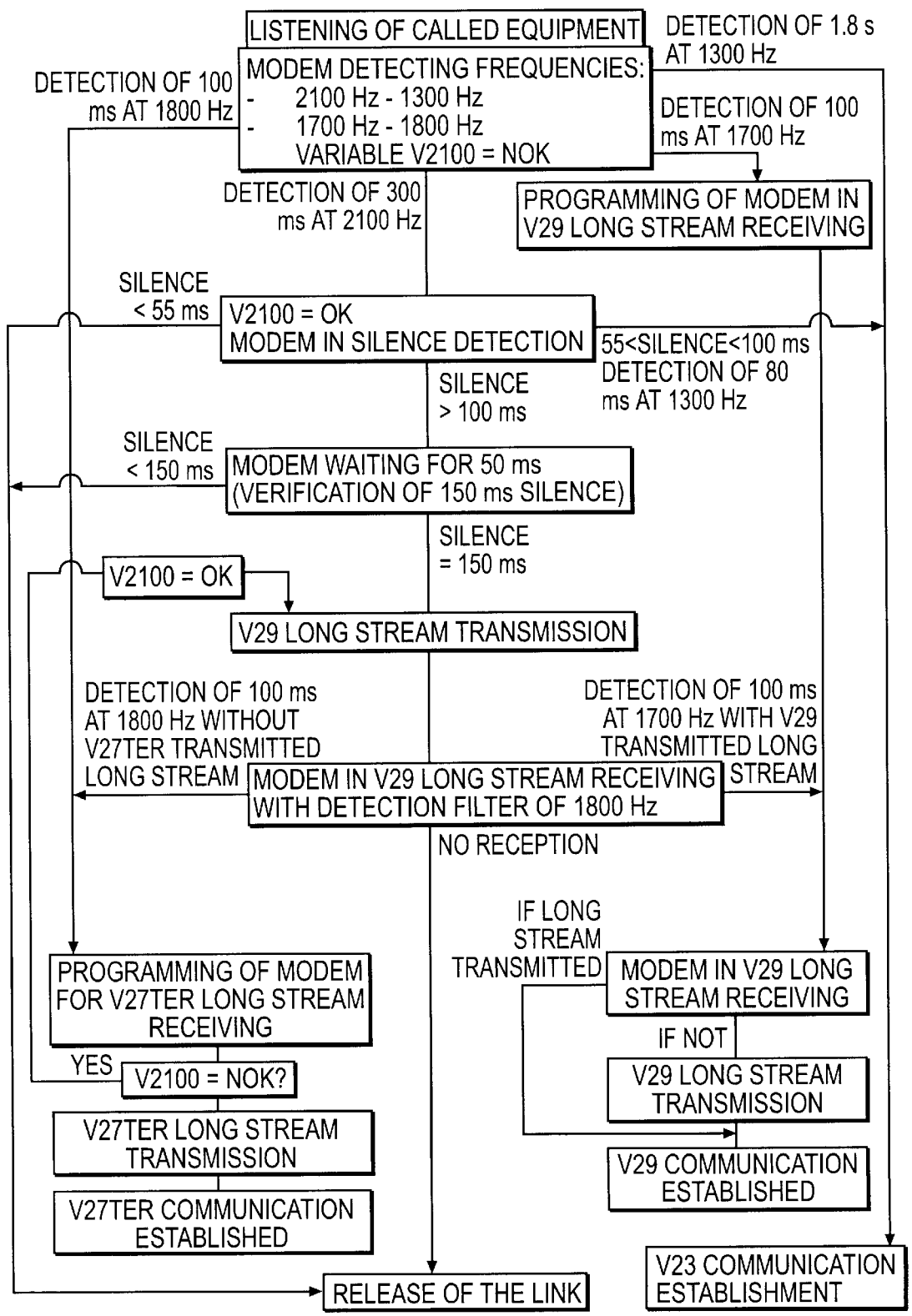
FIGS. 27a to 27g, the automatic connection device in calling mode and implementing elementary sequences of FIGS. 22a to 25f, FIGS. 28a to 28e, the automatic connection device in called mode of FIG. 26 and implementing the elementary sequences of FIGS. 23 to 25, FIGS. 29a to 29c, an automatic data telephony switching device which implements elementary sequences of FIGS. 22a to 25f, FIGS. 30a to 30d, an automatic device for communication and resumption adjustment in V29 modulation (30a and 30d) and in V27ter modulation (30c and 30d) implementing elementary sequences of FIGS. 22a to 25f.
Figure 27B:
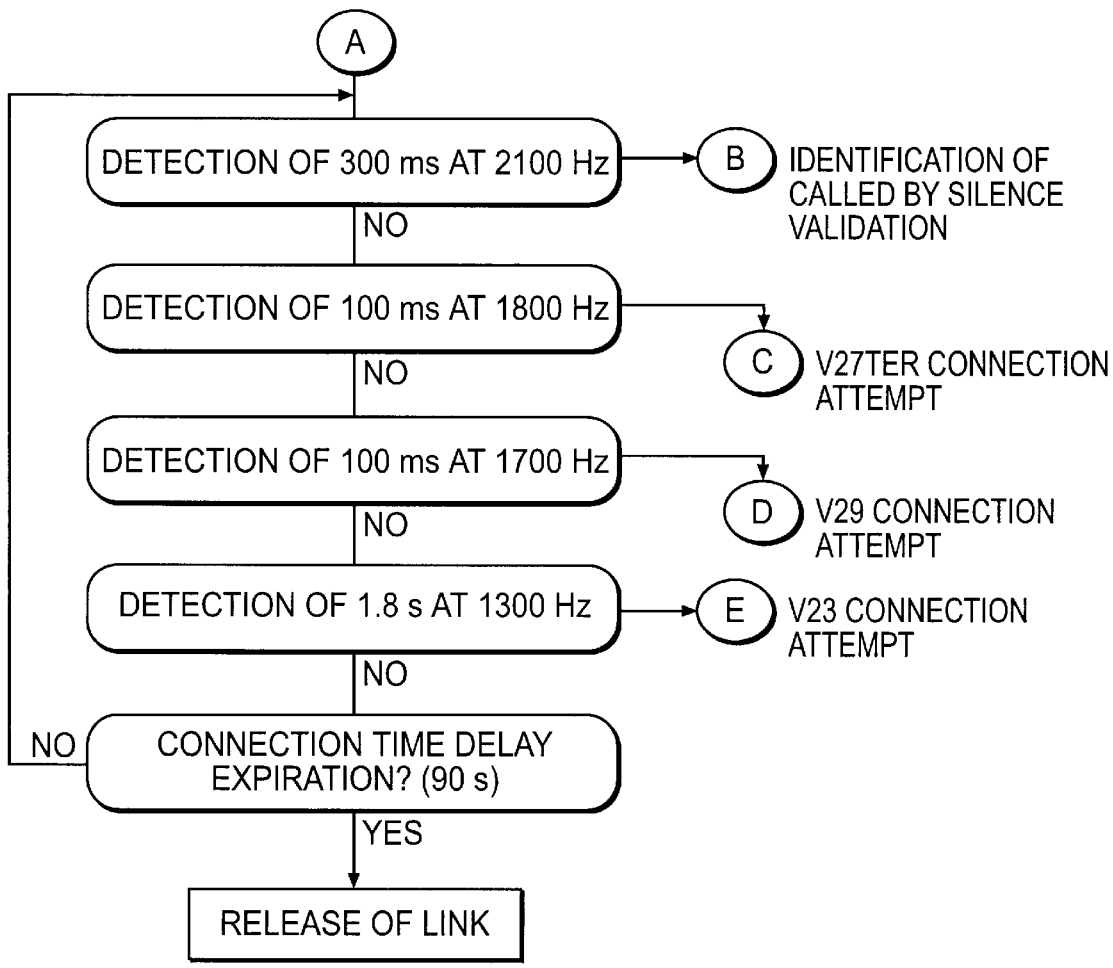

According to FIG. 26b, the automatic unit in calling mode (left column) following the connection order that it transmits following telephone connection at its initiative, with a time delay (90 s), programs simultaneous detection by the mode of several frequencies (1300 Hz, 1700 Hz, 1800 Hz, 2100 Hz) (FIG. 27b). In called mode the automatic unit allows, following a received connection order with connection time delay of 40 s, transmission of an answer dial tone (2100 Hz) (see 1, FIG. 28a).

Figure 27C:
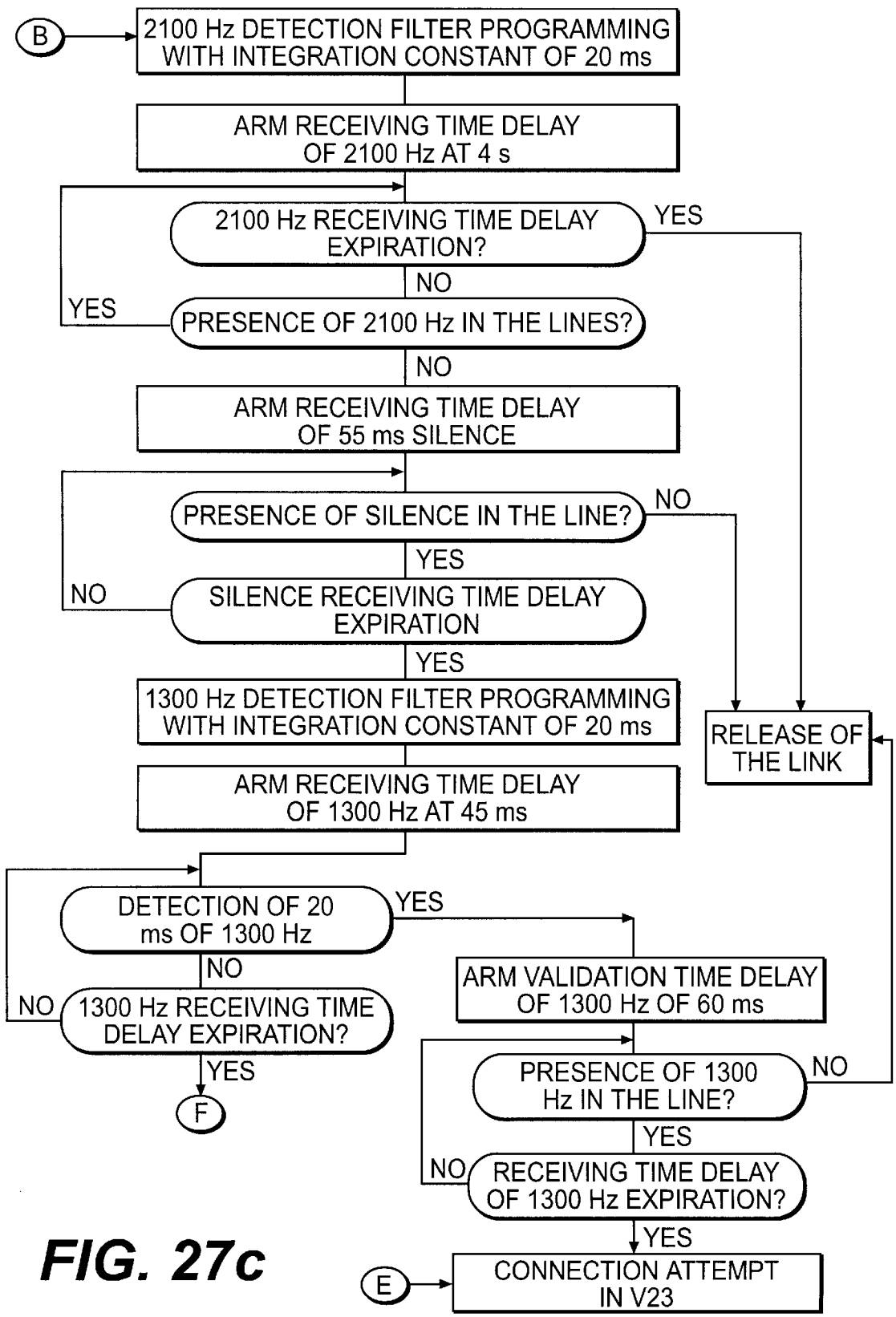
Figure 27D:
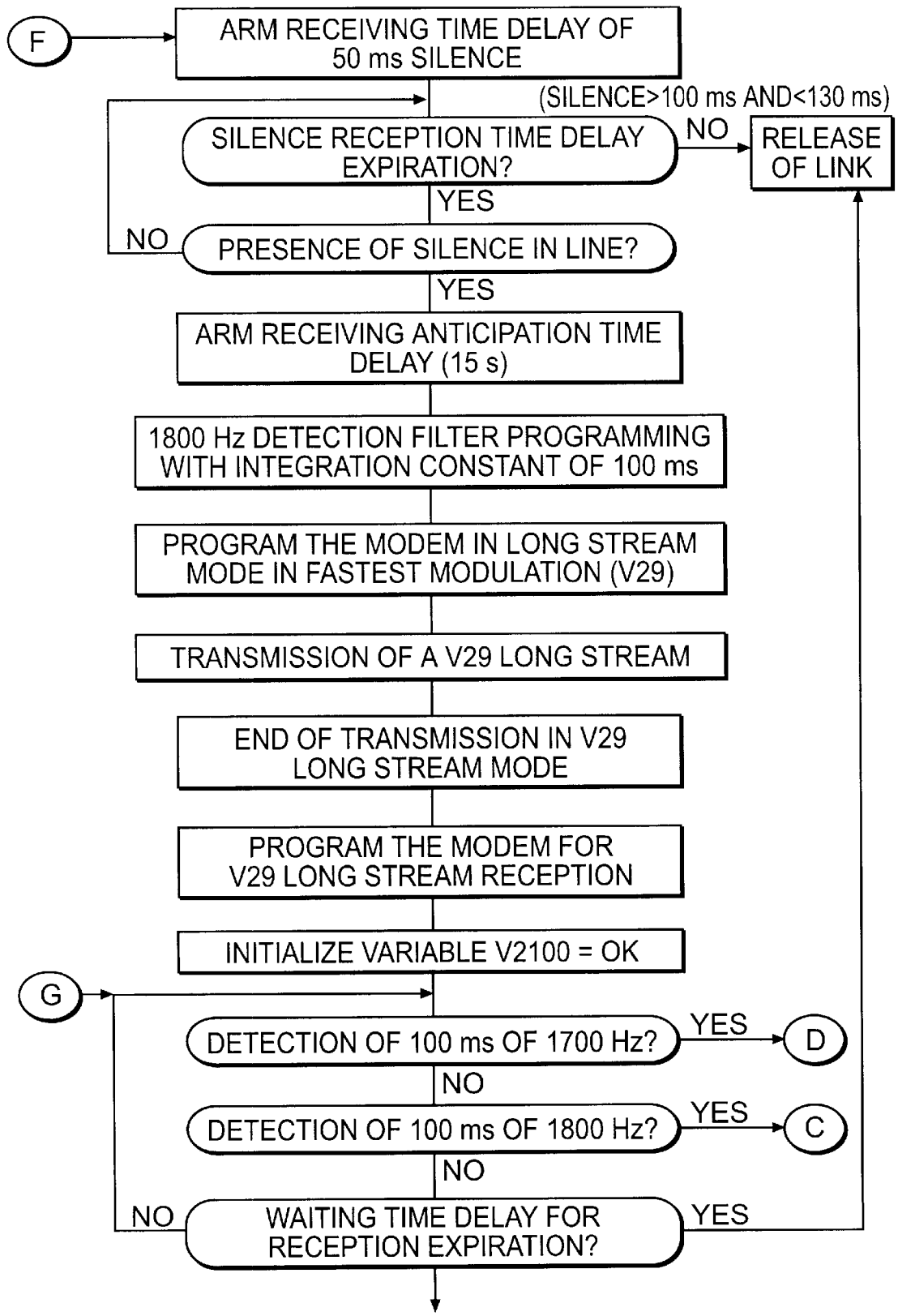
Figure 30A:
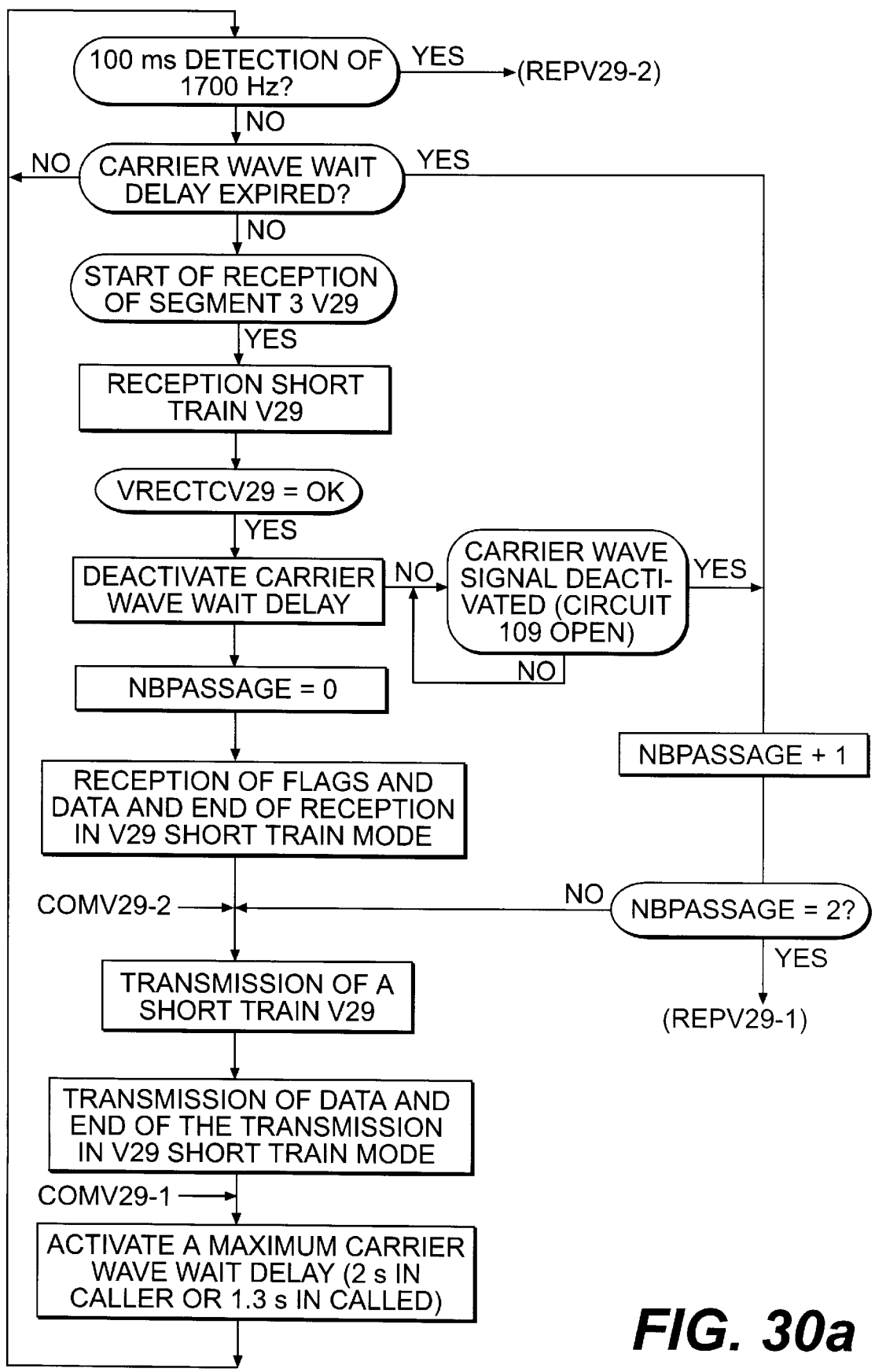
Figure 30B:
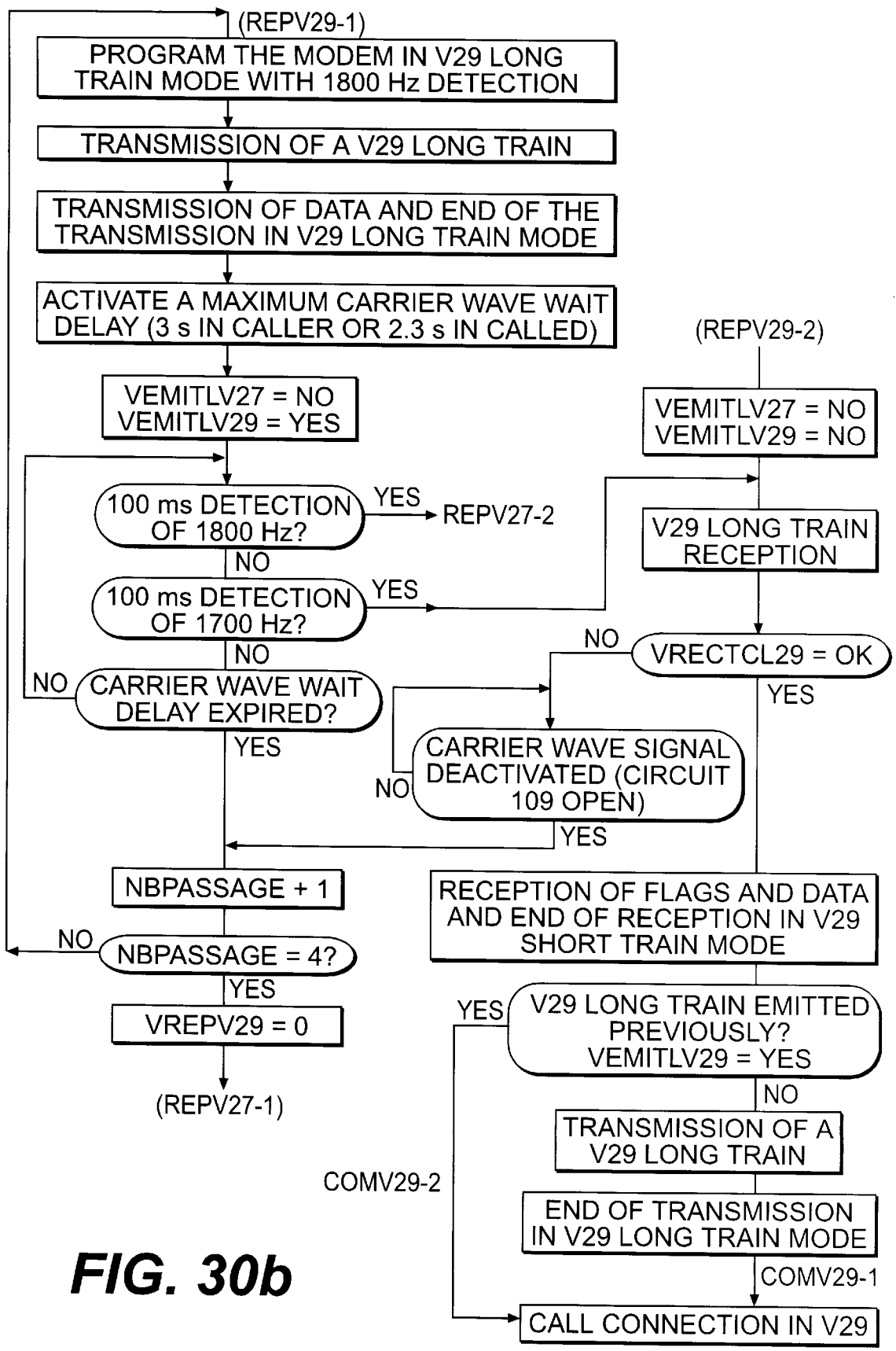
Figure 30C:
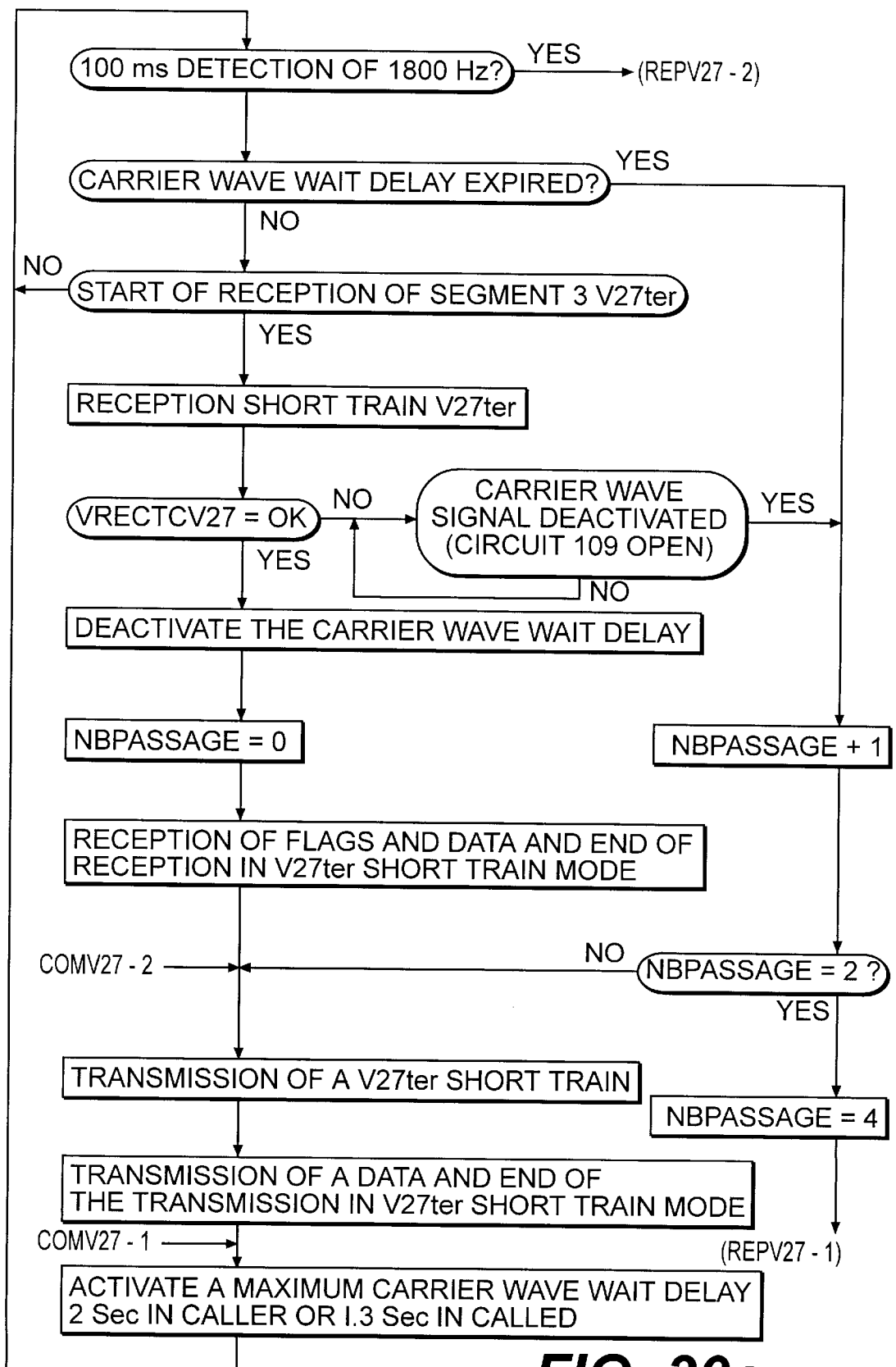

With regard to the automatic unit for connection in calling mode (FIG. 27a to 27g), a general diagram of this is given in FIG. 27a. The left side branch represents a connection in V27ter mode (detection of 1800 Hz) and the right branch in V29 mode (detection of 1700 Hz). FIG. 27b shows the branch effecting detection of characteristic frequencies of each modulation. In the case of detection of 300 ms of the 2100 Hz frequency (so-called anticipated connection), [there is a] transition to point B (FIG. 27c), then in the absence of 1300 Hz which characterizes V23 mode, [there is a] transition from point F (FIG. 27d) to emit a V29 long stream. If there is detection of 1700 Hz, [there is a] transition to point D (FIG. 27f) for establishment of communication in V29 mode. If there is detection of 1800 Hz, the transition is to point C (FIG. 27e), and [there is] emission of a V27ter long stream (because there is no preceding transmission of V27ter long stream) and establishment of communication in V27ter (COM signal V27-1 —see FIG. 30c and 30d). FIG. 27c represents the sequence beginning at point B of FIG. 27b (detection of 300 ms of 2100 Hz) and then leading to an attempt to connect in V23 (20 ms of 1300 Hz), or to point F (FIG. 27d). From point F (FIG. 27d), and following detection of 150 ms of silence, [there is an] attempt to connect in V29 and to connect in V29 mode (point D and FIG. 27f) or in V27ter mode (point G and FIG. 27e).

Figure 27E:
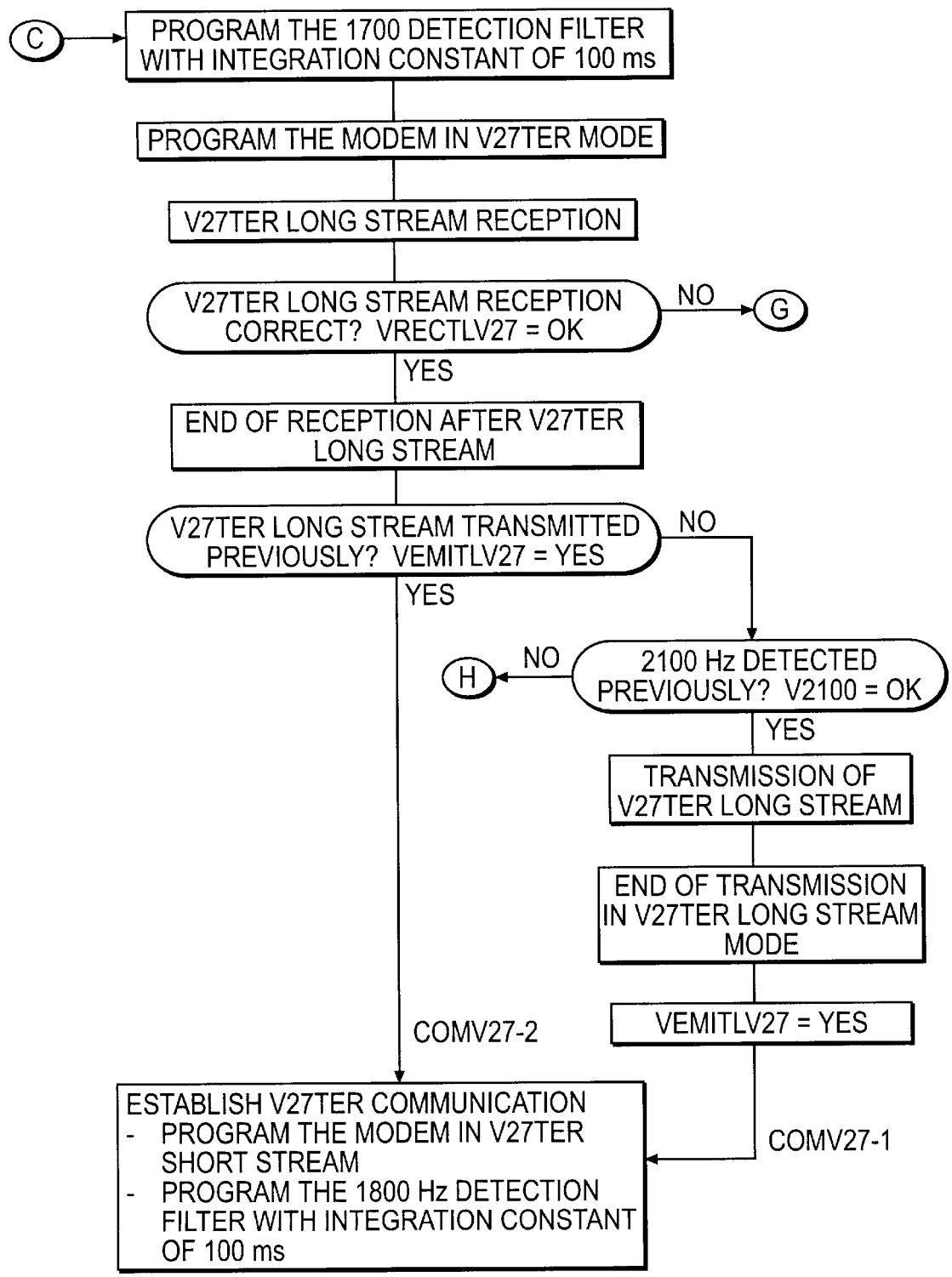
Figure 27F:
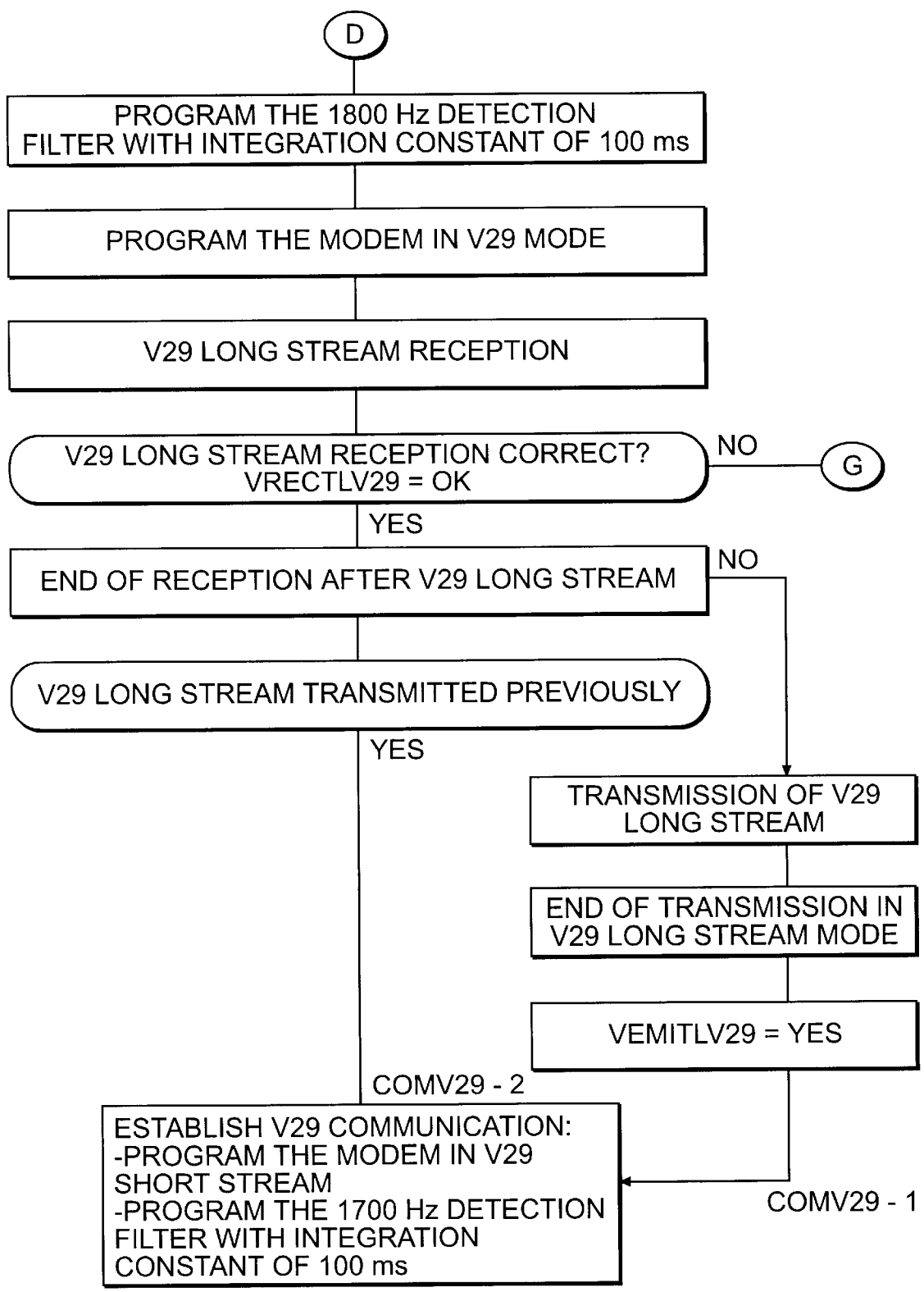
Figure 27G:
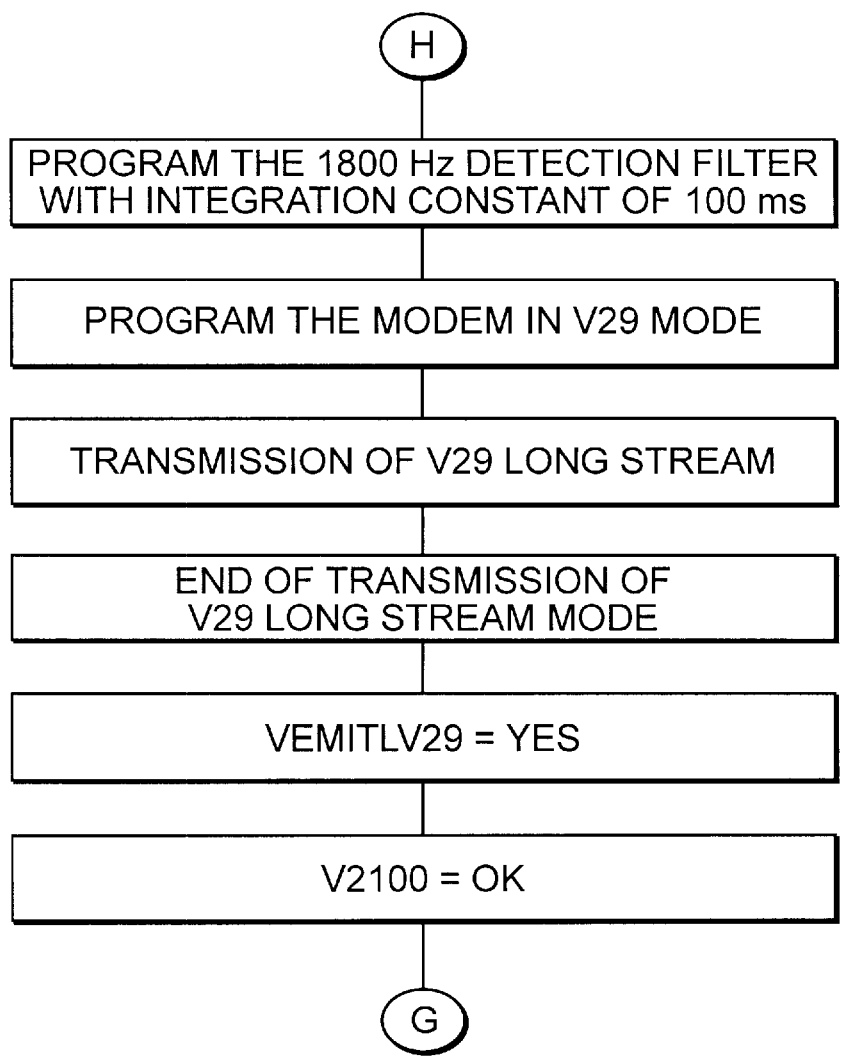

In FIG. 27e, in case of erroneous reception of a V27ter long stream, [there are] new attempts at connection (point G of FIG. 27d) and release of the connection if there is no time delay of 15 s. In FIG. 27f, in case of erroneous reception of a V29 long stream, [there is a] new attempt to connect (point G of FIG. 27d) in V29 and/or in V27ter until expiration of the time delay. In FIG. 27e, following successful reception of a V27ter long stream, and in the absence of a long stream emitted previously and of 2100 Hz detected previously, [there is] emission of a V29 long stream (FIG. 27g; point H) in view of so-called delayed connection in V29 according to case No. 9.

In order to achieve monomodal automatic operation, it suffices to suppress the sequences corresponding to the unused mode (transmission of long and short streams, detection of the unmodulated carrier frequency) in FIGS. 27a to 27g.

Figure 28A:
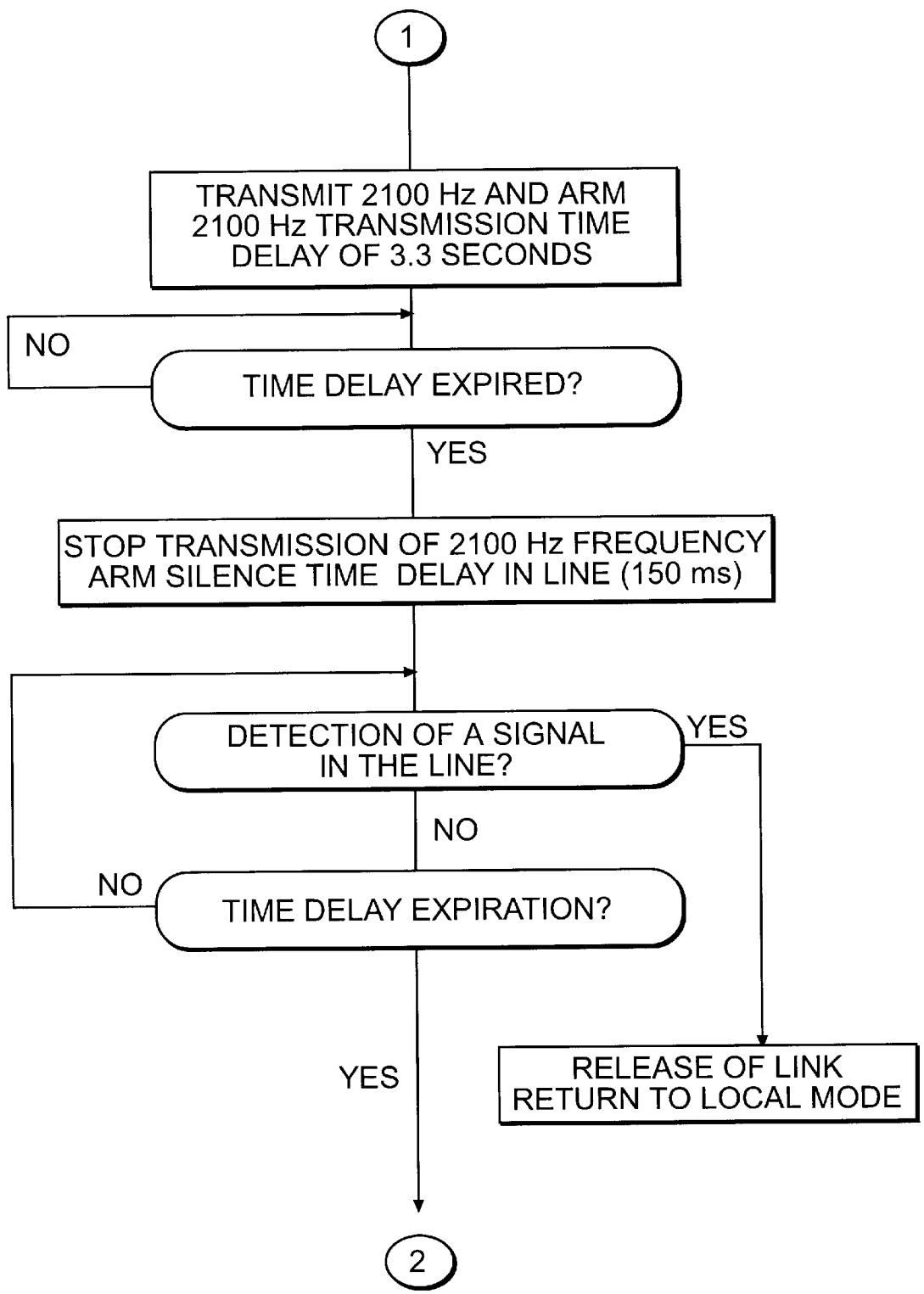
Figure 28B:
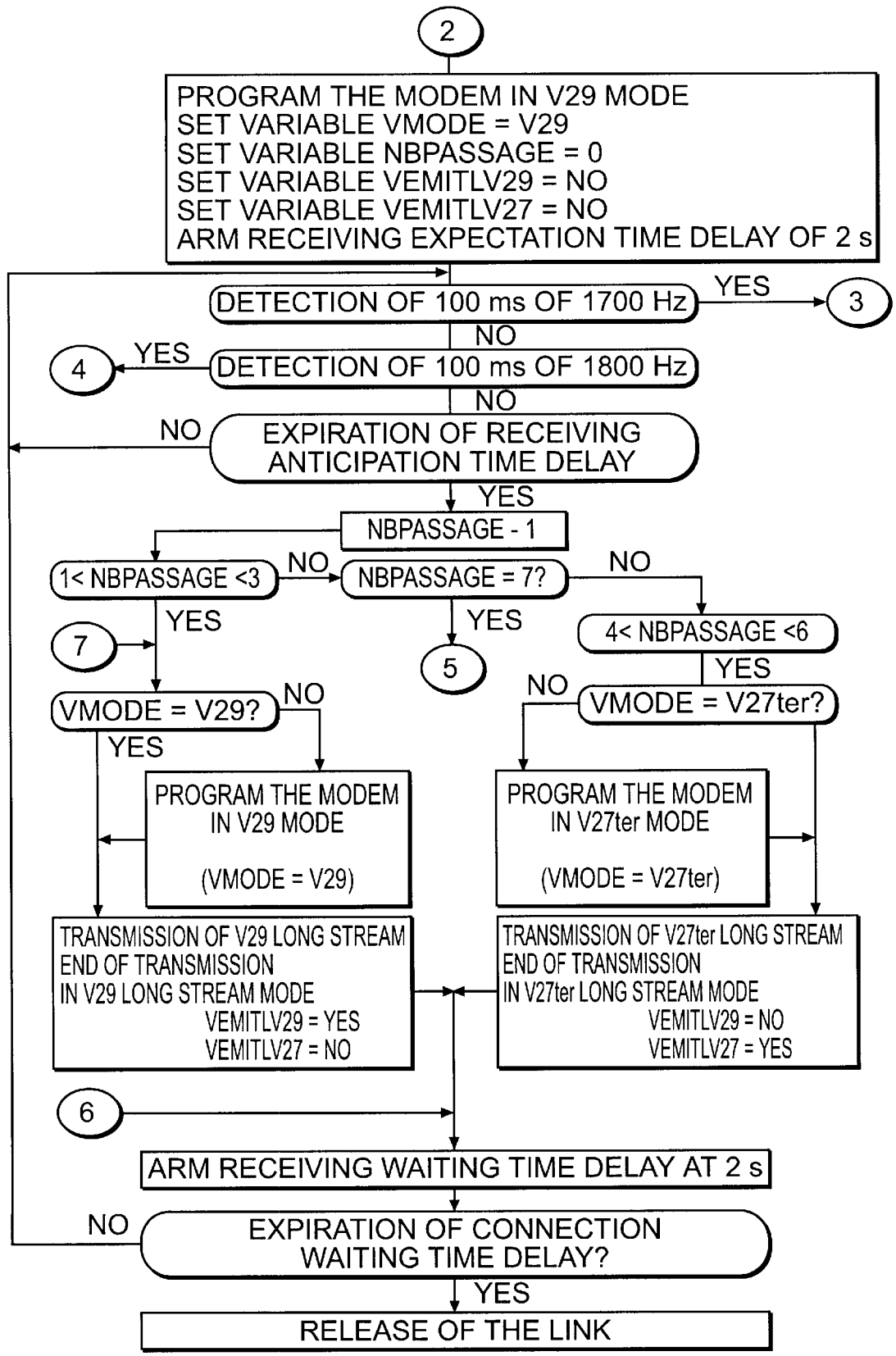
Figure 28C:
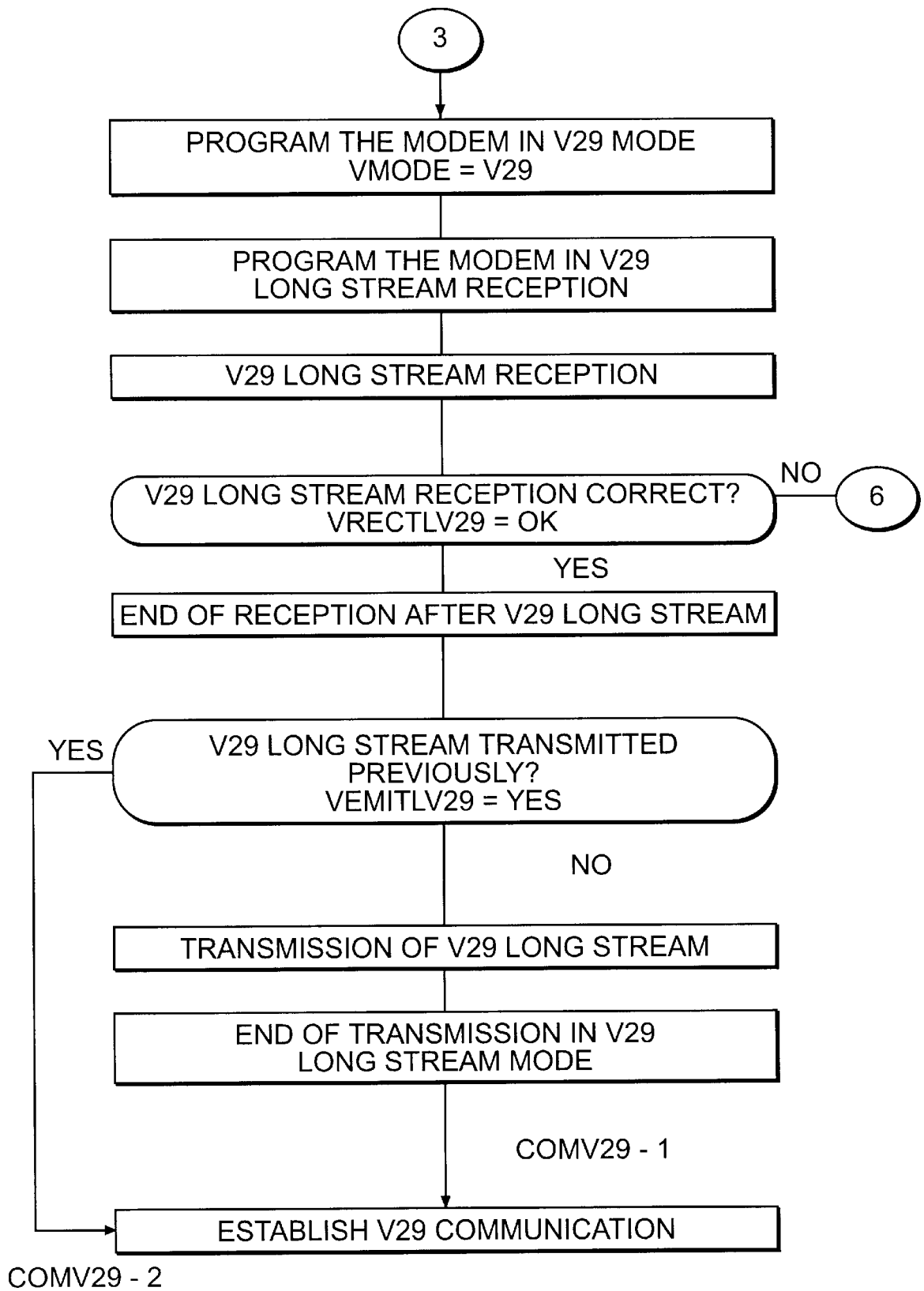
Figure 28D:
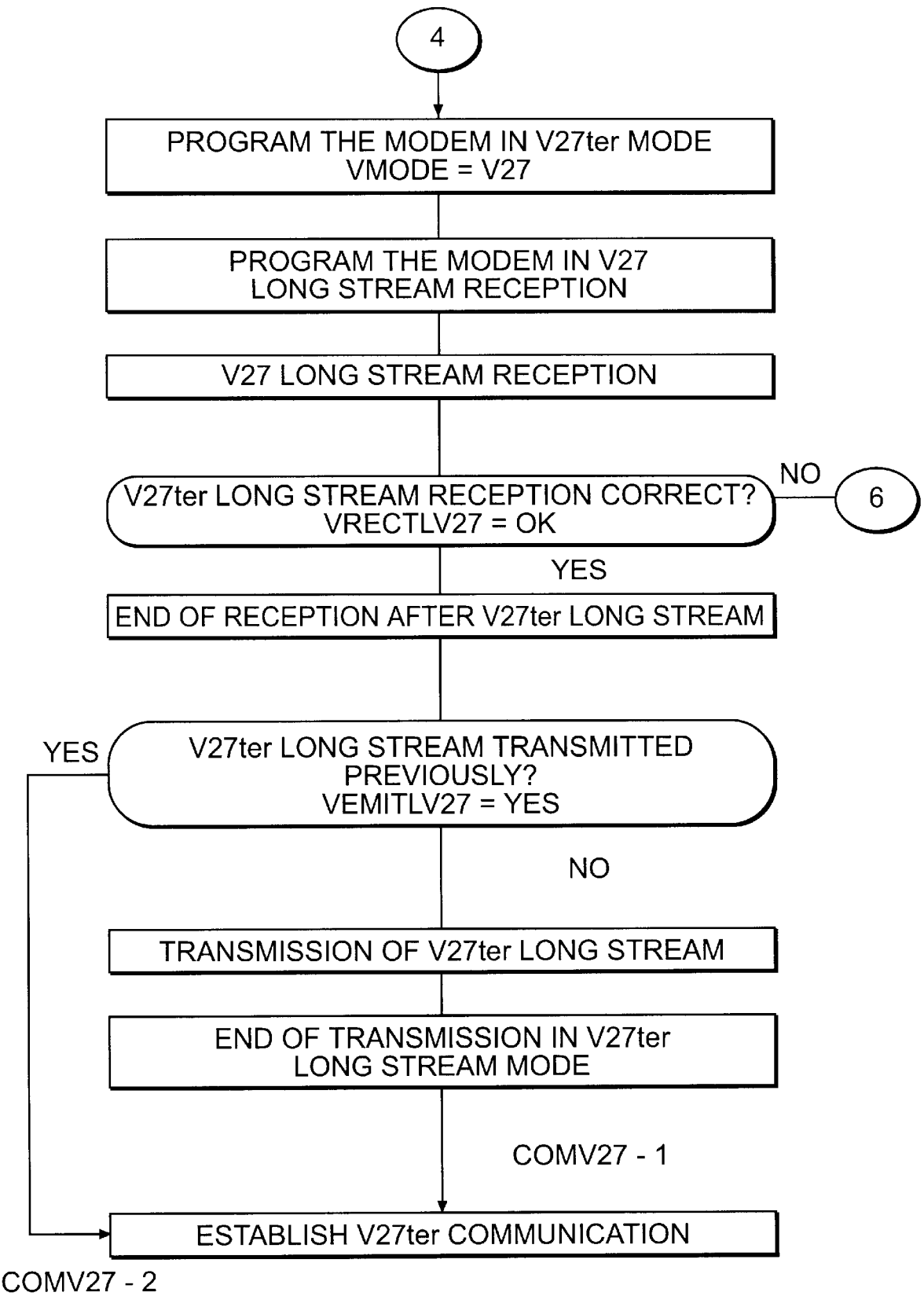
Figure 28E:
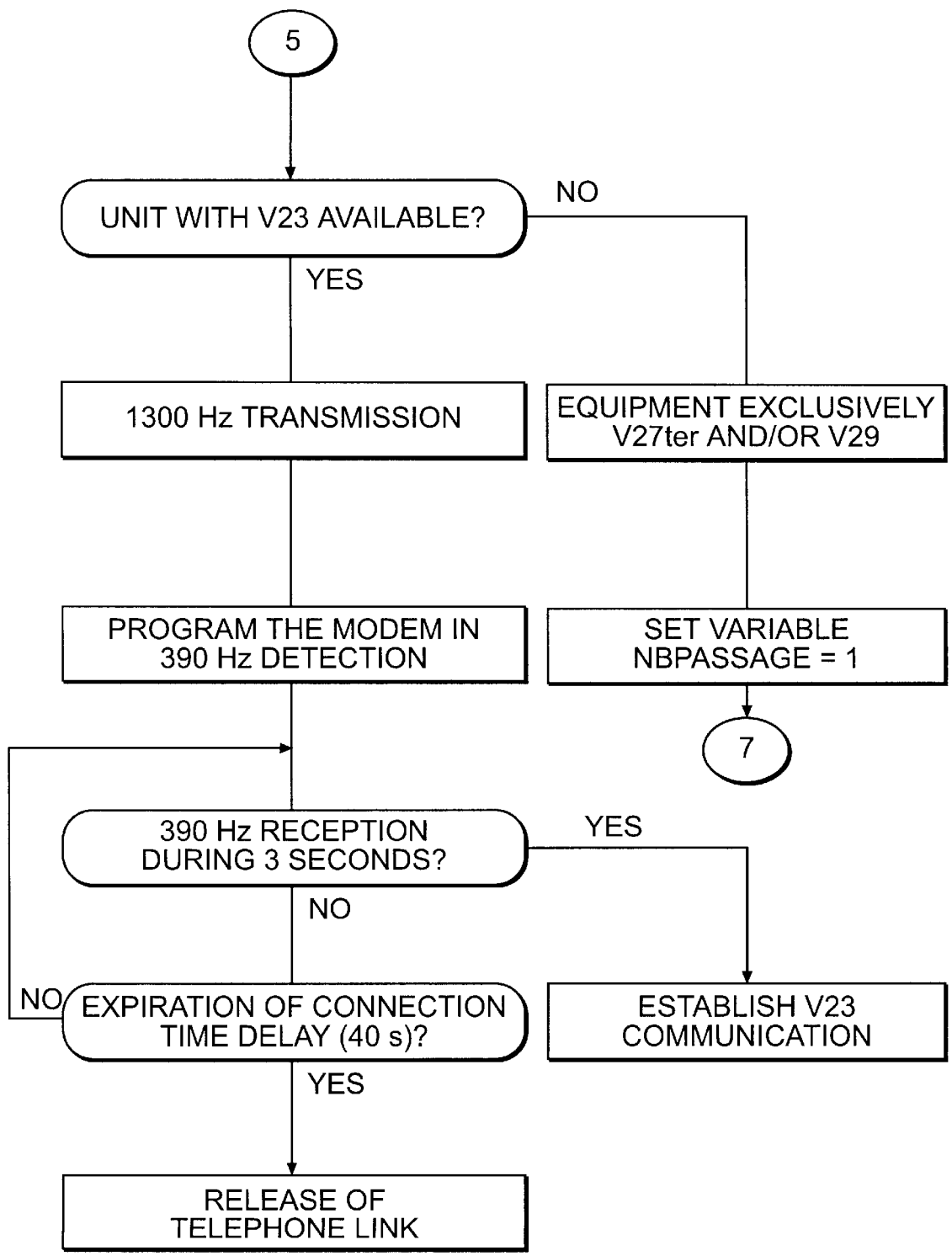

The automatic unit for connection in called mode, whose general diagram is given in FIG. 28a, includes sequences which allow one to distinguish between modes V23, V27ter and V29, a sequence for establishing communication in V29 mode being shown in FIG. 28c, in V27ter mode in FIG. 28d, and in mode V23 in FIG. 28e. As previously, operation in two modes or in a single mode (V27ter or V29) can be achieved by suppressing superfluous elementary sequences by the sequencer.

In FIG. 28b the parameter NB PASSAGE allows one to achieve several attempts (3) of connection in V29 mode and/or in V27ter mode by sending a long stream without valid reception of a long stream in return (point 6 of FIGS. 28b, 28c and 28d).

Figure 29A:
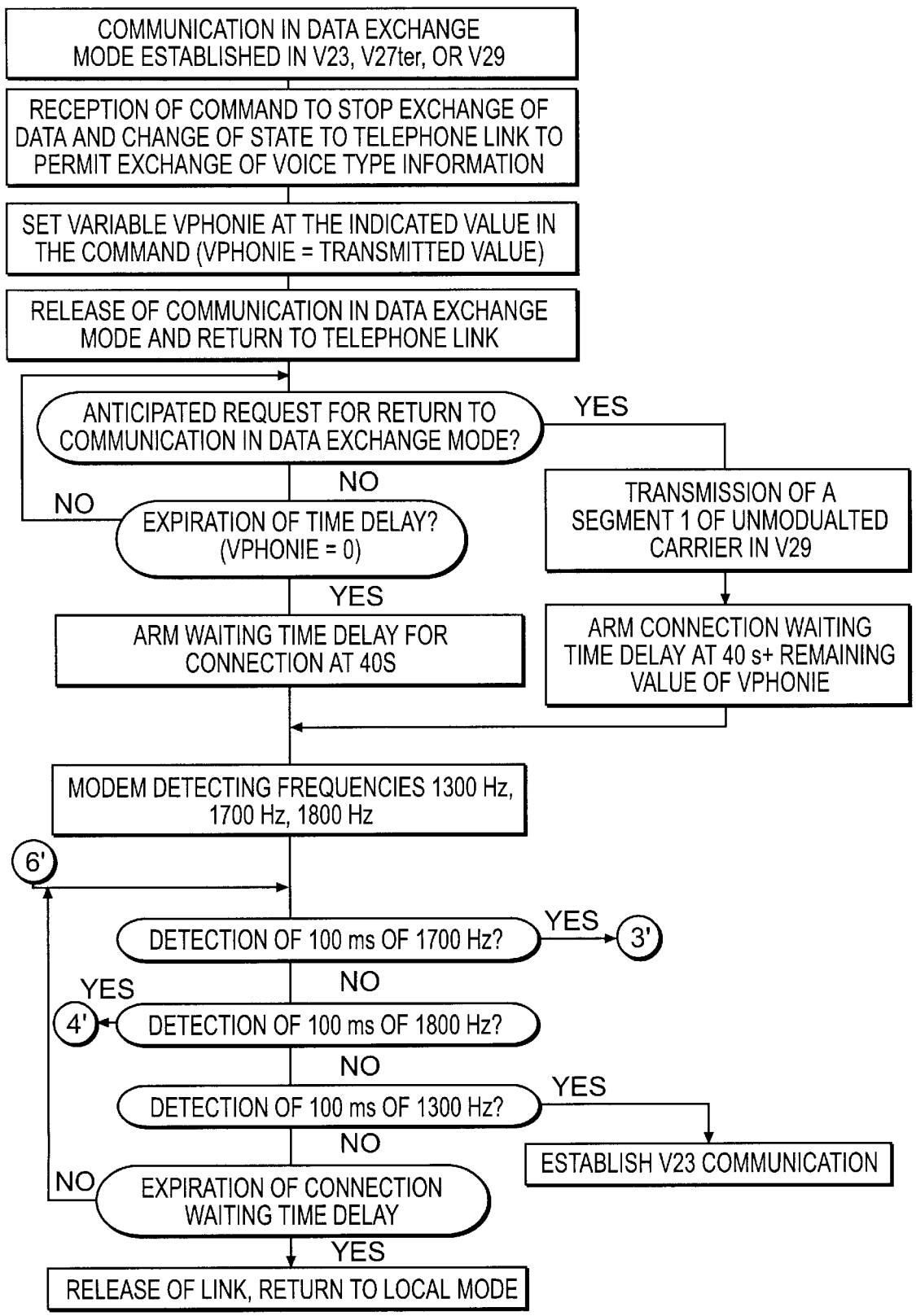
Figure 29B:
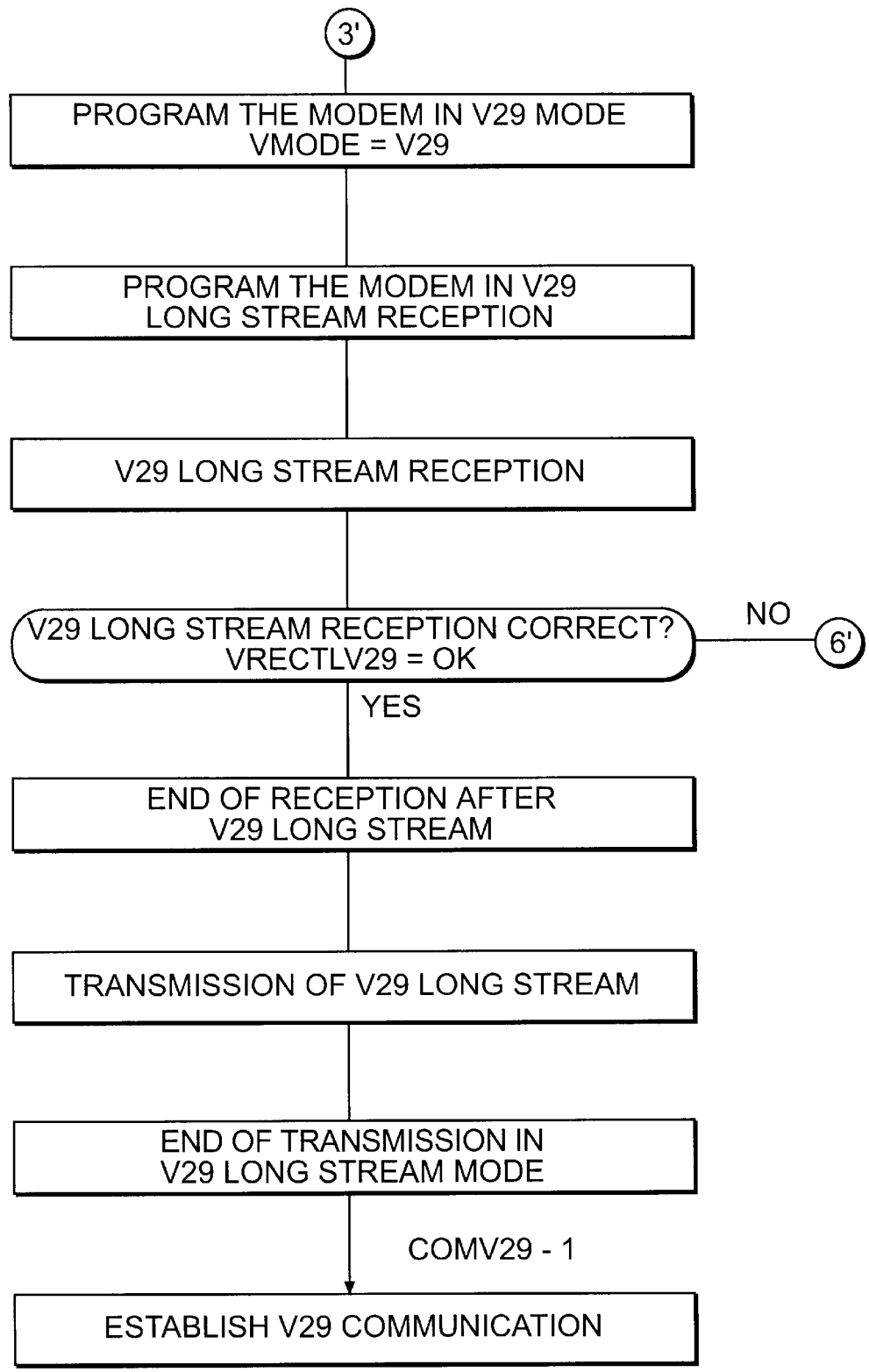
Figure 29C:
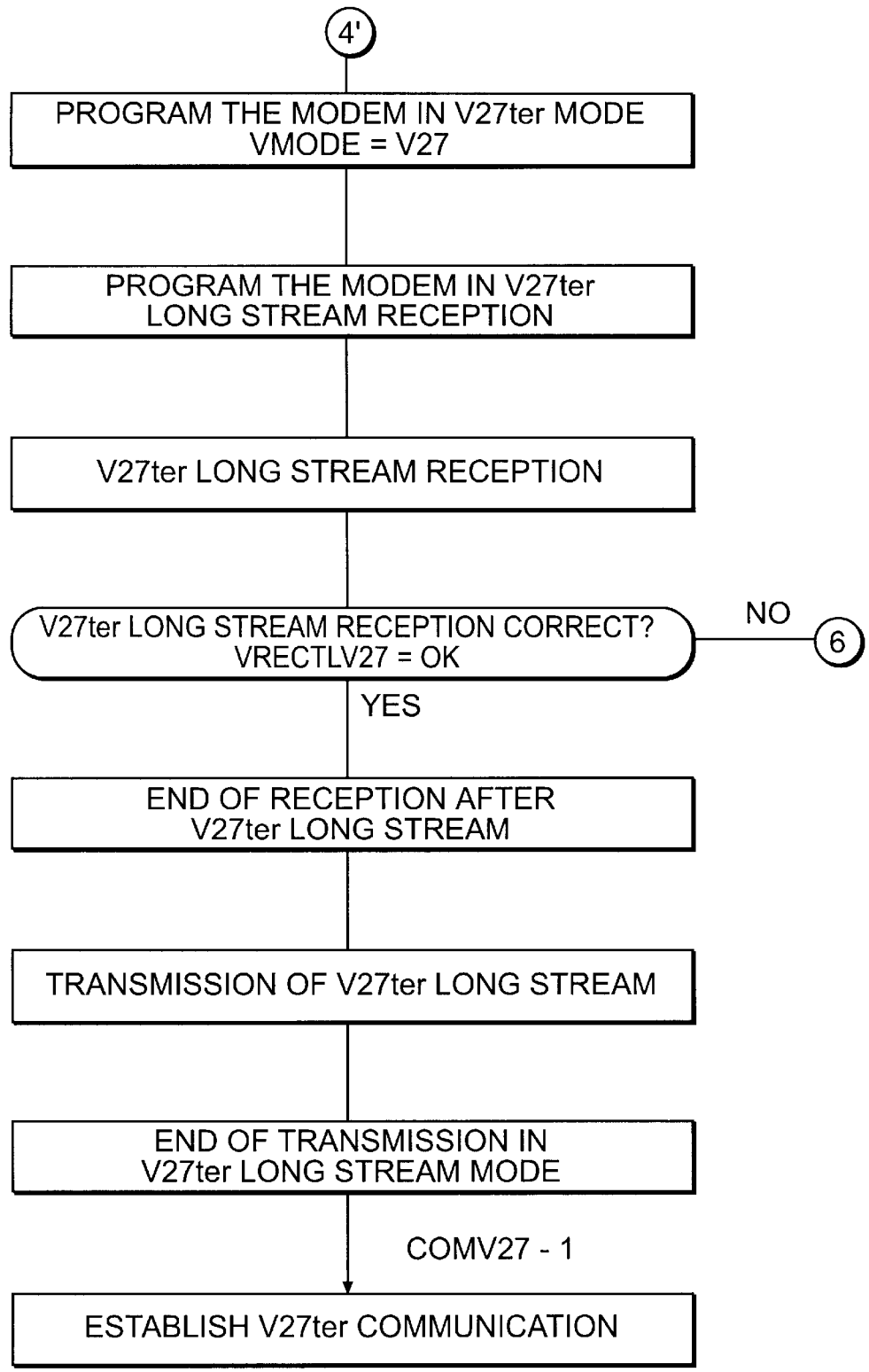

The telephony data switching sequencer is shown in FIGS. 29a to 29c, and it allows a new establishment of communication in V29 mode through the intermediary of sequences of FIG. 28c and in V27ter mode by the intermediary of sequences of FIG. 28d, without implying that the unit includes the entire automatic connection unit in called mode. The same is true for the procedure of releasing the connection of FIG. 29b (point 6 of FIG. 29a).

Figure 30D:
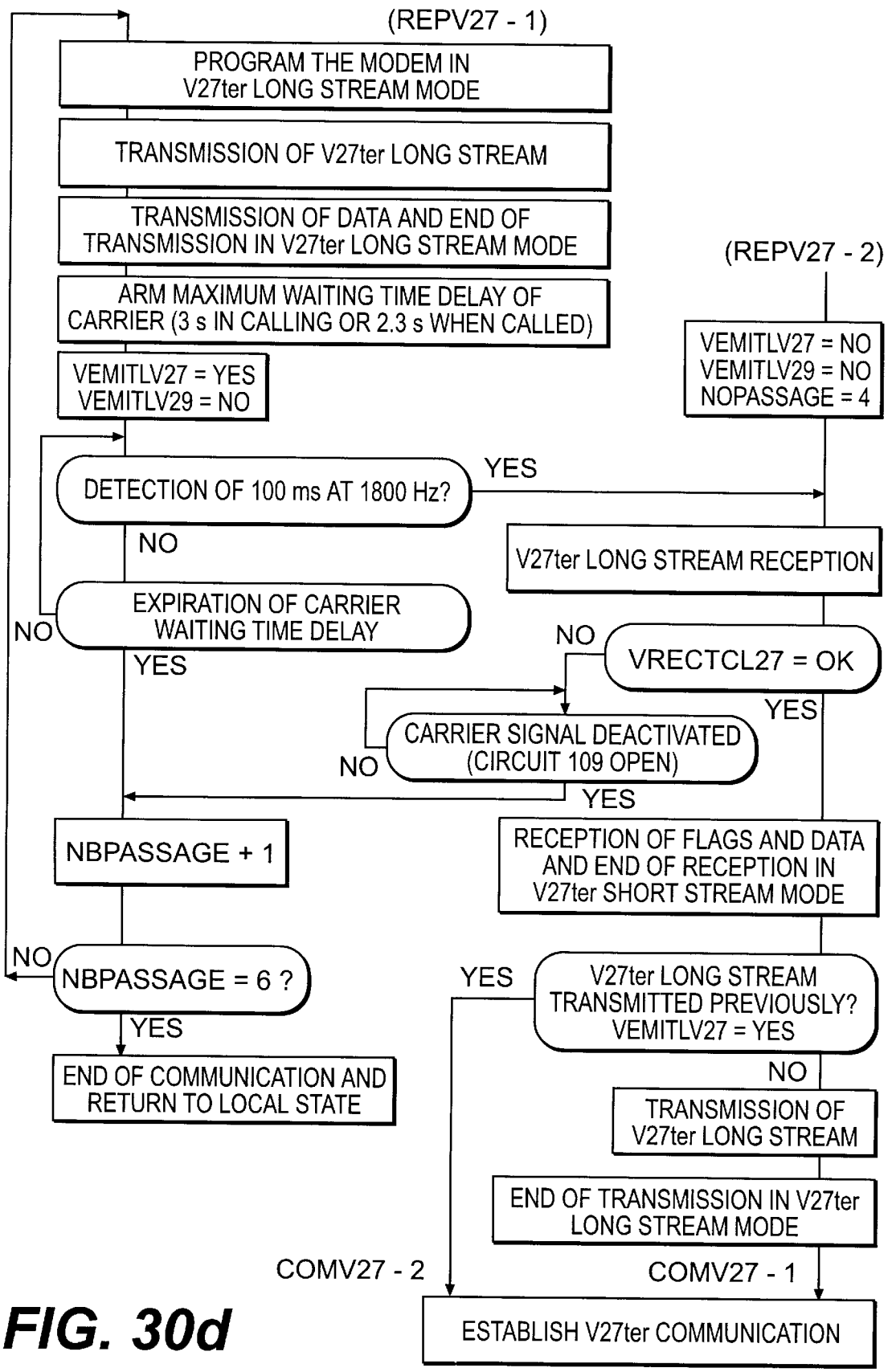

The automatic unit for communication and resumption-adjustment in V29 modulation (FIG. 30a to 30b) allows one to ensure resumption-adjustment in the same mode, or even in V27ter doubling mode. The automatic unit for resumption-adjustment also ensures short stream transmissions following establishment of communication (COM V27-1, COM V27-2, COM V29-1 and COM V29-2 signals). The parameter NB PASSAGE allows one to achieve several attempts (in this case 2) of resumption-adjustment in V29 (FIG. 30b) and/or V27ter (FIG. 30d).

The two automatic units (vertical branches of FIGS. 30a and 30c) ensure that V29 and V27ter short streams are sent and that they activate the short stream sequences of resumption-adjustment (VRECTCV29=OK or VRECTCV27=OK).

We claim:

1. A method for establishing half-duplex communication between a first unit and a second unit over a telephone line, said method comprising the steps of:

(a) transmitting a first matching signal stream from the first unit, the first matching signal stream including a first conditioning segment and a first unmodulated carrier signal having a first characteristic carrier frequency, the first characteristic carrier frequency representing a given transmission mode, the given transmission mode being in half-duplex; and (b) the second unit analyzing the first characteristic carrier frequency to recognize the given transmission mode.

2. The method of claim 1, said method further including the steps of:

(c) configuring the second unit to receive the first conditioning segment in the given transmission mode responsive to the second unit recognizing the given transmission mode;

(d) the second unit validating reception of the first conditioning segment;

(e) conditioning the second unit in the given transmission mode responsive to validating the reception of the first conditioning segment;

(f) transmitting a second matching signal stream from the second unit in the given transmission mode, the second matching signal stream including a second conditioning segment and a second unmodulated carrier signal having a second characteristic carrier frequency, the second characteristic carrier frequency representing the given transmission mode;

(g) the first unit analyzing the second characteristic carrier frequency to recognize the given transmission mode;

(h) configuring the first unit to receive the second conditioning segment in the given transmission mode responsive to the first unit recognizing the given transmission mode;

(i) the first unit validating reception of the second conditioning segment;

(j) conditioning the first unit in the given transmission mode responsive to validating reception of the second conditioning segment; and (k) the first unit establishing communication in the given transmission mode between the first and second units.

3. The method according to claim 1, wherein the first unit can communicate in first and second transmission modes in half-duplex and the second unit can communicate in the second transmission mode but not in the first transmission mode, the second transmission mode being slower than the first transmission mode, the given transmission mode being the first transmission mode, the method further including the steps of:

(l) the second unit non-validating reception of the first matching signal stream responsive to the second unit not recognizing the given transmission mode in step (b);

(m) the second unit transmitting a second matching signal stream from the second unit, the second matching signal stream including a second conditioning segment and a second unmodulated carrier signal having a second characteristic carrier frequency, the second characteristic carrier frequency representing the second transmission mode; and (n) the first unit analyzing the second characteristic carrier frequency to recognize the second transmission mode.

4. The method of claim 3, said method further including the steps of:

(o) configuring the first unit to receive the second conditioning segment in the second transmission mode responsive to the first unit recognizing the second transmission mode;

(p) the first unit validating reception of the second conditioning segment;

(q) conditioning the first unit in the second transmission mode responsive to validating the reception of the second conditioning segment;

(r) transmitting a third matching signal stream from the first unit in the second transmission mode, the third matching signal stream including a third conditioning segment and a third unmodulated carrier signal having a third characteristic carrier frequency, the third characteristic carrier frequency representing the second transmission mode;

(s) the second unit analyzing the third characteristic carrier frequency to recognize the second transmission mode;

(t) configuring the second unit to receive the third conditioning segment in the second transmission mode responsive to the second unit recognizing the second transmission mode in step (s);

(u) the second unit validating reception of the third conditioning segment;

(v) conditioning the second unit in the second transmission mode responsive to validating reception of the third conditioning segment; and (w) the second unit establishing communication between the first and second units in the second transmission mode.

5. The method of claim 1, wherein the first unit can communicate only in a third transmission mode in half-duplex and the second unit can communicate in the first and third transmission modes, wherein the third transmission mode is quicker than the first transmission mode.

6. The method of claim 1, wherein at least one of the first and second unmodulated carrier signals is an echo suppression signal.

7. The method of claim 2, wherein step (k) includes the step of the first unit transmitting a synchronization signal stream not beginning with an unmodulated carrier signal.

8. The method of claim 1 further including the steps of:
the first unit initiating a request to establish a telephone link;
the second unit detecting the request;
the second unit transmitting a first signal of a first duration followed by silence of a second duration, a frequency of the first signal being equal to a frequency of an answer dial tone of an automatic response unit and different from a modulation carrier signal frequency in half-duplex;
the first unit detecting a presence of the first signal; and
the first unit measuring the second duration responsive to detecting the first signal.

9. The method of claim 8, wherein if the second duration is greater than a predetermined duration threshold, the method further includes the step of validating execution of steps (a) through (k), inclusive.

10. The method of claim 8 further including the step of establishing communication in a non-half-duplex transmission mode responsive to the second duration being less than the predetermined duration threshold in the step of measuring.

11. The method of claim 2, wherein step (f) includes the step of the second unit ordering to establish communication, the method further including the steps of:
the first unit initiating a request to establish a link;
the second unit receiving the request; and
the second unit establishing the link responsive to receiving the request, the step of ordering not immediately following the step of establishing the link.

12. The method of claim 3, wherein step (m) includes the step of the second unit ordering to establish communication, the method further including the steps of:
the first unit initiating a request to establish a link;
the second unit receiving the request; and
the second unit establishing the link responsive to receiving the request, the step of ordering not immediately following the step of establishing the link.

13. The method of claim 1 further including the steps of:
prior to step (a), the first unit transmitting the first matching signal stream in a first transmission mode in half-duplex; and
prior to step (a), the second unit analyzing a carrier signal frequency in the first matching signal stream,
wherein if the first transmission mode is not recognized by the second unit in the step of preliminarily analyzing, then the method further comprises
waiting for a duration greater than a given duration threshold; and
validating steps (m) through (w), inclusive.

14. The method of claim 1 further including the steps of:
releasing of communication in half-duplex successively at a logical level of a communication protocol and then at a physical level while maintaining telephone linkage between the first and second units;

thirdly transmitting in a telephony mode during a third duration;

detecting an end of the third duration; and validating execution of steps (a) through (k), inclusive.

15. The method according to claim 14, wherein the first and second units are configured to detect at least one of the characteristic frequencies of at least one of the unmodulated carrier signals, the at least one characteristic frequency representing at least the telephony mode, the method further including the steps of:

one of the first and second units initializing establishment of communication by transmitting an order to establish the communication, the step of initializing occurring before the end of the third duration; and validating execution of steps (a) through (k), inclusive.

16. Apparatus for establishing half-duplex communication comprising:

a line interface;

a modem coupled to said line interface; and a sequencer coupled to said modem, wherein said modem is programmable by said sequencer, and wherein said sequencer is configured to allow said modem to transmit a first matching signal stream including a first unmodulated carrier signal, allow said modem to receive a second matching signal stream including a second unmodulated carrier signal and to detect a frequency of the second unmodulated carrier signal, place said modem in a given transmission mode in half-duplex according to the frequency of the second unmodulated carrier signal, such that said modem can receive other signals of the second matching signal stream, and validate establishment of physical communication in half-duplex in the given transmission mode responsive to said modem receiving the second matching signal stream.

17. The apparatus according to claim 16, said sequencer being further configured to allow said modem to permanently establish detection of a frequency of at least one unmodulated carrier signal when said modem is in a receiving mode.

18. The apparatus according to claim 16, said sequencer being further configured to allow said modem to validate that said modem has transmitted the first matching signal stream responsive to said modem receiving the second matching signal stream and said modem detecting a request for establishment of communication in half-duplex.

19. Apparatus for establishing half-duplex communication comprising:

means for transmitting a first matching signal stream including a first unmodulated carrier signal having a first characteristic carrier frequency, the first characteristic carrier frequency representing at least a first transmission mode in half-duplex;

means for receiving a second matching signal stream, the second matching signal stream including a second unmodulated carrier signal having a second characteristic carrier frequency, the second characteristic carrier frequency representing at least a second transmission mode in half-duplex; and means for recognizing the second transmission mode according to the second characteristic carrier frequency.

* * * * *